US011609302B2

(12) United States Patent
Carswell et al.

(10) Patent No.: US 11,609,302 B2
(45) Date of Patent: *Mar. 21, 2023

(54) MODULAR OBJECT-ORIENTED DIGITAL SUB-SYSTEM ARCHITECTURE WITH PRIMARY SEQUENCE CONTROL AND SYNCHRONIZATION

(71) Applicant: The Tomorrow Companies Inc., Boston, MA (US)

(72) Inventors: James R. Carswell, Yarmouthport, MA (US); Torry L. Akins, Denver, CO (US)

(73) Assignee: The Tomorrow Companies Inc., Boston, MA (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/163,640

(22) Filed: Feb. 1, 2021

(65) Prior Publication Data
US 2021/0199756 A1 Jul. 1, 2021

Related U.S. Application Data

(63) Continuation of application No. 15/939,562, filed on Mar. 29, 2018, now Pat. No. 10,908,255.
(Continued)

(51) Int. Cl.
| | | |
|---|---|---|
| *G01S 7/295* | (2006.01) | |
| *G01S 7/288* | (2006.01) | |
| *G06F 1/12* | (2006.01) | |
| *G06F 13/42* | (2006.01) | |
| *G01S 7/282* | (2006.01) | |
| *G01S 7/02* | (2006.01) | |
| *G06F 3/00* | (2006.01) | |

(Continued)

(52) U.S. Cl.
CPC ............ *G01S 7/295* (2013.01); *G01S 7/02* (2013.01); *G01S 7/282* (2013.01); *G01S 7/288* (2013.01); *G06F 1/12* (2013.01); *G06F 3/00* (2013.01); *G06F 13/4221* (2013.01); *G01S 7/285* (2013.01); *G01S 7/356* (2021.05); *G01S 13/225* (2013.01); *G01S 2013/0245* (2013.01); *G06F 2213/0026* (2013.01)

(58) Field of Classification Search
CPC .. G01S 13/225; G01S 2013/0245; G01S 7/02; G01S 7/282; G01S 7/285; G01S 7/288; G01S 7/295; G01S 7/356; G01S 13/422; G01S 13/9088; G06F 1/12; G06F 13/4221; G06F 2213/0026; G06F 3/00; G06F 1/04
See application file for complete search history.

(56) References Cited

U.S. PATENT DOCUMENTS

| 4,680,779 A | 7/1987 | Wakerly |
|---|---|---|
| 5,879,301 A | 3/1999 | Chiabrera et al. |

(Continued)

*Primary Examiner* — Timothy X Pham
(74) *Attorney, Agent, or Firm* — Nixon & Vanderhye P.C.

(57) ABSTRACT

The present disclosure relates to digital signal processing architectures, and more particularly to a modular object-oriented digital system architecture ideally suited for radar, sonar and other general purpose instrumentation which includes the ability to self-discover modular system components, self-build internal firmware and software based on the modular components, sequence signal timing across the modules and synchronize signal paths through multiple system modules.

14 Claims, 41 Drawing Sheets

Exemplary Phased-Array Radar System

Related U.S. Application Data

(60) Provisional application No. 62/479,981, filed on Mar. 31, 2017.

(51) Int. Cl.
  *G01S 13/02* (2006.01)
  *G01S 13/22* (2006.01)
  *G01S 7/285* (2006.01)
  *G01S 7/35* (2006.01)

(56) References Cited

U.S. PATENT DOCUMENTS

| | | |
|---|---|---|
| 2005/0083863 A1 | 4/2005 | Umei et al. |
| 2008/0001808 A1 | 1/2008 | Passarelli, Jr. et al. |
| 2008/0141058 A1 | 6/2008 | Craddock et al. |
| 2009/0105985 A1 | 4/2009 | Steger et al. |
| 2016/0306383 A1 | 10/2016 | Harriman et al. |
| 2018/0115409 A1* | 4/2018 | Nayyar .................... G01S 7/02 |
| 2020/0091608 A1 | 3/2020 | Alpman et al. |

* cited by examiner

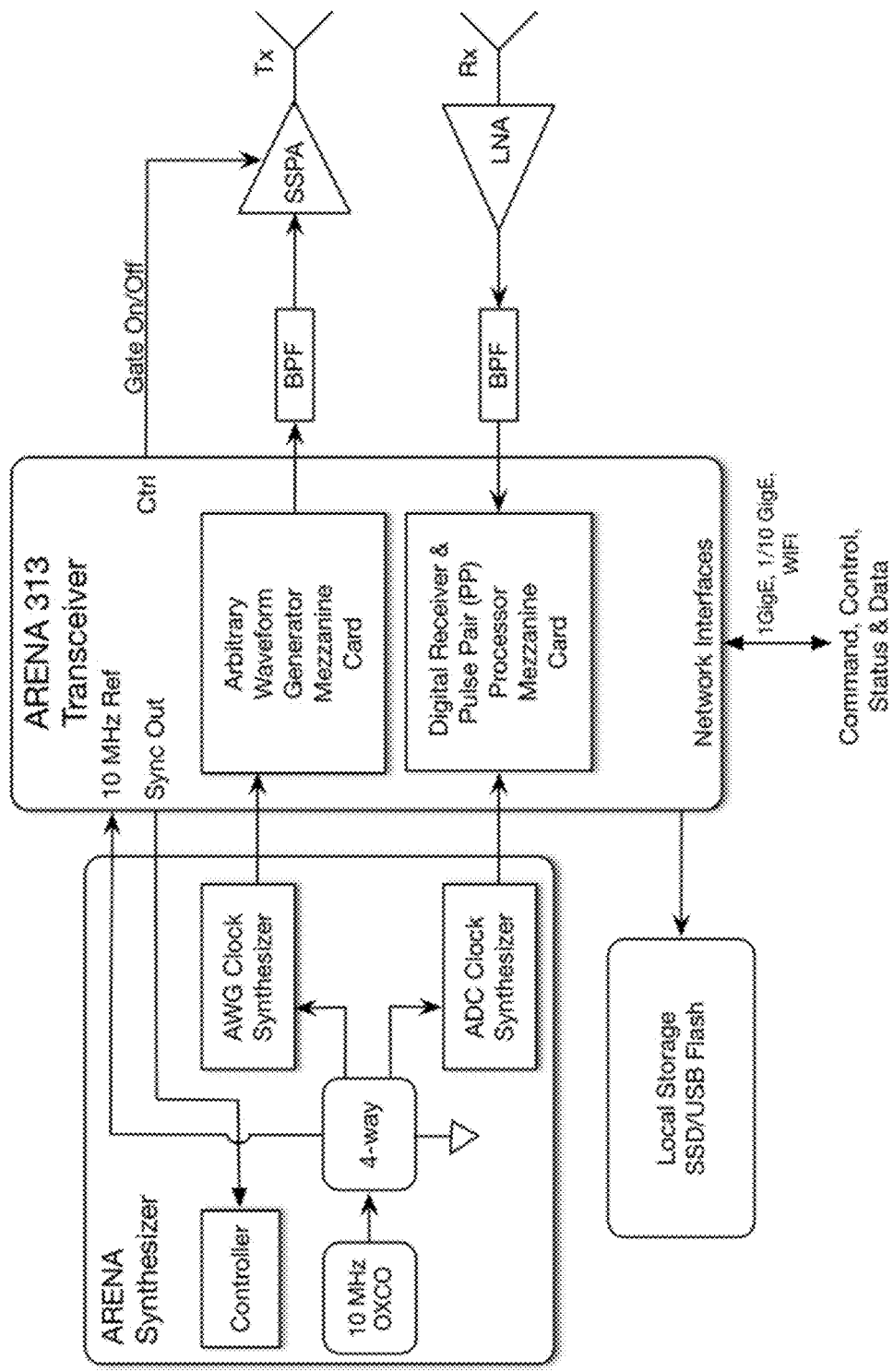
Figure 2A Exemplary S-Band Radar Implementation

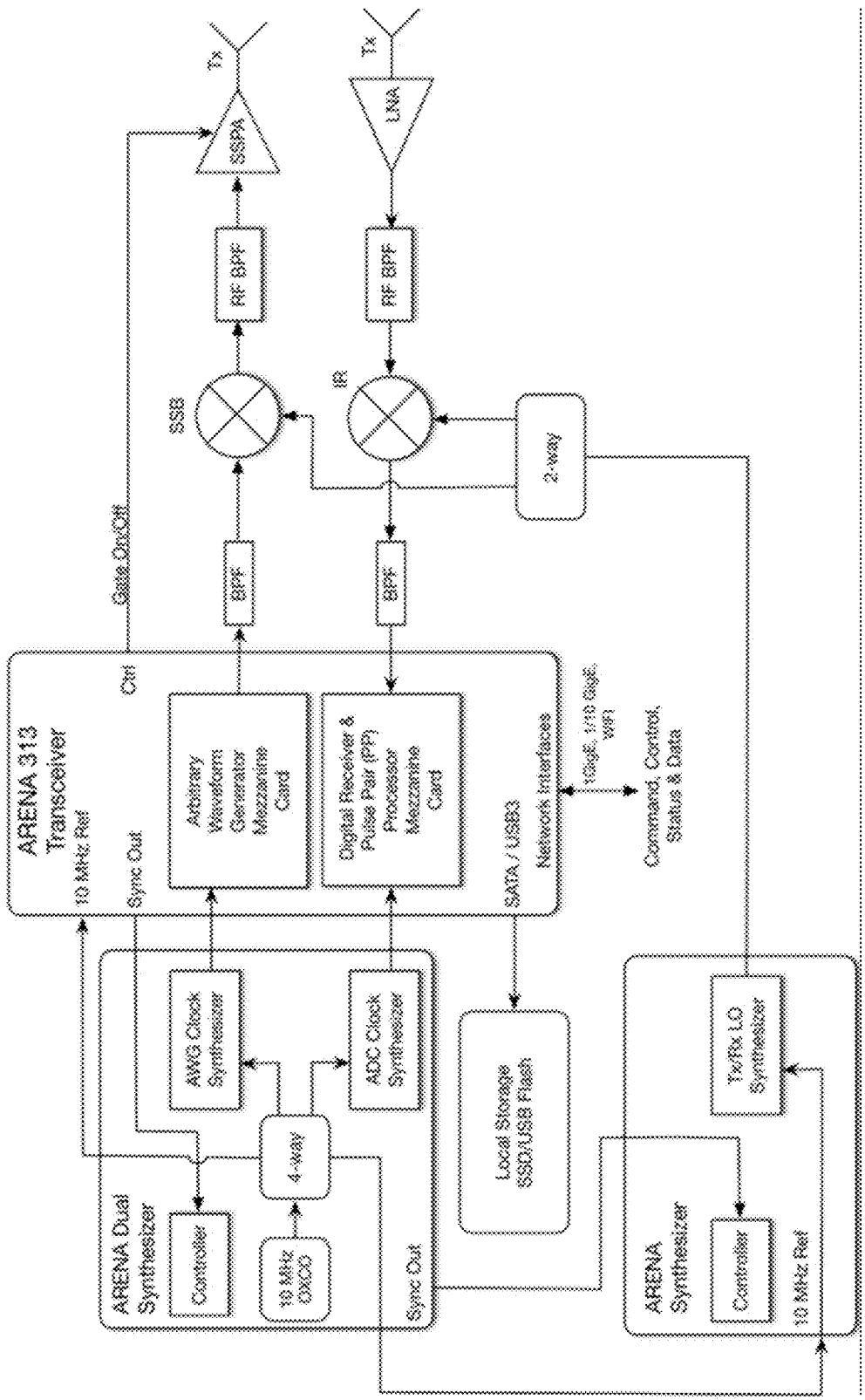
Figure 2B Exemplary Microwave/Millimeter-wave Radar Implementation

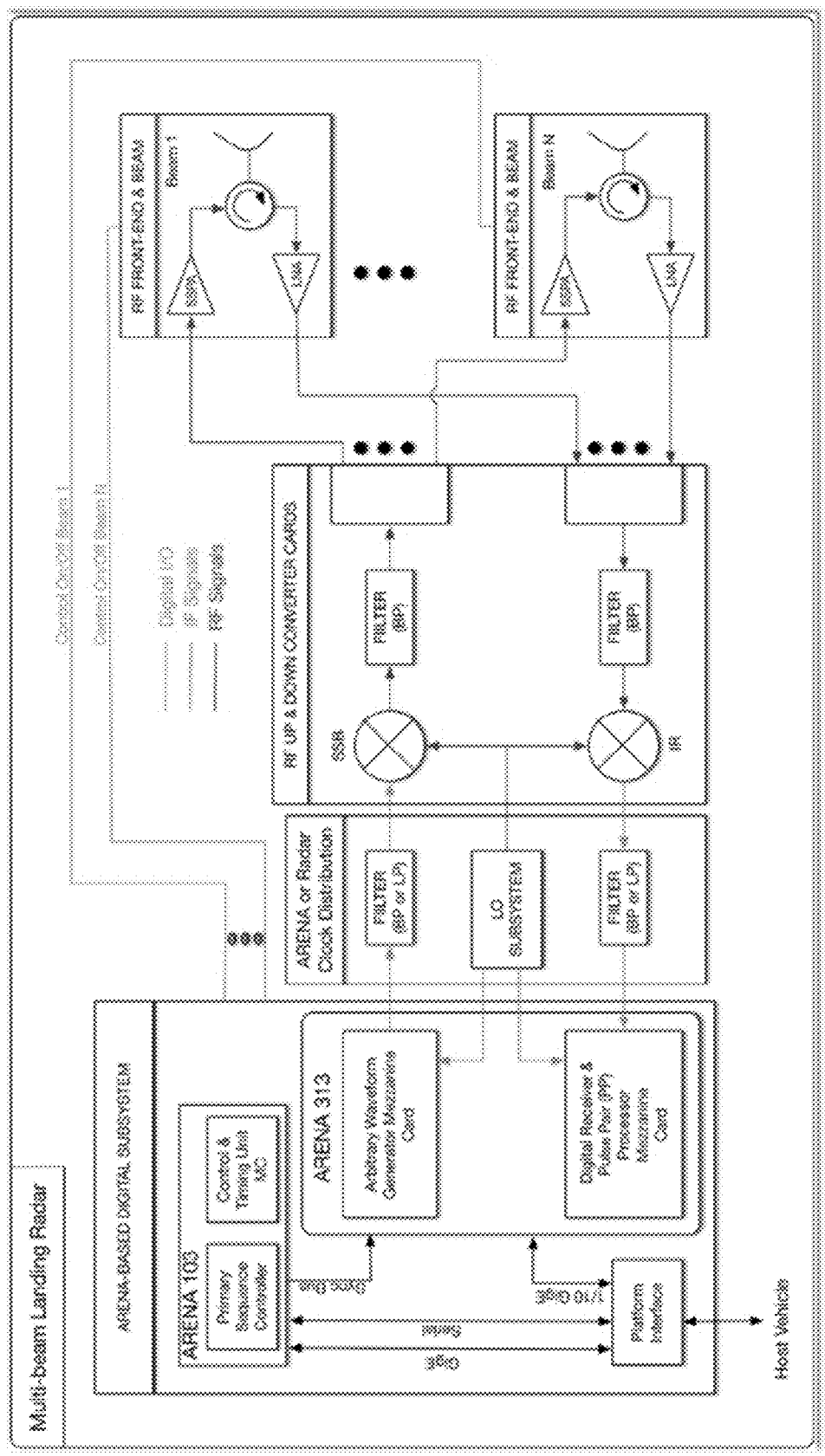
Figure 2C Exemplary Multi-Beam Landing Radar Configuration

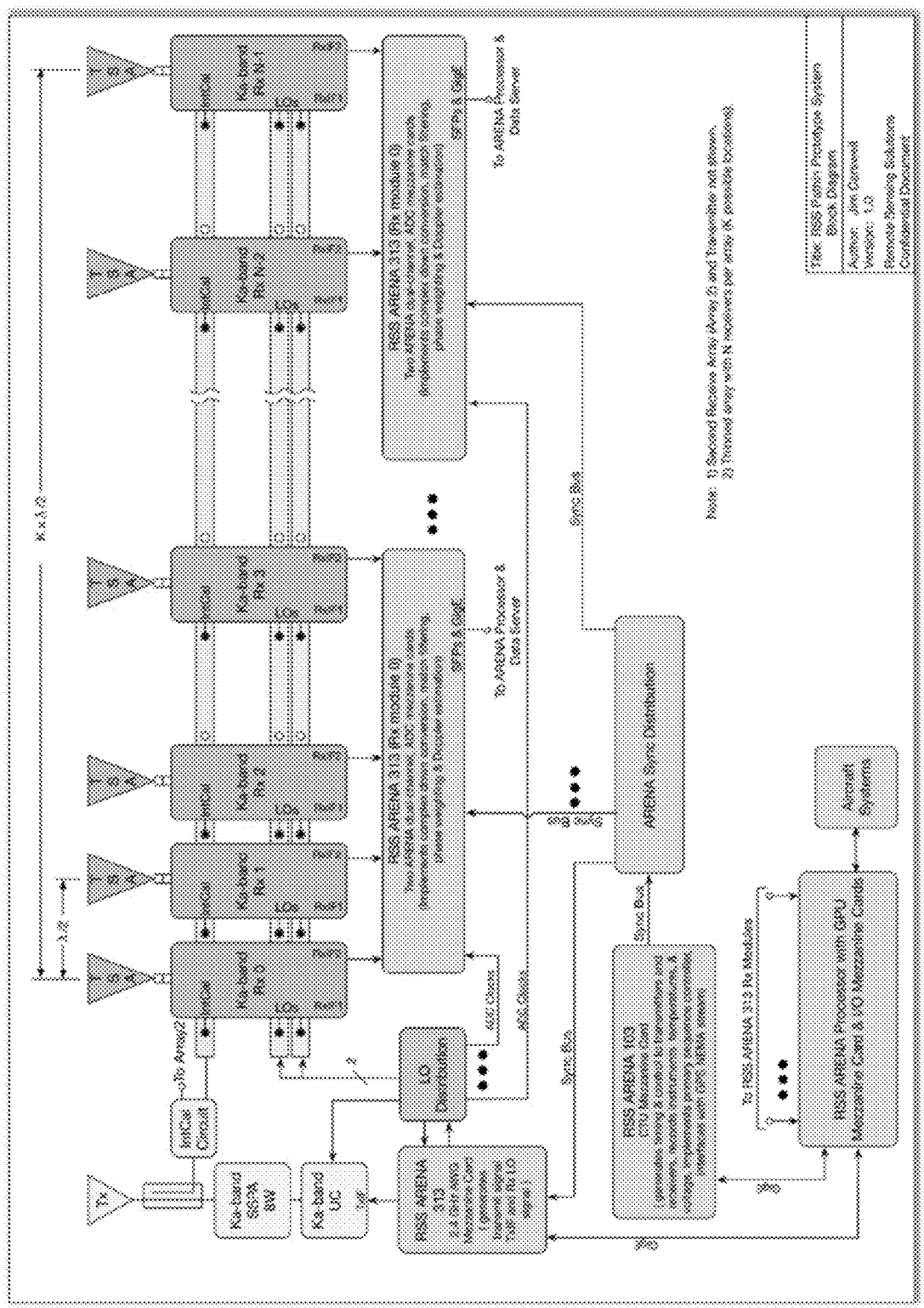
Figure 2D Exemplary Phased-Array Radar System

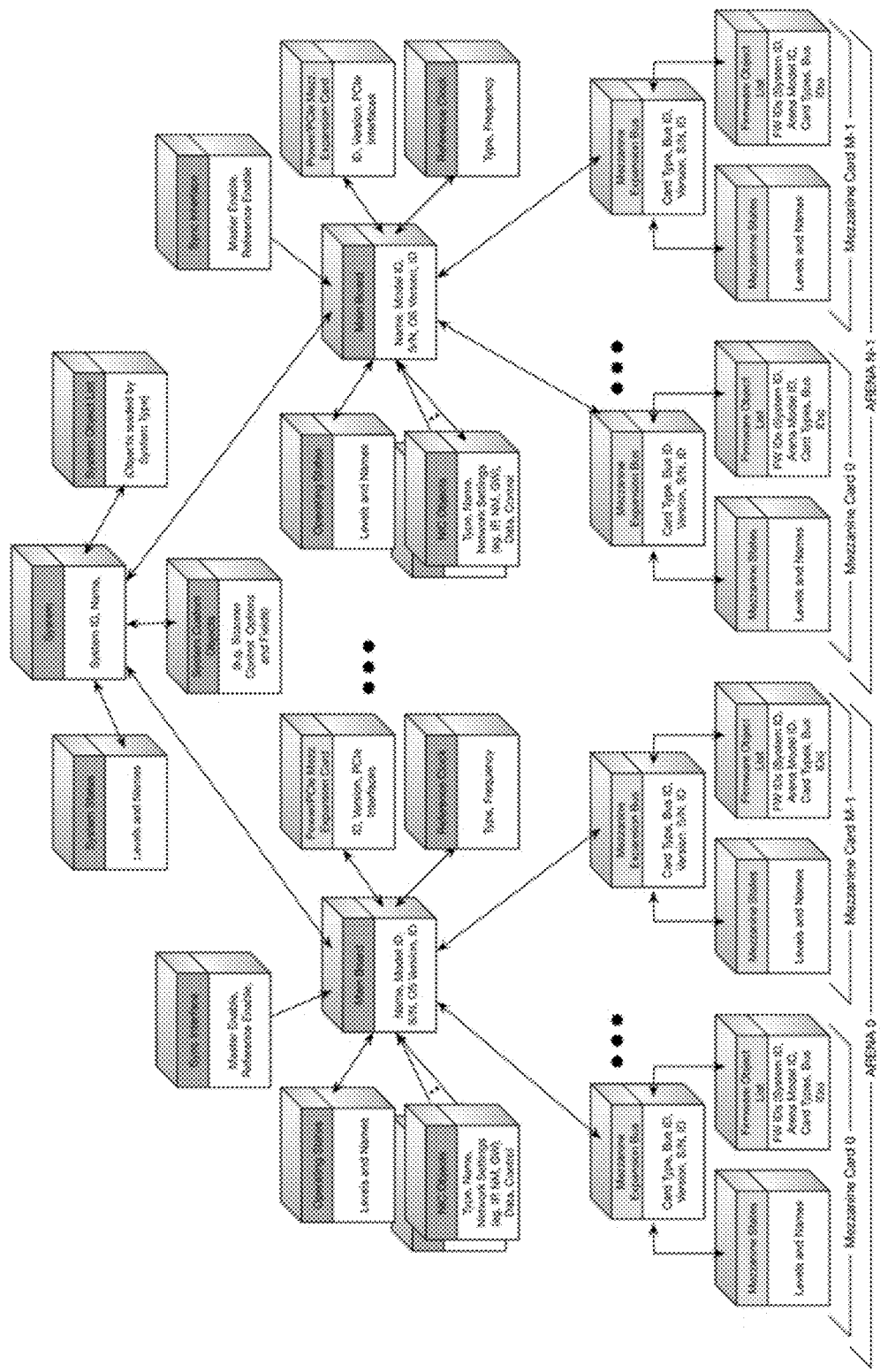
Figure 3: System configuration discovery object diagram.

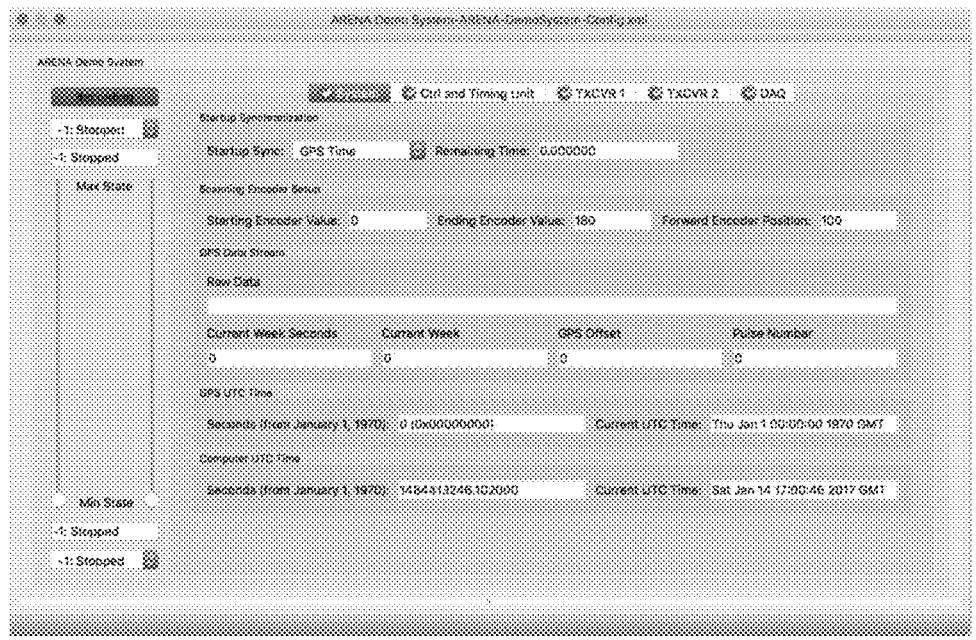
(a)
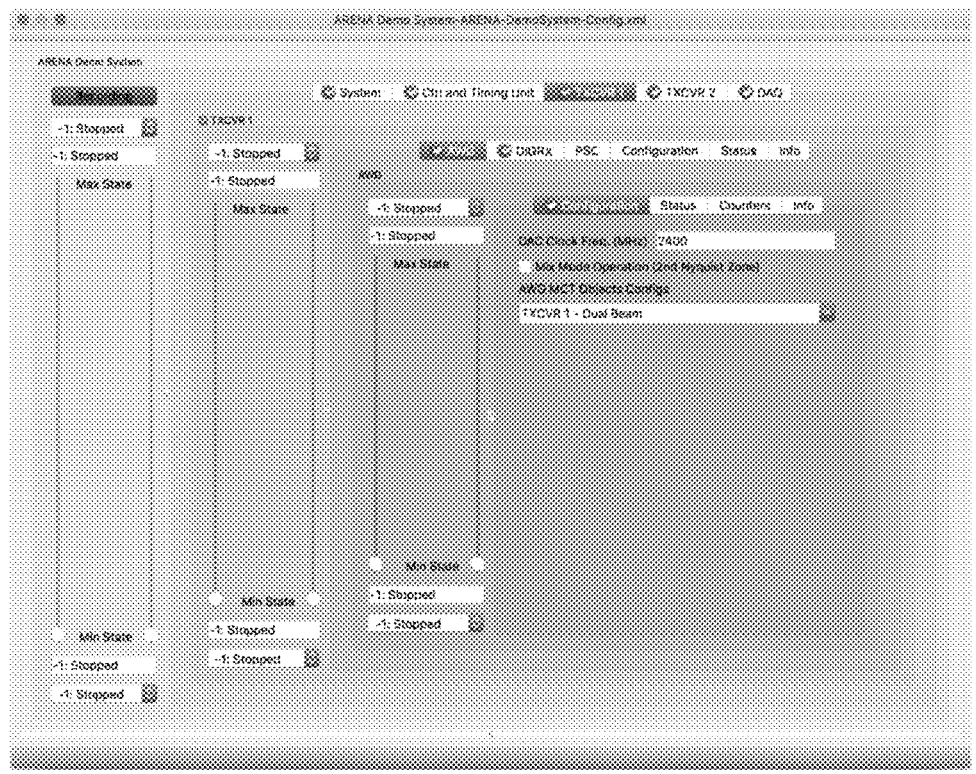
(b)
Figure 4

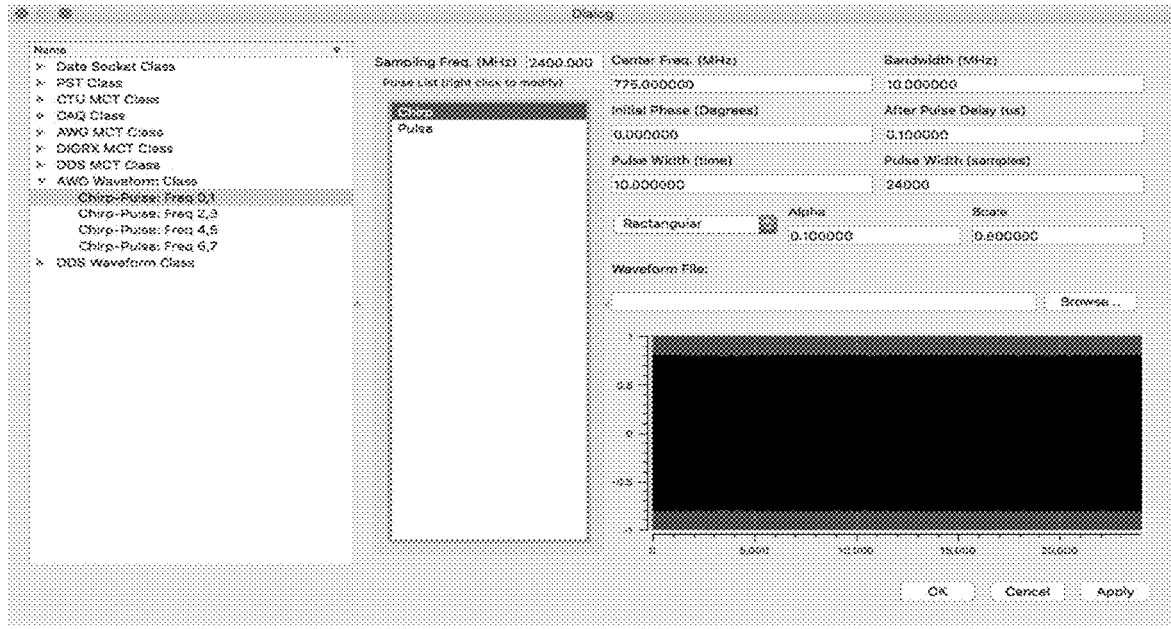
(a)
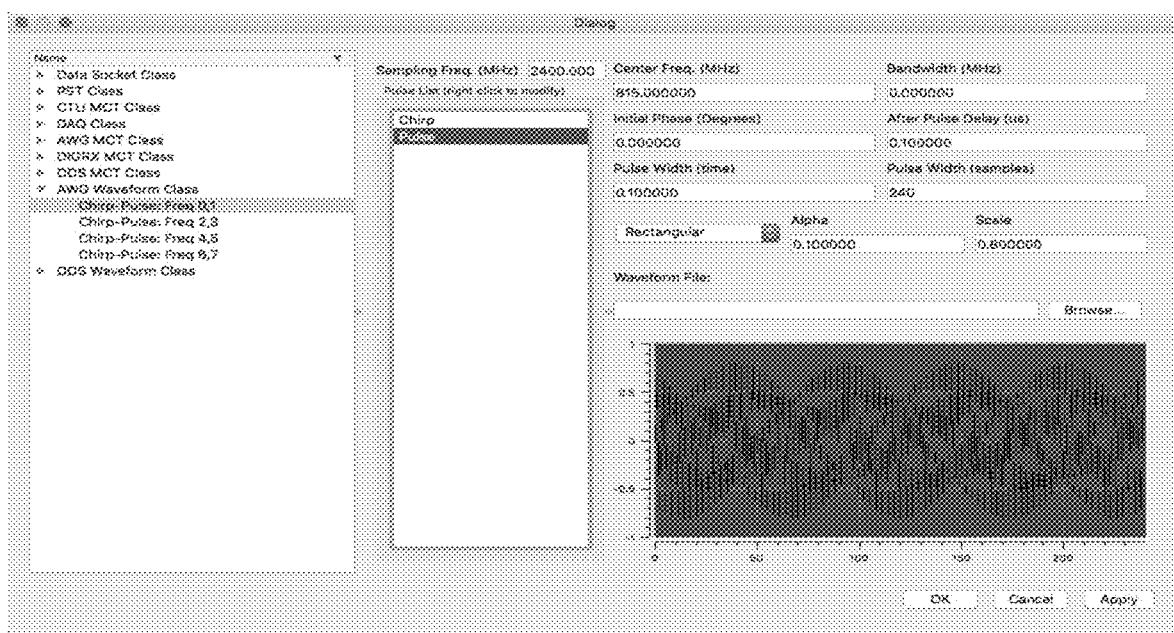
(b)
Figure 49

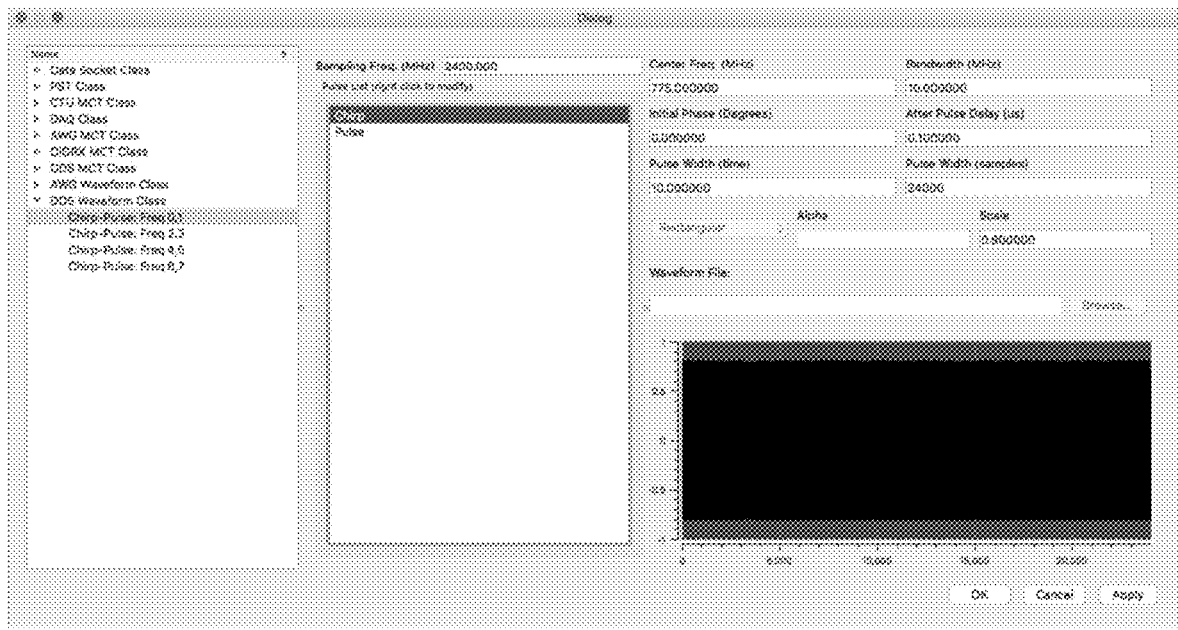
(a)
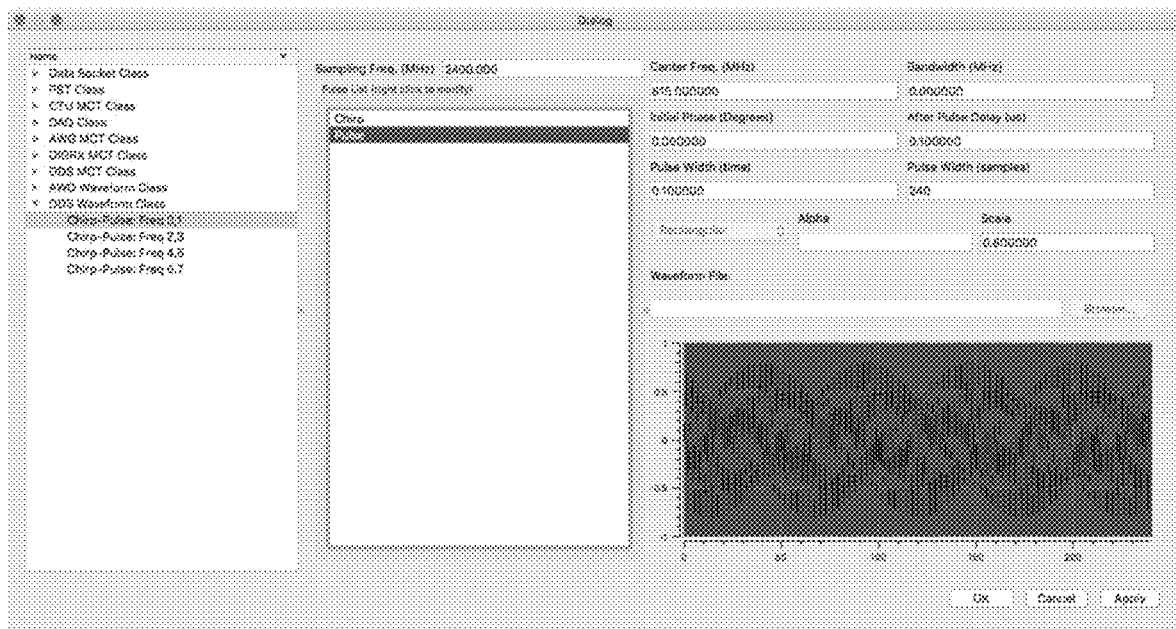
(b)
Figure 50

MODULAR OBJECT-ORIENTED DIGITAL SUB-SYSTEM ARCHITECTURE WITH PRIMARY SEQUENCE CONTROL AND SYNCHRONIZATION

CROSS-REFERENCE TO RELATED APPLICATIONS

This Application is a continuation of U.S. application Ser. No. 15/939,562, filed Mar. 29, 2018 which claims the benefit of U.S. Provisional Patent Application No. 62/479,981, filed Mar. 31, 2017, the entire contents of which is incorporated herein by reference.

BACKGROUND OF THE INVENTION

The present disclosure relates to digital signal processing architectures, and more particularly to a modular object-oriented digital system architecture ideally suited for radar, sonar and other general purpose instrumentation which includes the ability to self-discover modular system components, self-build internal firmware and software based on the modular components, sequence signal timing across the modules and synchronize signal paths through multiple system modules.

Digital subsystems for radar, sonar and other general purpose instrumentation implement a variety of critical functions for these systems such as, generating control and timing signals for the system, monitoring and recording the system's status and health, creating and providing the system's waveforms (e.g. transmit signals, local oscillator signals and reference signals), capturing and processing the system's receive signals and ancillary data, storing the processed data and ancillary data to local and/or remote (e.g. network storage/data servers) storage media, distributing the processed and ancillary data over data and display networks, documenting the state of the system, displaying the processed and ancillary data, and interacting with sensor networks providing real-time data to the network to reconfigure on the fly and react to the sensor network's needs as these needs evolve.

Conventionally, a digital subsystem is implemented using a standard backplane solution (e.g. VPX, PCIe) with a mother board responsible for communication and control, and specialty cards (e.g. DSP, FPGA, digital I/O) implementing specific functions and processing. This results in a bulky subsystem that occupies significant size and weight and consumes considerable power (SWaP), and that cannot be embedded in the instrument itself. These conventional sub-systems require custom firmware and software development, and require significant development, integration and testing. These development activities take significant time and resources and are extremely costly. Custom single board solutions can reduce SWaP but further increase development costs. Additionally, custom solutions offer less flexibility for reconfiguration and limit future expansion. Both approaches result in hardware configurations that are designed for a particular system, and even a specific application for that system. This limits the use of the solutions in other systems, or even for different applications for the system it was originally designed for.

SUMMARY OF THE INVENTION

To overcome these limitations, the present disclosure provides a digital subsystem solution that has extreme re-configurability, a network centric architecture, ultra-low SWAP, a long product life cycle with the ability to receive incremental upgrades, and low development, integration and operational costs. These improvements are achieved through a design that is reconfigurable and modular at the hardware, firmware, software and run levels.

The present system is based on an object-orientated and network-centric system architecture that is expandable at a modular level through intra-module communication and synchronization. At the same time, the system offers unparalleled performance in signal processing and data communications.

At a hardware level, each module consists of a conduction cooled chassis; a main processor board with one or two high fidelity mezzanine expansion buses; and a power/PCIe mezzanine expansion bus. Based on the system's needs, an ARENA system can be populated with a particular power/PCIe mezzanine card and mezzanine expansion card(s). Each module can run as a standalone unit or multiple modules can be combined and synchronized through sync ports to provide a solution for more complex problems. As such, the present modular solution can address an extremely broad range of applications and system requirements while requiring little to no customer custom development.

To enable seamless reconfiguration, at all levels, the platform utilizes an object-oriented system architecture. The processes performed by each module, whether they are at the hardware, firmware and/or software levels, are broken down into encapsulated actions. Thus, the inputs and outputs governing, and resulting from, each action can be captured within an object, and the action itself becomes a method of the object.

Network centric communication (i.e. messaging) between objects is then achieved through a common "packet" based messaging scheme known as the ARENA intra-object communications API. Each packet is self-descriptive providing the intended receiver(s) with information to be able to parse and interpret the data/information within the packet. In this paradigm, each object can report what it needs and what it provides to allow the system to self-build, and objects can be linked together through the intra-object communications API, allowing complex processes to be performed by a collection of ARENA encapsulated objects.

Each module includes a synchronization interface (Sync interface) that operates in conjunction with a system reference clock to control the pulse intervals of signal transmissions. Where multiple modules are present, one sync interface can be configured as a master which generates the sync signal while the other modules take on the role of slaves which receive the sync signal. The sync interfaces support both serial and parallel signal distribution.

A primary sequence controller (PSC) controls the run-time behavior and timing of the modules. In multi-module configurations, any module can be designated to execute the functions of the PSC, and the PSC communicates with all of the other modules through the Sync interface. In exemplary embodiments, a dedicated Control and Timing Unit (CTU) hosts the PSC. The PSC is governed by a PSC Table that defines the sequence of modes that should be executed and a period for each entry. The PSC table allows for internal repeat loops and it can be asynchronously interrupted with an interrupt sequence table and external trigger.

Each object within the system (both at the module and at the mezzanine level) has a Mode Configuration Table (MCT) object that defines for each Mode the configuration that should be used in the sequence. This allows each object to be reconfigured on a pulse-to-pulse basis.

Each software application is also modular and self-builds based on the system objects that are generated by the module and the run-time configuration objects.

One of the more critical features of the present system is the Digital Receiver Firmware provided in each ADC based mezzanine card. The "default" digital receiver implementation in the system provides the ability for each profile to send out ADC samples, digital receiver I & Q profile gates, range gates after the forward FFT, range gates after the reverse FFT (i.e. match filter output) and range gates of the products (coherent averaging products and pulse pair products). This is novel and important because existing digital receiver processors only give access to one of these data types. The present system architecture allows the user, by mode and sub channel, to specify any of these outputs and multiple different outputs on each profile.

BRIEF DESCRIPTION OF THE DRAWINGS

While the specification concludes with claims particularly pointing out and distinctly claiming particular embodiments of the instant invention, various exemplary embodiments of the invention can be more readily understood and appreciated from the following descriptions when read in conjunction with the accompanying drawings in which:

FIG. 2A: Block diagram of an exemplary S-Band Radar.

FIG. 2B: Block diagram of an exemplary Microwave/Millimeter-wave Radar.

FIG. 2C: Block diagram of an exemplary Multi-Beam Landing Radar configuration including an ARENA 103 module and an ARENA 313 module.

FIG. 2D: Block diagram of an exemplary phased-array radar configuration including multiple integrated ARENA modules configured for waveform generation, timing and control, ADC, and module synchronization.

FIG. 3: System configuration discovery object diagram.

FIG. 4: Shown is the arenaGUI application: (a) System tab selected, (b) TXCVR 1 (i.e. ARENA 313 module) selected and its AWG mezzanine expansion card selected.

FIG. 49: An object, "Chirp-Pulse: Freq 0,1", belonging to the AWG Waveform class has been selected. Its attributes are shown in the right panel. (a) "Chirp" pulse has been selected and its attributes shown. (b) "Pulse" pulse has been selected and its attributes shown. This object creates waveform with LFM pulse of 10 µsec length, 10 MHz sweep bandwidth and a center frequency of 775 MHz followed by a fixed frequency pulse centered at 815 MHz with a 100 nsec pulse width. Separation of the two pulses is 100 nsec. Tukey Taper is applied to both pulses.

FIG. 50: An object, "Chirp-Pulse: Freq 0,1", belonging to the DAC Waveform class has been selected. Its attributes are shown in the right panel. (a) "Chirp" pulse has been selected and its attributes shown. (b) "Pulse" pulse has been selected and its attributes shown. This object creates waveform with LFM pulse of 10 µsec length, 10 MHz sweep bandwidth and a center frequency of 775 MHz followed by a fixed frequency pulse centered at 815 MHz with a 100 nsec pulse width. Separation of the two pulses is 100 nsec.

DETAILED DESCRIPTION OF THE INVENTION

Figure 1A:
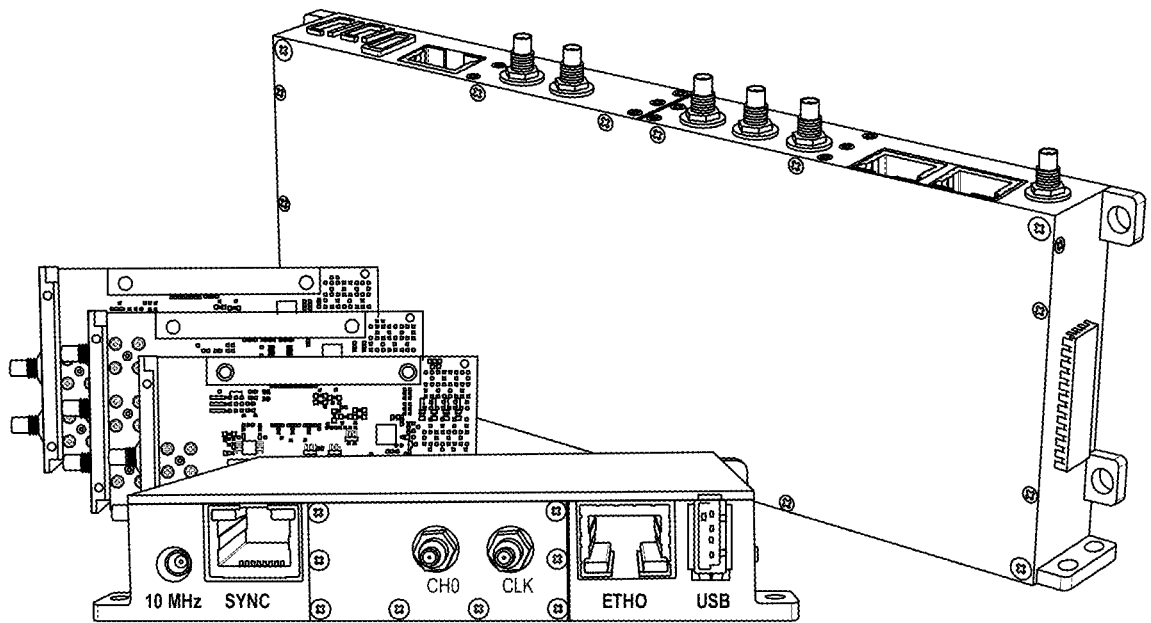
FIG. 1A: Photograph of ARENA 103 (front center), ARENA 313 (back right) and example AREN mezzanine expansion cards (left side between the ARENA 103 and ARENA 313 modules).

Referring now to the drawings, exemplary embodiments of the invention are set forth and described.

The present disclosure provides a digital subsystem solution that has, extreme re-configurability, network centric architecture, ultra-low SWAP, a long product life cycle with the ability to receive incremental upgrades, and low development, integration and operational costs. These improvements are achieved through a design that is reconfigurable and modular at the hardware, firmware, software and run levels.

The present system is based on an object-orientated and network-centric system architecture that is expandable at a modular level through intra-module synchronization. At the same time, the system offers unparalleled performance in signal processing and data communications.

Figure 1B:
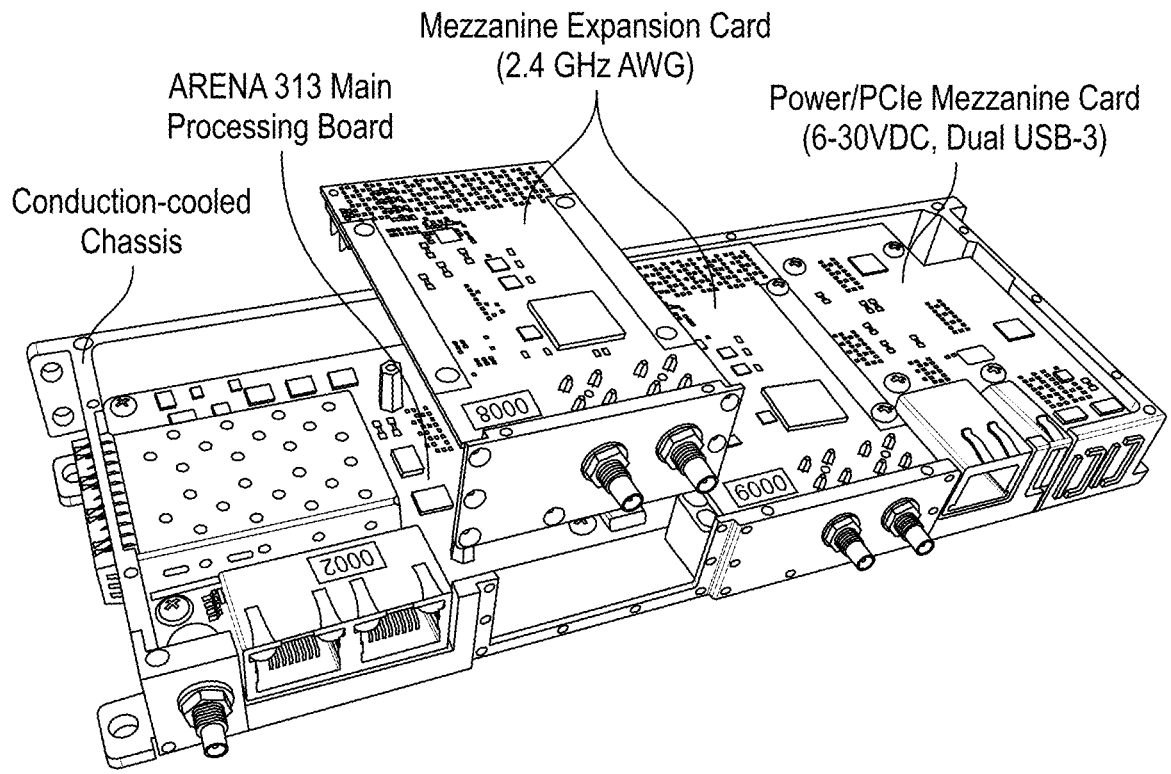
FIG. 1B: ARENA Hardware Sub Modules (ARENA 313 shown).

Referring to FIGS. 1A and 1B, at a hardware level, each module consists of a conduction cooled chassis; a main processor board with one or two high fidelity mezzanine expansion buses; and a power/PCIe mezzanine expansion bus. Based on the system's needs, an ARENA can be populated with a particular power/PCIe mezzanine card and mezzanine expansion card(s). The mezzanine buses and cards thus allow each ARENA to be reconfigured at the hardware level. Each module can run as a standalone unit or multiple modules can be combined and synchronized through sync ports to provide a solution for more complex problems. As such, the present modular solution can address an extremely broad range of applications and system requirements while requiring little to no customer custom development.

The main processor board and application logic includes the ability to recognize different hardware and assemble modular firmware and application code based on the hardware that is plugged into the main board (plug and play).

FIG. 1B shows an exemplary ARENA 313 module including the main Processing Board, a Power/PCIe Mezzanine Card with Dual USB3 portion, and 2 Mezzanine Expansion Cards (Arbitrary Waveform Generators (2.4 GHz AWG).

FIGS. 1C through 1G show block level diagrams of various exemplary modules and exemplary mezzanine cards.

Figure 1C:
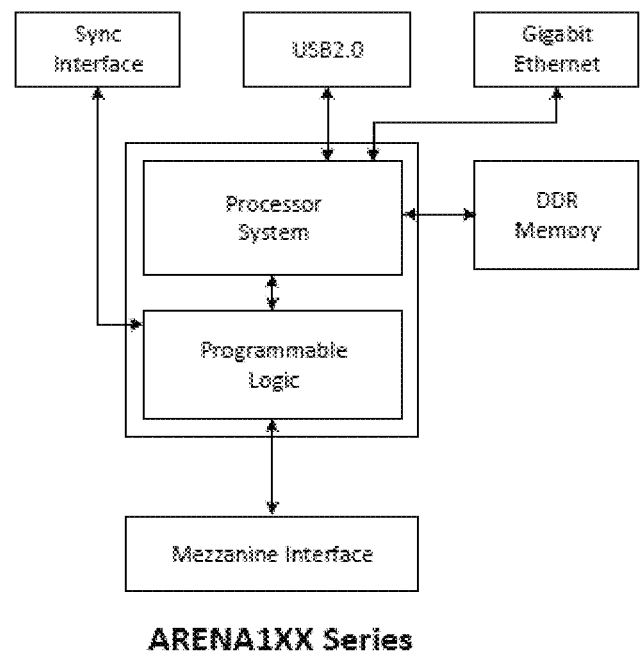
FIG. 1C: Block diagram of exemplary ARENA 1XX Series Module.

FIG. 1C illustrates a block diagram of a single mezzanine card module identified as an ARENA 103 module (See also FIG. 1A). The ARENA 103 module comprises a conduction cooled chassis, mother board including a system processor and programmable logic, on board DDR memory, USB 2.0 port, Gigabit ethernet interface, a mezzanine card interface port and a Sync interface (ethernet) for communication with other modules.

Figure 1D:
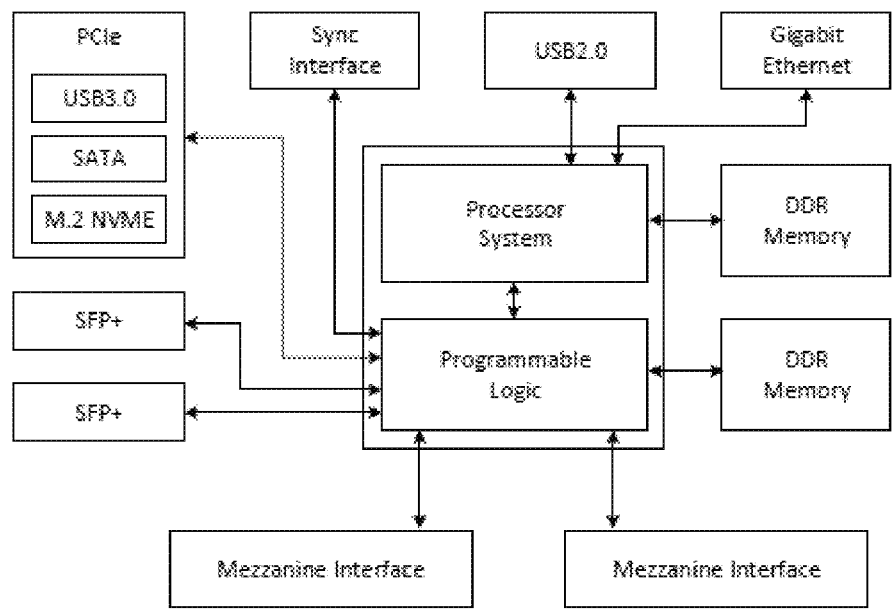
FIG. 1D: Block diagram of exemplary ARENA 3XX Series Module.

FIG. 1D illustrates a block diagram of a dual mezzanine card module identified as an ARENA 313 module (See also FIGS. 1A and 1B). The ARENA 313 module comprises a conduction cooled chassis, mother board including a system processor and programmable logic, on board DDR memory, USB 2.0 port, Gigabit ethernet interface, two mezzanine card interface ports, a Sync interface (ethernet) for communication with other modules, 2 SFP+ interface ports for high-speed data communication with external data storage or display, and a PCIe bus including dual USB3.0 ports, a SATA hard drive port and an M.2 NVME SSD hard drive.

Figure 1E:
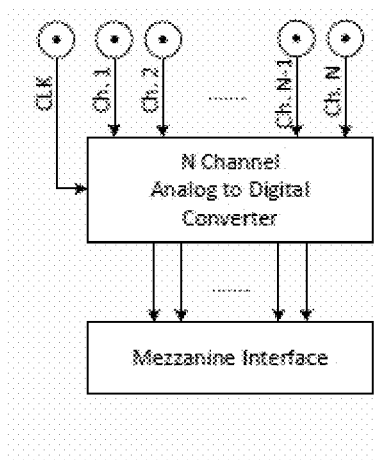
FIG. 1E: Block diagram of exemplary ARENA N-Channel Analog to Digital Converter Mezzanine Card.

FIG. 1E illustrates a block diagram of an N-Channel Analog to Digital Converter Mezzanine card including a mezzanine interface port which, in use, is seated into one of the mezzanine ports on one of the main modules, an N-Channel Analog to Digital converter having a signal input port (N-channel) (typically receives signal input from a radar antenna receiver) and a reference clock input port (see also FIGS. 1A and 1B).

Figure 1F:
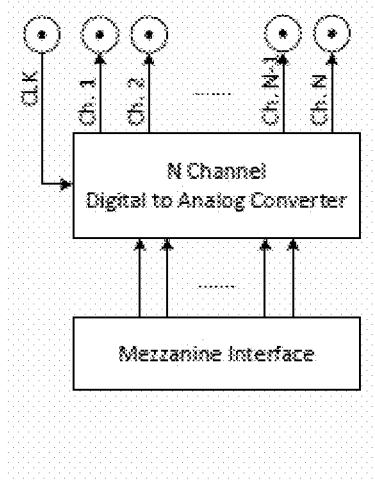
FIG. 1F: Block diagram of exemplary ARENA N-Channel Digital to Analog Converter Mezzanine Card.

FIG. 1F illustrates a block diagram of an N-Channel Digital to Analog Converter Mezzanine card including a mezzanine interface port, an N-Channel Digital to Analog converter having a signal output port (N-channel) (typically outputs signal waveform to a radar transmitter) and a reference clock input port (see also FIGS. 1A and 1B).

Figure 1G:
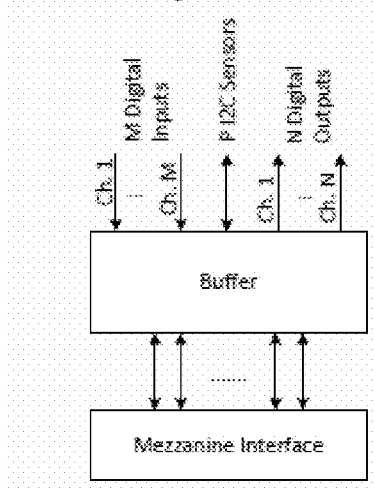
FIG. 1G: Block diagram of exemplary ARENA N-Channel I/O Mezzanine Card.

FIG. 1G illustrates a block diagram of an Input/Output (I/O) Mezzanine card including a mezzanine interface port, and a buffer processor having an M-Channel Digital input port, an N-Channel Digital Output port and a sensor port (such as an I$^2$C Sensor input port).

It should be noted that the above-described mezzanine cards are only examples of possible expansion cards. Any sub-system component can be integrated into a mezzanine card as long as it is provided with the appropriate firmware and communication protocols and XML configuration files so that it can be recognized by the ARENA main software application.

Turning now to FIGS. 2A through 2D, there are illustrated various exemplary embodiments of radar systems implementing the novel concepts, modules and methods of present invention.

FIG. 2A illustrates an S-Band Radar system implemented using an ARENA 313 (dual mezzanine) module configured as a Radar Transceiver. The ARENA 313 is provided with an Arbitrary Waveform Generator (AWG) mezzanine card outputting a waveform signal to an external Solid State Power Amplifier (SSPA) and Antenna through a Band Pass Filter (BPF). The ARENA 313 transceiver further includes a Digital Receiver & Pule Pair Mezzanine Card (ADC) (Signal Processing Card) which receives an input waveform from a receiver Antenna through a Low Noise Amplifier (LNA) and BPF. The S-Band Radar system further includes a separate Dual Synthesizer Module including a primary controller and a 10 MHz Oscillator (Controlled Crystal Oscillator) for timing and sequence control (clock reference). The Oscillator signal is split 3 ways and provided to ARENA 313 motherboard, an AWG Clock synthesizer for the AWG Mezzanine Card and an ADC Clock Synthesizer for the ADC Mezzanine Card. The clock reference signals are then provided to both mezzanine cards to synchronize waveform pulse signal output and receive. The Synthesizer and Transceiver modules are connected through their Sync ports. Data is stored on a connected SSD/USB storage device (USB3.0 or SATA connection through PCIe bus). Command and control is handled through a network interface port (1 GigE, etc.). The present configuration illustrates the ability of the system to provide an entire Radar Transceiver system in a small, configurable package with low SWAP.

FIG. 2B illustrates a slightly more complex Microwave/Millimeter-wave Radar Transceiver System again using an ARENA 313 (dual mezzanine) module configured as a Radar Transceiver, an ARENA Dual Synthesizer Clock Module and a second ARENA Synthesizer Module configured as a Local Oscillator (LO). The Microwave System generally includes the same configuration as the previous S-Band System with an ARENA 313 Transceiver and Dual Synthesizer Clock Reference Module. The Microwave system additionally includes a separate Local Oscillator (Tx/Rx LO) Module which is integrated with a Single SideBand Mixer (SSB) on the Transmitter side and an Image Reject Mixer (IR) on the Receive Side. The LO also Syncs with the Dual Synthesizer and receives the same 10 MHz clock reference. There are also additional Band Pass Filters (BPFs) on the amplifier side of the SSB and IR mixers.

FIG. 2C illustrates a Multi-Beam Landing Radar incorporating an ARENA-Based Digital Subsystem. On the right side of the diagram there is shown a plurality of front end Beam units with Transmit and Receive amplifiers. On the left side of the diagram is an ARENA configuration including an ARENA 313 Transceiver Module with an AWG Card and an ADC Receiver Card. The ARENA 313 is Synced with an ARENA 103 Module which operates as the Primary Sequence Controller for the system. Between the ARENA Sub-system and the Front End Beams is a Clock Distribution bus including Band Pass Filters on both the AWG and ADC sides and a Local Oscillator Subsystem (LO) as well as an SSB Mixer and IR Mixer and UP Converter and DOWN Converter Cards to handle signal traffic between the Front End Beams and the ARENA Modules.

This embodiment illustrates the ability of the ARENA modules to implement a highly complex Multi-Beam Radar configuration.

Turning to FIG. 2D there is illustrated a Phased-Array Terrain Interferometer Radar platform which is used in visualizing topography as a landing aid in Electronic Vision Vision Systems (EFVS). At the top left of the diagram there is shown a single Ka-Band waveform transmitter driven by a single ARENA 313 module configured with an AWG Mezzanine Card, and a Clock Reference Card. The waveform is passed through a Ka-Band Up Converter and an 8 W Amplifier (SSPA). The top middle to right of the diagram illustrates a plurality of Ka-Band receivers arranged in a phased array configuration spaced by a ½ wavelength. The receiver signals are passed to two separate ARENA 313 modules each configured with two Dual-Channel ADC Cards providing down conversion, filtering, and other waveform processing functions. A single ARENA 103 Control Module is configured with a CTU Mezzanine Card and acts as the Primary Sequence Controller for the system. The PSC ARENA is Synced with all 3 of the ARENA 313 modules through a Sync Distribution Bus (parallel). Output from the ARENA 313 Receiver modules is sent over SFP or GigE connections to an ARENA 313 signal processing module provided with a GPU Mezzanine Card and an I/O Mezzanine card. The Phased-Array system is more fully described in co-pending U.S. Provisional Patent Application No. 62/368,203, the entire contents of which are incorporated herein by reference. This phased-array terrain interferometer is a highly-complex radar configuration which is a primary example of how the ARENA system can be used as a building block for virtually any radar, or other highly complex digital sub-system.

Based on the overall needs of the system, each ARENA module can be configured with the appropriate Mezzanine cards with associated sub-functions, automatically self-assemble all of the operating applications and firmware and synchronize all of the various components.

What once took months of custom configuration and software development can now be assembly in fractions of the time. Additionally, with the ability to access and control operating parameters of each individual component and specify sequence control, interrupt, and output any system can be reconfigured, adjusted and optimized for any situation by simply accessing the user interface and making the needed parameter changes.

An overview and detailed description of the user interface and operating system follows.

1. Overview

Each module includes a synchronization interface (Sync interface) that operates in conjunction with a system reference clock to control the pulse intervals of signal transmissions. Where multiple modules are present, one sync interface can be configured as a master which generates the sync signal while the other modules take on the role of slaves which receive the sync signal. The sync interfaces support both serial and parallel signal distribution.

Within the main processor programmable logic, a primary sequence controller (PSC) controls the run-time behavior and timing of the modules. In multi-module configurations, any module can be designated to execute the functions of the PSC and the PSC communicates with the other connected modules through the Sync interface. In exemplary multi-module embodiments, a dedicated Control and Timing Unit (CTU) hosts the PSC. The PSC is governed by a PSC Table that defines the sequence of modes that should be executed and a period for each entry. The PSC table allows for internal repeat loops and it can be asynchronously interrupted with an interrupt sequence table and external trigger.

Each object within the system (both at the module and at the mezzanine level) has a Mode Configuration Table (MCT) object that defines for each Mode the configuration that should be used in the sequence. This allows each object to be reconfigured on a pulse-to-pulse basis.

Each software application is also modular and self-builds based on the system objects that are generated by the module and the run-time configuration objects.

One of the more critical features of the present system is the Digital Receiver Firmware provided in each ADC based mezzanine card. The "default" digital receiver implementation in the system provides the ability for each profile to send out ADC samples, digital receiver I & Q profile gates, range gates after the forward FFT (Fast Fourier Transform), range gates after the reverse FFT (i.e. match filter output) and range gates of the products (coherent averaging products and pulse pair products). This is novel and important because existing digital receiver processors only give access to one of these data types. The present system architecture allows the user, by mode and sub channel, to specify any of these outputs and multiple different outputs on each profile.

This implementation provides several advantages. 1) ADC data allows one to see the full bandwidth data before filtering. This allows linearity to be measured, allows for interfacing signals or desired signals outside of the digital receiver filtered band to be detected and analyzed (can even put the ADC data through the FFT processor to look at in in frequency domain). 2) Having both the digital receiver (DIGRX) and match filter data (rev FFT) provides digital receiver gates before the convolution with the reference so that they are uncontaminated by adjacent gates (i.e. range sidelobes) for extracting thermal noise gates, providing a direct sample of the chirp signal if an internal calibration loop is used and this direct sampled signal can be used as the reference function in the match filter, allows for detection and suppression of undesired signals prior to the match filter (custom window can be used to eliminate or suppress gates) so these signals are not spread out over the over gates through the convolution process, and much more. 3) Having access to the forward FFT allows for the spectrum to be seen to identify interference signals and/or undesired signals prior to full match filter processing, allows spectrum of internal calibration pulse to be analyzed and information used to improve range sidelobes through compensation in the reference function. It also supports directly "deramp" processing and much more. 4) Access to any of the data products prior to the Profile Processing allows for high temporal resolution products to be stored/analyzed while still being provided with the products such as accumulated lag 0, lag 1 and lag 2 (i.e. power, mean Doppler, spectral width), enables other downstream processing to be performed that needs the complex profile data, and much more.

2. Reconfigurability

Object Oriented System Architecture

To enable seamless reconfiguration, at all levels, the platform utilizes an object-oriented system architecture. The processes performed by each module, whether they are at the hardware, firmware and/or software levels, are broken down into encapsulated actions. Thus, the inputs and outputs governing, and resulting from, each action can be captured within an object, and the action itself becomes a method of the object. Each object encapsulates a particular function, process, data, etc and each object reports what it needs, which it provides, and the way it communicates. Each of the objects configuration options and run-time implementation are captured within XML elements which removes the need for software development by the end user and also documents the stats of the objects and system within each run. The XML object data enables self-reporting whereby the objects notify the system who they are so that the applications (such as the GUI) can self-build based on the information provided by each object.

Network centric communication (i.e. messaging) between objects is then achieved through a common "packet" based messaging scheme known as the ARENA intra-object communications API. Each packet is self-descriptive providing the intended receiver(s) with information to be able to parse and interpret the data/information within the packet. In this paradigm, each object can report what it needs and what it provides to allow the system to self-build, and objects can be linked together through the intra-object communications API, allowing complex processes to be performed by a collection of ARENA encapsulated objects.

Further, reconfigurability at every level is simply achieved through changing the objects' data (attributes). This is possible because the hardware and firmware layers, in addition to the software layers, are designed to encapsulate each action they implement, and the parameters controlling and/or driving the action are contained as the object's attributes. Thus, simply changing a hardware, firmware or software object's attributes changes its behavior (i.e. method output, communications with other objects). This approach is not entirely new in software (i.e. object-oriented languages), the difference here is that the ARENA hardware and firmware (i.e. system architecture) are also designed to be a collection of objects that can be combined to solve a broad range of problems.

To further facilitate ease of use and integration into a network environment, the attributes of each ARENA object are maintained within eXtensive Markup Language (XML) documents (herein will be referred to as XML objects). That is for each object, whether it is a hardware, firmware or software object, its attributes are contained within its XML object. Through the ARENA intra-object communications API, these XML objects share their information (i.e. attributes) with their parents and sibling objects enabling this information to propagate seamlessly throughout the system. To reconfigure an object (modify the action it performs), only the XML object's attributes need to be changed.

Combining this paradigm with ARENA's patent-pending ARENA Sync Bus (see Section 2) and ARENA's network centric design that facilities serial and parallel communication within an ARENA and between ARENAs and other subsystems, objects from an ARENA or multiple ARENAs can be combined and reconfigured to provide an optimal solution for each system, each application, each mission, each transmit-receive period. All of this is achieved through simple manipulation of the XML objects—no software changes or branches or complicated business logic needed for each reconfiguration.

Interface to the ARENA is based on the 802.3 (TCP/IP) communication standard allowing any network based appliance (computer, etc.) to communicate with the ARENA. The ARENA network data API includes profile, packet and time stamps with each packet to support link aggregation for its data output (e.g. it can stripe data across multiple interfaces)

Below two examples are given to further illustrate: 1) automatic system discovery and documentation and 2) digital receiver process and recording.

Automatic System Discovery and Documentation

The ARENA object-oriented system architecture allows ARENA modules contained within a system or systems to automatically report who they are, what they can provide and what they need. This allows the ARENA-based system to automatically report, from the mezzanine hardware level all the way through the system software levels, its objects and their relationships in order to discover the deployed architecture of any ARENA-based system.

FIG. 3 diagrams the objects, their attributes and their relationships that facilitate automatic self-discovery. There are three primary levels: System (green), ARENA (cyan) and ARENA mezzanine (yellow). The system, as shown, is comprised of N ARENA modules, and each ARENA modules has up to M mezzanine cards. Note N and M do not need to be known ahead of time. There may also be system level objects that are not ARENA modules, such as a GPS receiver/inertial navigation system (INS). Simple add-on ARENA applications can be used and deployed with these subsystems, or XML objects may be constructed for them, to enable them to also behave as ARENA object-oriented modules.

In a traditional system, the deployed architecture would have to be known prior and embedded into the system level software applications. This results in a solution that is very specific for each deployment. With an ARENA-based system, this is not required because the system architecture can be automatically "discovered," and all ARENA applications are designed to self-build based on the system's objects that are present. In this manner, no software development (i.e. programming) is needed, no matter the system architecture or changes to it.

The ARENA application responsible for capturing the system architecture through self-discovery process is the arenaSystemGUI application. This application issues the "ARENA discovery" request. This is a simple network broadcast packet, and as such, the application does not need to know the network topology to communicate with the ARENA-based subsystems and their objects. Each ARENA subsystem/module receiving the broadcast packet executes its own self-discovery process and reports back all of its objects, child objects and their child objects. Starting at the ARENA level, the ARENA's Main Board object reports its system attributes: model ID, serial number (S/N) and operating system (OS) version. The ARENA Main Board object communicates with its child objects, such as its NIC (network interfaces) Objects, Power/PCIe Mezzanine Expansion Bus objects and Mezzanine Expansion Bus objects. In turn these objects report their system attributes and also that of their children. For example, a NIC object would report its type, settings (e.g. IP address and routing), and a Mezzanine Expansion Bus object would report its bus ID and the type and version number of the mezzanine expansion card that is plugged into it. From this information, the arenaSystemGUI compiles the system architecture object that describes all the objects present, their needs, what they provide and their relationships. It also allows the user to change any of the system attributes of any object, such as a NIC object's system attributes: IP address, netmask, routing tables, NTP server IPs and DNS server IPs of a NIC object. Once attribute of an object is changed and committed, that object executes the necessary method to update itself, if required. Besides ARENA modules, ARENA applications, such as the ARENA network data acquisition and relay application, called arenaDAQ, also report their objects. Non-ARENA subsystems, such as a GPS receiver or a positioner, can be use the arenaSystemObject application to report their system attributes or a XML document (models the subsystem as an ARENA like module) can be included in a directory that the arenaSystemGUI is instructed to search.

Configuration Through Objects

To demonstrate how the system architecture object is used, the main arena control and configuration graphical user interface (GUI) application called the arenaGUI is briefly described below. At launch, the arenaGUI requests the system architecture object (XML object) attributes and uses this information to build itself. It presents tabs at the different levels (i.e. System, ARENA and ARENA mezzanine) for each subsystem reported by the system architecture object and the corresponding controls, fields, forms, menus, etc. It allows the user to configure and link the run-time actions of these objects (e.g. digital receiver channel and its processes); reports status and health data; controls the operation state (e.g. closed, open, . . . , run) at each level; and documents operations. This application and its features will be discussed in detailed in Sections 3 and 4.

FIG. 4 presents arenaGUI with the system tab selected in (a) and a mezzanine expansion card tab (TXCVR 1's AWG mezzanine expansion card) selected in (b) as examples. Note that this graphical interface was automatically built when launched based solely on the system architecture XML object that was constructed by the arenaSystemGUI. For this deployment, there are system level objects (GPS NEMA data stream and azimuth positioner), ARENA level objects (Ctrl and Timing Unit, TXCVR1, TXCVR 2, DAQ) and mezzanine level objects (AWG and DIGRX) shown under the TXCVR 1 tab that is selected in (b). This approach allows the same code base (e.g. arenaGUI) to be used for any ARENA platform based solution without requiring any customization.

Digital Receiver Configuration through Objects

To further demonstrate the ARENA object-oriented system architecture, an example of how digital receiver processing is broken down into encapsulated actions/objects is given. The purpose of a digital receiver is to sample the receive signal (i.e. receive profile), convert it from an analog signal to a digital signal; down convert the signal to its complex baseband representation; implement bandpass filtering (i.e. low pass/video filtering of the complex baseband signal) and decimation; match filter the signal (e.g. pulse compression); and perform additional processing, such as extracting the Doppler profile (e.g. Pulse-Pair processing). Depending on the system, some or all of these processes may be needed. Once again, the traditional approach is to implement the full processing chain that is required for the system it is servicing making the solution very specific for that system. For example, it may be designed for a particular ADC (i.e. sampling rate), or for a pulse radar, or for a frequency domain radar (i.e. FMCW radar) or a system with only two channels, or for a system that utilizes sub channels (multiple simultaneous returns processed into different frequency bands), etc. A solution for one of these is not appropriate for another when implemented as a full processing chain.

Figures 5, 6:
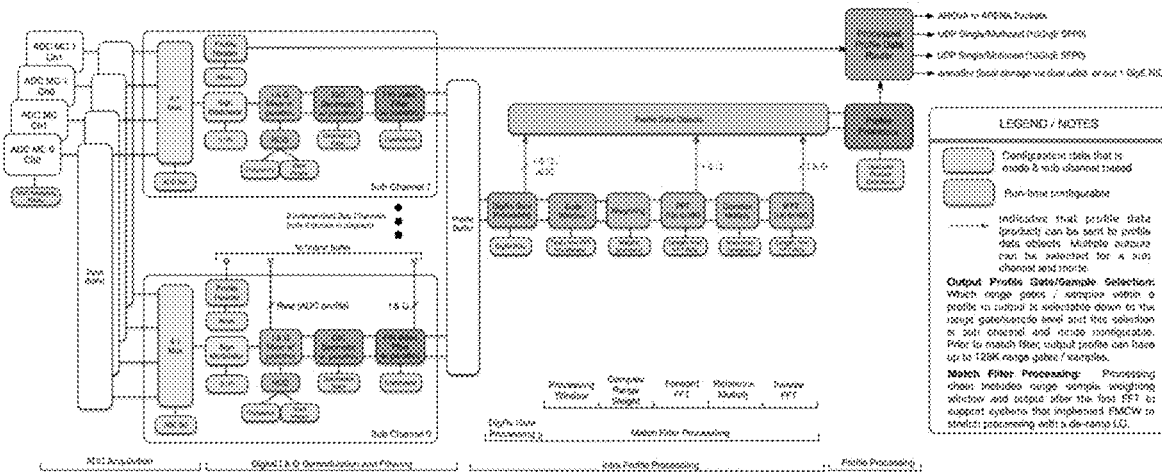
FIG. 5: Block diagram of the ARENA default digital receiver process supporting up to four analog receive channels and eight sub channels.
FIG. 6: arenaGUI screen capture showing attributes of some of the digital receiver objects.

With the network-centric and object-oriented architecture of the ARENA, the "math" described above can be broken down into encapsulated actions and each action represented by an object. This allows the processing chain to be combined in multiple ways to support all the types of radars mentioned above and more. FIG. 3 presents a block diagram that constructs this process using the patent-pending ARENA object-oriented system architecture approach and network centric design. As depicted it supports up to four analog receive channels and eight sub channels, but it is not limited to these number of channels. The yellow and light green boxes represent the attributes of each object and the boxes they are attached to represent the method(s) that the object implements. The objects are: ADC (four of them), ADC router (4:1 mux), sign modulator, I & Q demodulator, decimator, video filter, noise gate processing, amplitude weighting, forward fast Fourier transform (FFT), complex reference function multiplier, inverse FFT and Pulse-Pair processor. With the exception of the ADC and ADC router objects, each object is replicated multiple times to support the maximum number of simultaneous sub channels needed. The attributes for each object are contained with their XML object and can be changed (reconfigured) even on a profile to profile basis. For example, from a pulse to pulse basis, the NCO frequency of the complex demodulator can change to support pulse-to-pulse frequency hopping or can be adjusted to remove Doppler effects caused by platform motion. Furthermore, the output of any object may be sent to the data router object as an encapsulated message (packet). The Data Router object's attributes then instruct it where and how to send the data. At the same time, these same data may continue down the processing chain. With this architecture, simply changing the attributes of these objects enables the ARENA platform to support any type of digital receiver processing without requiring specific software and/or firmware changes. FIG. 6 shows an arenaGUI configuration window that presents and allows the attributes of the digital receiver objects associated with the ADC routing and down conversion process for sub channel object 0 to be changed. Note that the concept of mode will be explained in the next section. The other tabs present the attributes of other digital receiver objects and allow them to be changed as well.

ARENA Synchronization

The ARENA object oriented system architecture, network centric design and modularity enable an ARENA platform based digital subsystem to be reconfigured at the hardware, firmware and software layers in order meet the specific needs and requirements of the system it serves. As described in the previous section, the behavior of any ARENA object can be changed (reconfigured) by modifying the object's attributes (i.e. its XML object). This alone provides enormous advantages but is a "static" solution. To enable synchronized reconfigurability on a pulse-to-pulse (e.g. from transmit-receive to transmit-receive period), the ARENA platform utilizes its ARENA Synchronization method. Each ARENA module has an ARENA Sync Interface. This interface is comprised of four signals:

System Reference Clock: System clock (nominally 10 MHz) that all system oscillators are phased locked to if PLOs are used. It is delivered to each ARENA module via LVDS signal within the Sync LVDS interface or the 50-ohm Sync clock interface (selection is an attribute of the ARENA main board object).

Sync Pulse: An LVDS signal within the Sync LVDS interface that represents the beginning of a period (e.g. transmit-receive period).

Sync Packet: Serial communication within the Sync LVDS interface that provides the "Mode ID" word for current period followed by optional high speed serial data. Mode ID word will be further explained below.

Pulse Per Second (PPS): A LVDS signal within the Sync LVDS interface that is synchronized to the System Reference Clock and is the pulse per second signal from a GPS receiver marking the second transition.

The System Reference Clock and Sync Pulse allows for precise alignment of all module triggers for synchronous operation. The Sync Pulse and Sync Packet enable synchronization of the behavior (reconfiguration) of each ARENA object on a pulse-to-pulse basis. The ARENA Primary Sequence Controller (PSC), which is described in detail below, issues the Sync Pulse and "Mode ID" word over the Sync Packet. The Sync Pulse marks the beginning of the next period (i.e. transmit-receiver period). The Mode ID word is a pointer that instructs each object which of its configurations to use. That is, rather than an object with attributes that represent a single configuration, an ARENA object can have a mode configuration table (MCT). Each row in the table contains a particular configuration. The Mode ID word is a pointer to which row in the MCT to use. When the Mode ID word is received, the ARENA object's method is driven by the attributes in the row of its MCT that the Mode ID word references. In this manner, an ARENA object is reconfigurable on a pulse-to-pulse basis. Note that the MCT table entries can be double buffered to allow them also to be changed on the fly to provide a dynamic MCT for the ARENA object.

Primary Sequence Controller (PSC)

The Primary Sequence Controller (PSC) governs the run-time behavior and timing of the ARENA modules. Any ARENA module can be designated (configured) to execute, a.k.a. host, the PSC; and the PSC communicates with all ARENA modules through the ARENA Sync interface. Typically, the ARENA Control and Timing Unit (CTU) hosts the PSC.

The PSC is responsible for generating the Sync pulse and the Mode ID. The Sync pulse marks the beginning of the transmit-receive period. The Mode ID is an 8-bit pointer (some instances it has been expanded to 12 or 16-bits) that is used by each ARENA module as an index to its Mode Configuration Table (MCT). Each row (i.e. index) of the MCT points to a specific configuration. Section 3 will describe the MCT for each type of ARENA module and object.

At the core of the PSC is the Primary Sequence Table (PST). This table supports sequences from 0 to 255 (256 modes, expandable out to 16-bits—65536 modes). Each entry has a unique sequence ID, which is incremented by 1 for each new entry in the table; a Mode ID; and a Period (specified in μsec). The Mode ID and Period do not need to be unique from Sequence ID to Sequence ID, nor does the same Period always need to be specified for a particular Mode ID.

Figures 7, 8, 9:
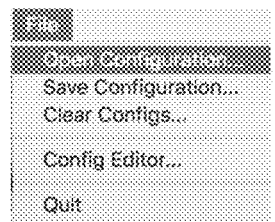
FIG. 7: Example of PST where noise only profile is obtained upon receiving an interrupt signal.
FIG. 8: Example of PST that uses repeat feature to capture thermal noise profile once per second.
FIG. 9: arenaGUI "File" pull down menu. Open Configuration . . . is selected.

FIG. 7 shows a screen capture of the PST, which is a sequence of 1. When the ARENAs are placed in the Run operation state, the PSC sends out a Sync pulse every 200 μsec and instructs the ARENA modules to use their Mode ID 0 configuration. User can provide a "Name" as well, which will be stored in the configuration object (Name is set to TxRx in this example). Name is only a label to allow the user to provide a description that is meaningful to the user (also will be stored in run-time configuration file that is linked to corresponding data files that are captured). Since this sequence is defined as "Interruptible," upon receiving the interrupt signal, the PSC will execute the Interrupt Sequence Table (IST) at the completion of the Sequence ID period currently being executed. In the case presented by FIG. 7, the interrupt sequence will execute a single Mode 1 once with a 200 μsec period (Name: NoiseOnly). After completing the IST, the PSC returns to the PST at the point it left off.

FIG. 8 presents a slightly different approach. Rather than acquiring a "NoiseOnly" profile based on an interrupt signal, the PST can be configured for acquiring a "NoiseOnly" profile periodically. In FIG. 8, the PST will provide "NoiseOnly" profiles once per second. Sequence ID 0 instructs all ARENAs to use Mode ID 0 (Tx-Rx mode) and repeat this mode an additional 4,998 times (i.e. executed 4,999 times in all). Then for the 5000th profile, the ARENA modules are instructed to use Mode ID 1 (NoiseOnly) for a single period. After NoiseOnly mode is executed, the PSC returns to the top of the PST and continuous to run. With the period of both PST indexes set to 200 μsec, this results in NoiseOnly mode being executed every 1 second.

In short, the PSC cycles through the PST according to its instructions and thus controls the behavior and timing of all ARENAs listening on the Sync interface. This is accomplished by simply modifying the attributes of the PST object (i.e. its XML object). Complex loop and interrupt sequences can easily be constructed. Nested loops, currently not implemented, will be supported in the next release. Section 3 details on how to create, view and modify the PST, MSTs and other ARENA objects. Section 4 will provide instructions on how to select configuration objects for execution at run-time and will explain the different run-time levels and how to execute them.

3. ARENA Config Editor

The ARENA Config Editor provides a graphical user interface (GUI) to create, modify, view and save ARENA configuration objects. These objects include, but are not limited to, the Primary Sequence Tables, Mode Configuration Tables, Data Sockets, Digital Receivers, Waveform Generators and Recorders. This section will provide instructions on running the ARENA Config Editor and will present the different objects and their attributes. Since the ARENA has a large family of mezzanine cards each with different capabilities, the reader is referred to the documents for each mezzanine card (MC) for complete description. In this section, a multi-ARENA system comprised of:

ARENA 103 with Control and Timing Unit (CTU) V.0003 MC;

ARENA 313 with AD9129 Digital to Converter (DAC) V.0012 MC and ADS42lb69 Analog to Digital Converter (ADC) V.0010 MC;

ARENA 313 with AD9129 Digital to Converter (DAC) V.000A MC; and ADS42lb69 Analog to Digital Converter (ADC) V.0010 MC;

is presented to illustrate how to create, modify, view and save configuration objects using the ARENA Config Editor that is a tool within the arenaGUI application.

Running the ARENA Config Editor

The ARENA Config Editor is part of the ARENA GUI application called arenaGUI. The arenaGUI application is found under the directory:

<deploymentPath>/arenaUserApps/arenaGUI where:

<deploymentPath> is the path location where the arenaUserApps directory resides.

The arenaGUI application can be called from any directory by using the full path. The only requirement is that the system.xml file exists in the directory from which the arenaGUI is being called. The system.xml can be a softlink to the actual system configuration file that can reside anywhere on the file system. The system.xml file provides the arenaGUI application with a description of the deployed ARENA hardware and network configurations. As described above, the arenaSystemGUI can automatically construct the system.xml file and allow the user to modify it.

To run the arenaGUI application, the syntax is:

<deploymentPath>/arenaUserApps/arenaGUI <configuration file> where:

<configuration file> is an xml file that describes the ARENA configuration objects and run-time configuration.

Alternatively, the application can be called without specifying a configuration file, and using the File menu option: Open Configuration. FIG. 9 shows the File menu with "Open Configuration" selected. Depending on the operating system, the File menu will be either at the top of the areaGUI application window (e.g. Linux OS) or in the menu bar (e.g. OS X) which is located at the top of the desktop. This option opens a file browser window for selecting a configuration file. Likewise, at any point, Open Configuration can be used to open a different configuration file or to restore to the saved version of the current configuration file.

File Menu on Main GUI Window

Figure 10:
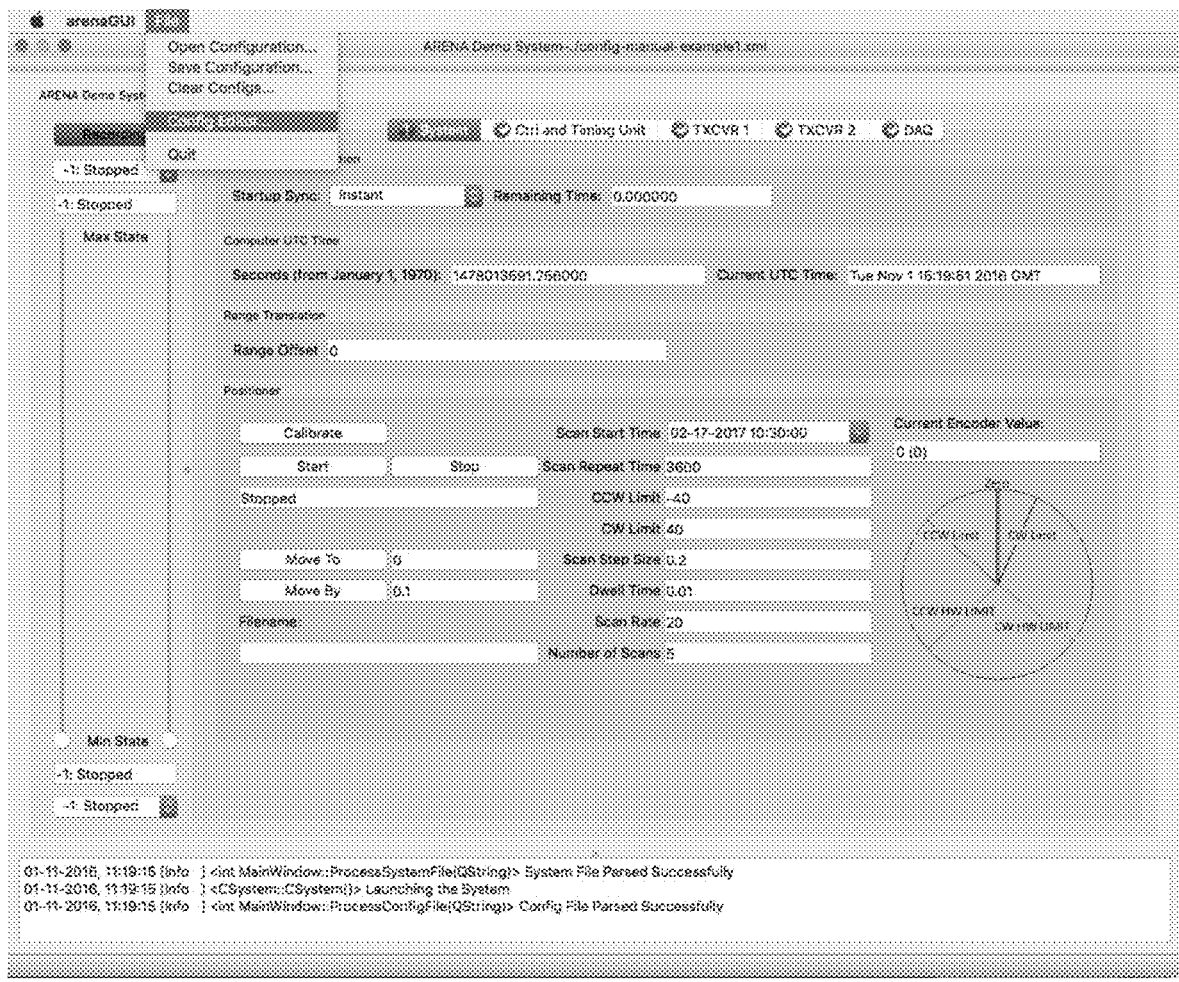
FIG. 10: arenaGUI main window is shown. The "File" menu has been clicked and option: Config Editor from main arenaGUI window

FIG. 10 shows the main window of the arenaGUI application when it is executed. A full description of the main window is provided in Section 4. The File menu has been selected. It has the following options:

Open Configuration: Described above.

Save Configuration: Provides a window to select or name the configuration file and select the directory to save it under.

Clear Configs: Clears the current configuration information.

Config Editor: Provides an interface to create, edit and view the ARENA configuration objects.

Quit: Close arenaGUI application.

Note: The loaded configuration filepath is shown in the title bar of the application. In this example the configuration filepath is: ./config-manual-example1.xml.

Config Editor Option under File Menu

Figure 11:
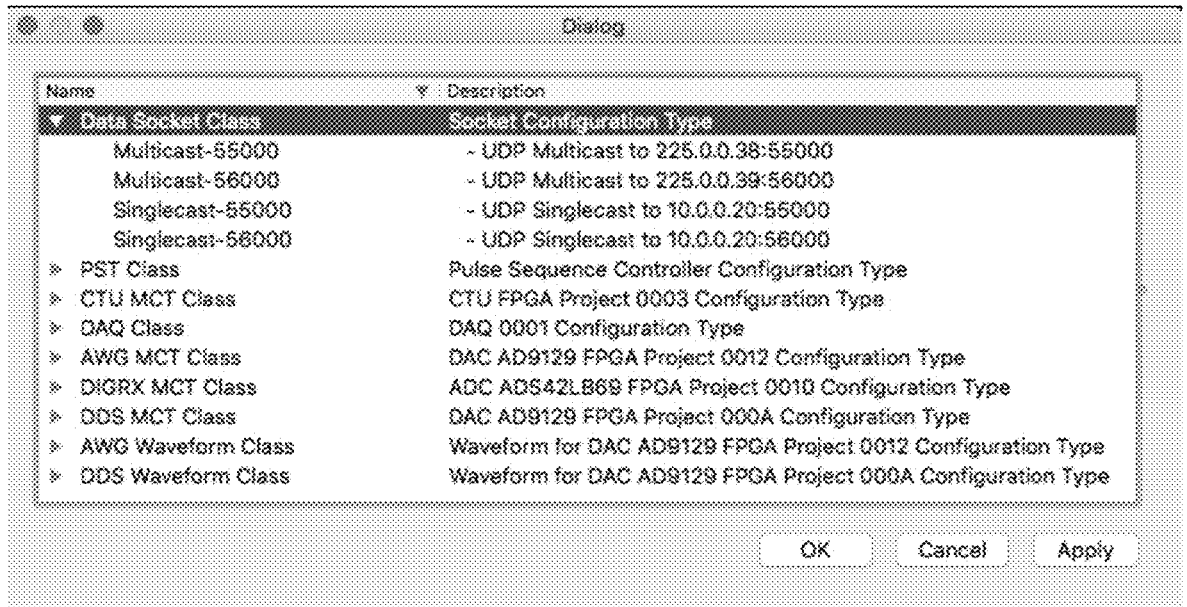
FIG. 11: Config Editor window is shown. Each configuration class and its instantiated (defined) configuration objects are shown when the Config Editor window is launched.

The Config Editor provides an interface to view, modify and add configuration objects. When the Config Editor is selected from the File Menu, the Config Editor window launches. FIG. 11 shows this window. On the left side, a tree lists the ARENA classes (note that right side is initially collapsed). The configuration classes are automatically detected from the system.xml object and populated in the left frame. For each class, configuration objects can be viewed, added, deleted or modified through this editor. If a configuration file is loaded, objects belonging to different classes are automatically populated in the tree under their class.

In this example provided, there are nine configuration classes: Data Socket Class, Primary Sequence Table (PST) Class, Control and Timing Unit (CTU) Mode Configuration Table (MCT) Class, Data Acquisition (DAQ) Class, Arbitrary Waveform Generator (AWG) MCT Class, Digital Receiver (DIGRX) MCT Class, Direct Digital Synthesizer (DDS) MCT Class, AWG Waveform Class and DDS Waveform Class. The Data Socket Class is expanded to show its instantiated objects: Multicast-55000, Multicast-56000, Singlecast-55000 and SingleCast-56000.

To make the class names user readable and meaningful, the default class names can be renamed using an alternative name (i.e. alias). These aliases are defined by the user within the system configuration file using "<altName>" element. For example, the alias: Data Socket Class, is the socket class and was defined by inserting the following in the configuration file: <altName type="socket">Data Socket Class</altName>, at the beginning of the <configs> document.

| In FIG. 11, the following aliases were used: | |
|---|---|
| socket: | Data Socket Class |
| psc_0001: | PST Class |
| ctu_0003: | CTU MCT Class |
| daq_0001: | DAQ Class |
| dac-ad9129_0012: | AWG MCT Class |
| adc-ads42lb69_0010: | DIGRX MCT Class |
| dac-ad9129_000A: | DDS MCT Class |
| dac-ad9129_0012_waveform: | AWG Waveform Class |
| dac-ad9129_000A_waveform | DDS Waveform Class |

Configuration objects can be selected by the run-time configuration interface (see Section 4 for more information about run-time configuration), or in some instances, configuration objects become a child of another configuration object (e.g. an AWG Waveform Class configuration object can be assigned as a child object of the AWG MCT Class configuration object).

On the right side of this frame is the Description field. Classes have fixed description fields that are automatically loaded and not editable. However, a description may be entered for each configuration object of a class that is added. For example, for the configuration object: Multicast-55000, the description below was added by double left clicking on the field:

UDP Multicast to 225.0.0.38:55000

These can be changed without affecting operation, as they are essentially a comment field for user information purposes only. This information is also contained within the run-time configuration object that is archived with the data that are recorded by the arenaDAQ application in order to document the state of the system at when the data was recorded and to provide ancillary information for data interpretation.

Adding, Copying, Deleting Objects

To add a new object to a class, the pointer can be placed over the class name, and then by right clicking an "ADD" menu will appear.

Figure 12:
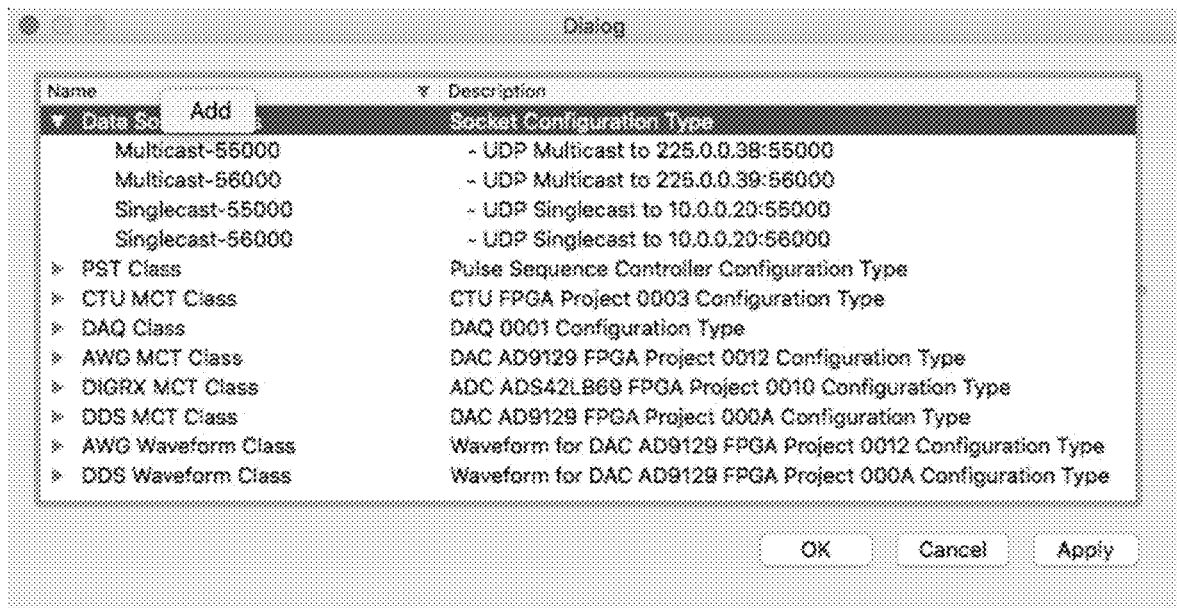
FIG. 12: Example of the Add menu is shown. This is the same for all objects.
Figure 13:
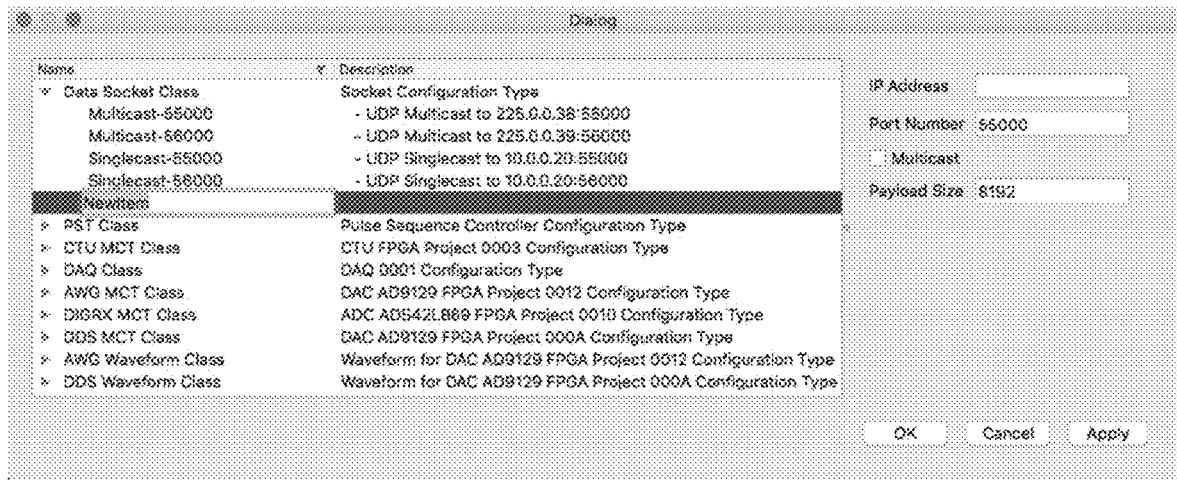
FIG. 13: Data Socket object, NewItem, has been added. Double click on its name in order to edit.

FIG. 12 shows an example where a configuration object is being added to the Data Socket class (Add is selected). The ADD option is selected and a new object with the default name "NewItem" is created (see FIG. 13). The name field has been double (left) clicked in the example shown so that its current name, NewItem, can be renamed to an appropriate name. When a configuration object is selected, its attributes are displaced in the right panel as illustrated in FIG. 13.

Figure 14:
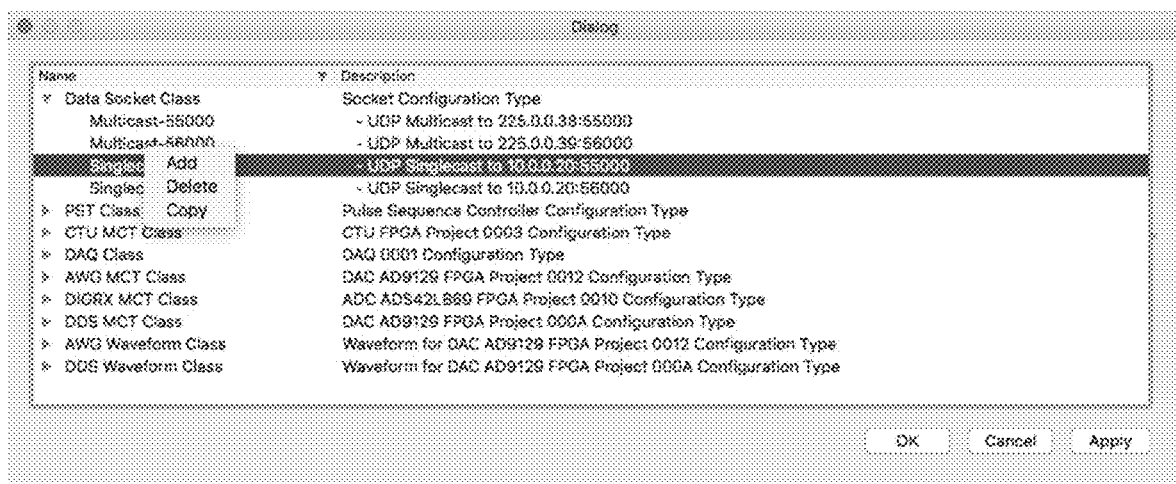
FIG. 14: An example of the Add-Delete-Copy menu is shown. This is the same for all objects.

To delete or copy an existing object, move the pointer over that object's name field and right click. The menu shown in FIG. 14 will appear. If you select Delete, the highlighted object, in this case "Singlecast-55000" configuration object, will be deleted. If you select Copy, a new object under that class with the same name as the highlighted one but with a "." appended to it will be created. The new object will have the same attributes as the highlighted object. The Add option presented in the menu options is the same as that described above.

ARENA Configuration Objects Classes

Below the purpose and attributes of the objects under each class are presented.

Data Socket Class and Objects

An object belonging to the Data Socket Objects class contains the data socket definition that can be used by ARENA modules to send data to the ARENA Data Acquisition Servers, ARENA Display applications and other servers & applications that require ARENA processed data (e.g. ARENA Digital Receiver profile data).

Figure 15:
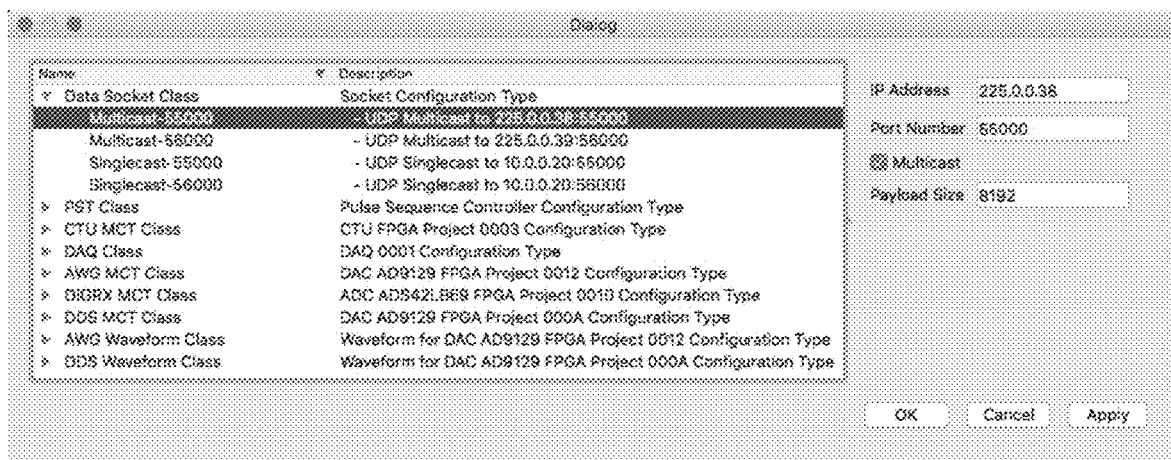
FIG. 15: Data Socket object, "Multicast—55000", has been selected. Its attributes are shown in the right panel. These values are editable.

To view and/or edit existing objects under the Data Socket Objects class, left click on the object. An example is given in FIG. 15 The object "Multicast—55000" has been selected, and in response, a right panel has appeared showing the object's attributes, which are:

IP Address: Destination Internet Protocol (IP) address for the data socket. If multicast socket is used, this value should fall within 225.0.0.1 to 238.255.255.255. As shown it has been assigned 225.0.0.38.

Port Number: Destination port number of the socket. Typically, this value should fall within the range: 49152-65535, which have been defined by the Internet Corporation of Assigned Names and Numbers (ICANN) as dynamic port numbers (i.e. have not been assigned to an application class). Note that the ARENA platform a required to use port numbers within this range. As shown it has been assigned 55000.

Multicast: Check this box to use UDP multicast, otherwise the socket will be UDP unicast. UDP multicast allows multiple servers and applications to receive the same packet data. Network switches send a copy of a multicast packet to all their ports so any network device connected to the switch may receive the same packet. Multicast has been selected in this case.

Payload Size: This is the size of the data payload (does not include packet header). The maximum value is 65536 bytes. As shown, it has been assigned a value of 8192 bytes. This allows for optimization of data transmission over the network(s).

If any of the attributes have changed, the object's name will be displayed in bold font to alert the user that changes need to be applied. To apply the changes, click the Apply button in the lower right section of the window. The bold face text will return to a normal font indicating the changes have been applied. Note that these changes have not been saved until the user selects and executes the Save option on the GUI's File menu. Also, if changes cause conflicts with other modules or configurations, the font describing the names of the objects affected will change to bold, and in the main GUI, a red circle with a white exclamation mark in the tabs of affected run-time configurations will appear to notify the user. The latter alerts will be discussed further in Section 4.

Primary Sequence Table (PST) Class and Objects

A configuration object belonging to the PST class contains a primary sequence table. The purpose of the PST was described in Section 2. Below a description of the object's attributes is given:

Primary Sequence: PST table that supports sequences up to 256 (expandable to 65536). Each entry (row) has the following attributes (columns):

Index: Sequence ID number which automatically increments by 1 starting at a value of 0. Maximum value is 255. Future release will allow an Add/Copy/Delete feature rather than presenting full table with unfilled rows.

Name: Optional attribute allowing a text description for the Sequence ID to be entered.

Mode: Mode ID to be assigned.

Period: The transmit-receive period before executing the next line (or going to the repeat location) in the table. The length is specified in usec. For a radar this is normally referred to as the pulse repetition interval.

Repeat To: Sequence ID representing the start Sequence ID of a repeat sequence. Must be equal to or less than the Sequence ID of that row.

Repeat Count: Number of repeat cycles from the Repeat To Sequence ID to the Sequence ID of the current row to be executed before continuing to the next entry in the PST.

Interrupt Sequence: Contains the Interrupt Sequence Table (IST) whose columns (attributes) are defined in the same manner as above. Also contains a check box, "Interrupt Enable" that must be selected for the IST to be executed when an interrupt is detected. The IST supports up to 256 entries (identical to the PST, expandable to 65536).

Figure 16:
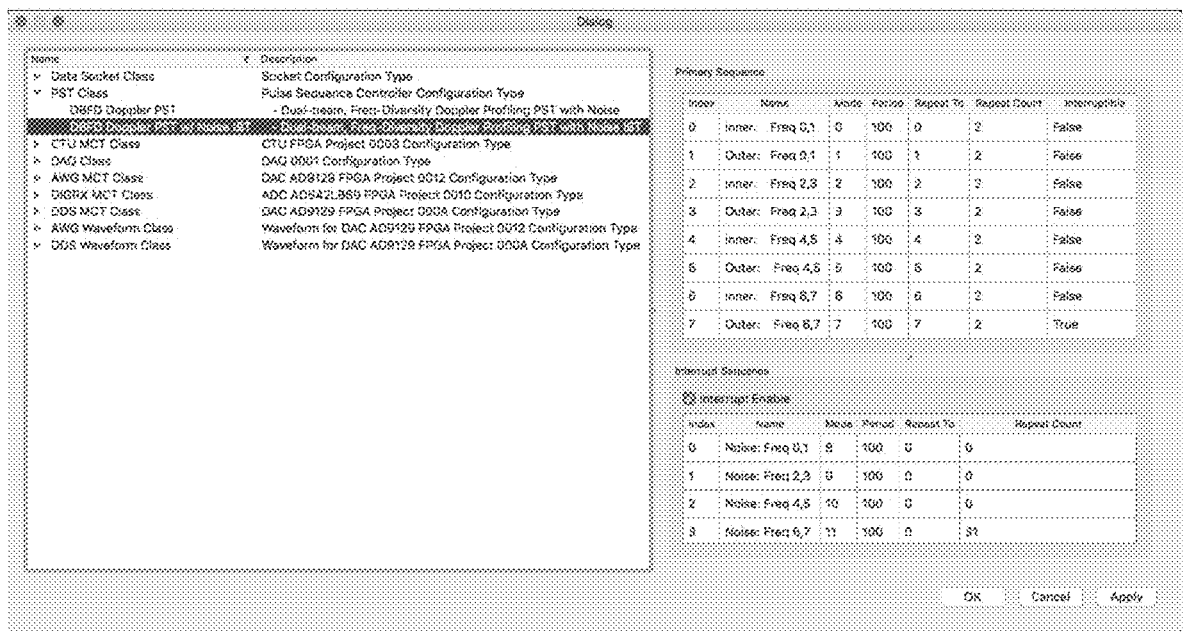
FIG. 16: An object belonging to the PST Objects class has been selected. Its attributes are shown in the right panel. Two PST objects have been created in this case.

FIG. 16 shows the configuration object, DBFD Doppler PST w/Noise IST, belonging to the PST class. Its attributes are displayed in the right panel. The primary sequence has 8 entries. Each entry is executed three times before going to the next item in the table (initial execution and then repeated twice). This PST configuration object is for a Doppler radar that has two beams and frequency hops between four sets of frequencies. Each entry is repeated three times, in order to measure the zero, first and second lags of the Doppler spectrum with a pulse-pair algorithm. The last item (#7) in the table is interruptible. Upon receiving an interrupt, the primary sequence controller continues through the PST until it has completed executing index 7 which is marked interruptible. At this point it executes the interrupt sequence table (IST). In this case, the IST has four entries in its table which it steps through executing the whole table 32 times before returning to the PST. Note that a future release will permit specifying a return to location with each interrupt specifying where in the PST it should return to when completing the IST.

Figure 17:
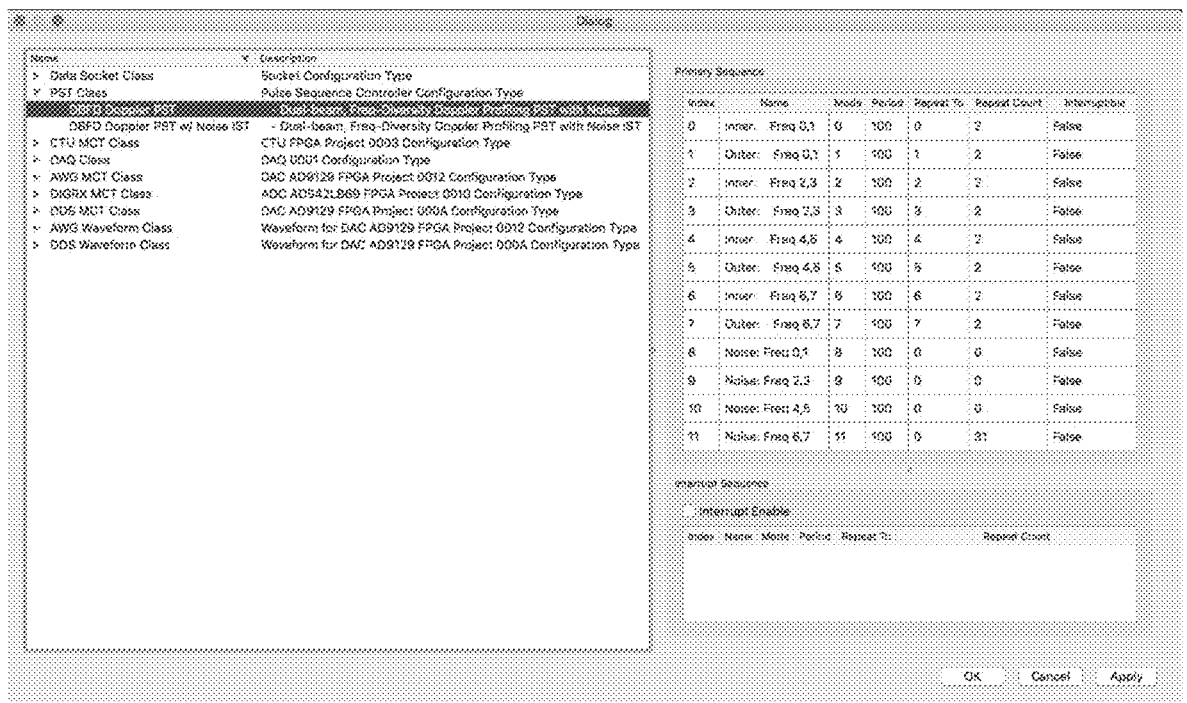
FIG. 17: Similar PST configuration object but without IST.

FIG. 17 presents the other PST configuration object listed in FIG. 16: DBFD Doppler PST. It is similar to the previous example except the "noise" profiles are part of the PST rather than executed by the IST. They are repeated as a group a total of three times each past through the PST.

CTU MCT Class and Objects

A configuration object belonging to the CTU MCT class contains CTU MCT. The CTU MCT is responsible for issuing timing signals for each mode (Mode ID). It is also responsible for handling the single ended and differential input TTL signals, such as the PPS (Pulse Per Second) signal and incremental encoder. Below, Mode ID dependent CTU MCT and its child objects are detailed. They are presented by the GUI in seven separate tabs: Outputs, Validation, PPS Select, PSC Intr. Select, Encoder Select, Alias and Sensors. The Alias tab is discussed first and then the other tabs are presented in order of their presentation in the Config Editor GUI.

Alias

Figure 18:
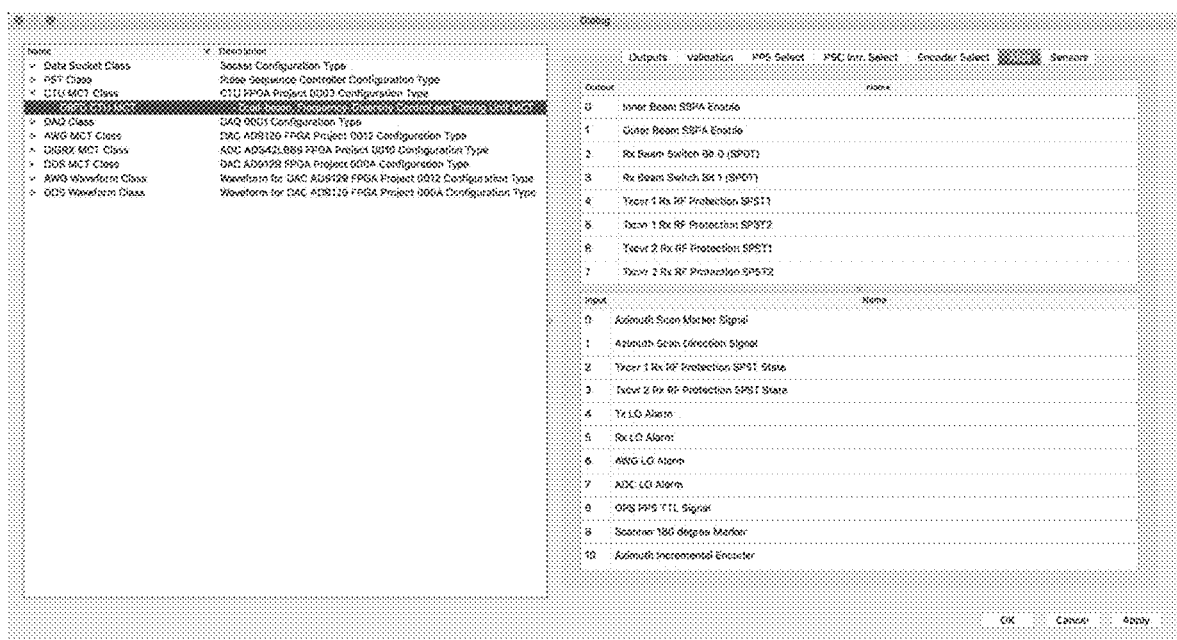
FIG. 18: An object belonging to the CTU MCT Objects class has been selected and its Alias attributes are displayed in the right panel.

The Alias child object can be viewed and modified by left clicking on the Alias tab. It allows the user to define a name for each input and output signal. FIG. 18 shows the Alias attributes tab of the selected configuration object, DBFD CTU MCT. In the right panel, the CTU outputs and inputs have been assigned names. If no name is assigned, the default naming convention is Output<N> for output signal N and Input<N> for input signal N. An output or input may be renamed by double (left) clicking on the Name field and typing in the desired name. The Apply button should be clicked after completing the renaming process. The standard ARENA CTU mezzanine card supports ten TTL single ended inputs and outputs (numbers 0 through 9) and six differential inputs and outputs (numbers 10 through 15). In this example, there are eight signal ended TTL output signals defined, 10 single ended TTL input signals and one differential input signal.

Outputs

Figure 19:
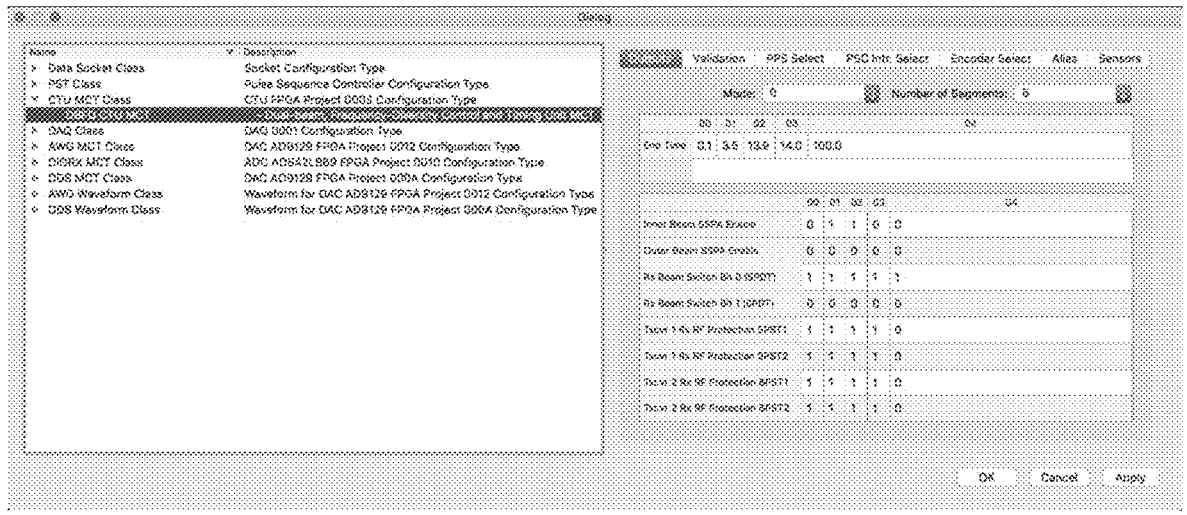
FIG. 19: An object belonging to the CTU MCT Objects class has been selected and its Output MCT child object's attributes are displayed in the right panel. Mode ID selected is 0.

FIG. 19 presents the Outputs child object of the DBFD CTU MCT configuration object (Outputs Tab selected). In this example, Mode ID 0 is selected and the Output Signal Timing MCT for Mode ID 0 is shown. By clicking on the Mode drop-down list box (upper left side beneath the tabs), the Output Single Timing MCT for different Mode IDs can be selected and edited.

The timing for each Mode ID is broken down into 1 to up to 16 segments using the "Number of Segments" field at the upper right. The user can select the number of segments using the Number of Segments drop-down list box. In this example, it is set to 5. Just below the Mode and Number of Segments drop-down list boxes, an editable table showing the end time of each segment in μsec is presented. The end time of any segment may be changed by left clicking on its cell. The resolution of these entries for this CTU mezzanine card is 0.1 μsec. Note in the next release, the user will be able to define either the end time or length of each segment and the interval periods will be namable.

In this example, the six segments in order represent: receiver protection setup period, pre-transmit period (SSPA is enabled), transmit period (transmit waveform is passed through the transmit chain), receiver gate period (SSPA off, receiver protection switches still enabled), receive enable period (receiver protection switches placed in low isolation mode) and receive window period (receive signal passes through receiver chain). The output TTL signals are displayed and their logic level (0: logic low, 1: logic high) for each interval shown. By double left clicking on a cell, the logic level is toggle between logic low and high. Thus, by simply clicking on each cell, the user can define each output signal waveform. Note in a future release, a timing diagram will be presented allowing the user to graphically define the waveform for each timing signal. The user can also work directly with the CTU MCT Outputs XML object. In the PST configuration objects presented, Mode ID 0 was defined as the Inner Beam. Thus, for Mode ID 0 the Inner Beam SSPA Enable is set high (enabled) during the pre-transmit and transmit intervals and the Rx Beam Switch is configured to direct the receive signal from the inner beam antenna feed to the receiver.

Figure 20:
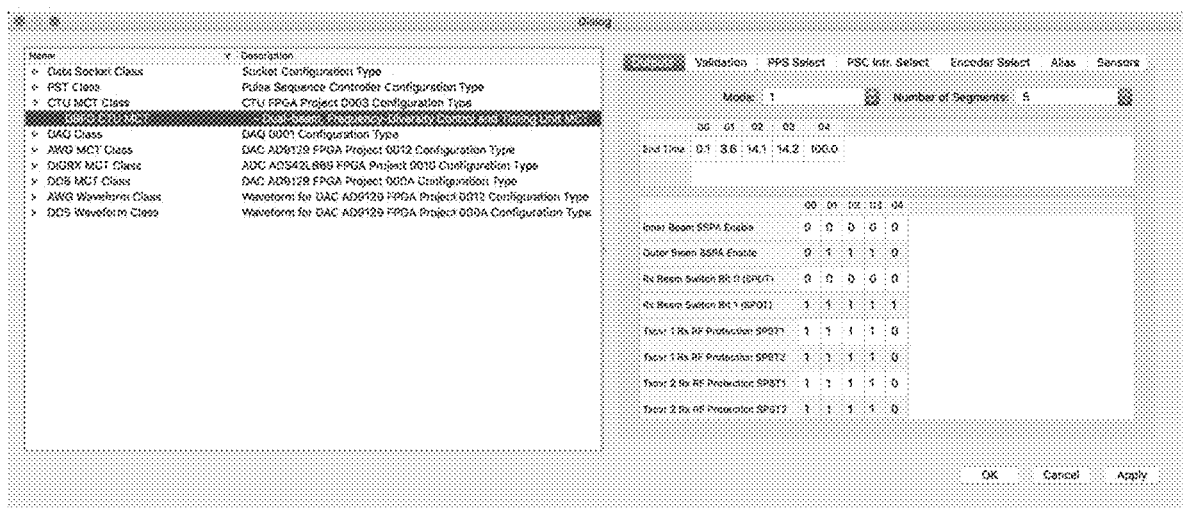
FIG. 20: An object belonging to the CTU MCT Objects class has been selected and its Output MCT child object's attributes are displayed in the right panel. Mode ID selected is 1.
Figure 21:
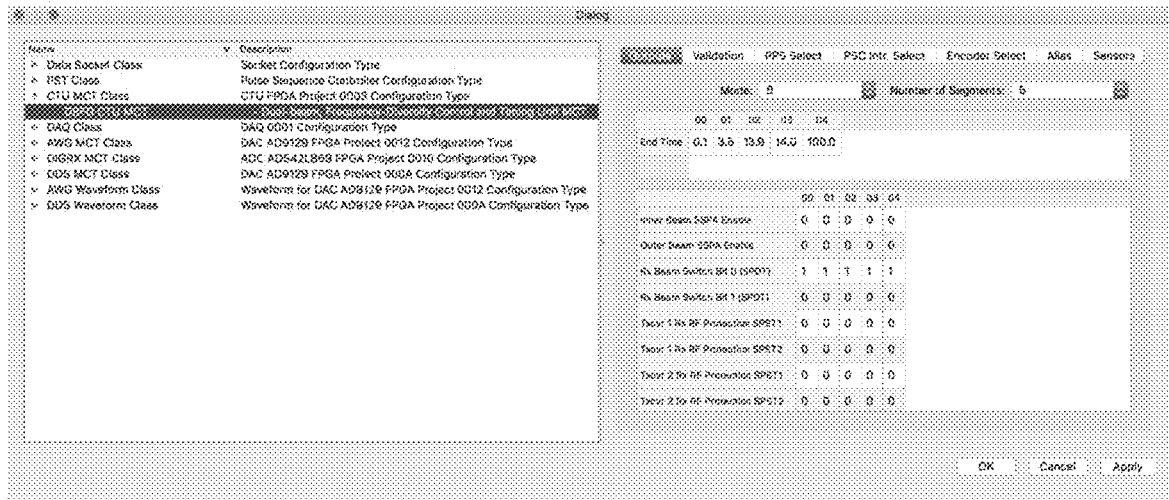
FIG. 21 An object belonging to the CTU MCT Objects class has been selected and its Output MCT child object's attributes are displayed in the right panel. Mode ID selected is 8.

FIG. 20 and FIG. 21 present the Outputs child object for Mode ID 1 (Outer beam) and Mode ID 8 (noise only) to illustrate how each signal's behavior can be modified by mode.

Validation

Figure 22:
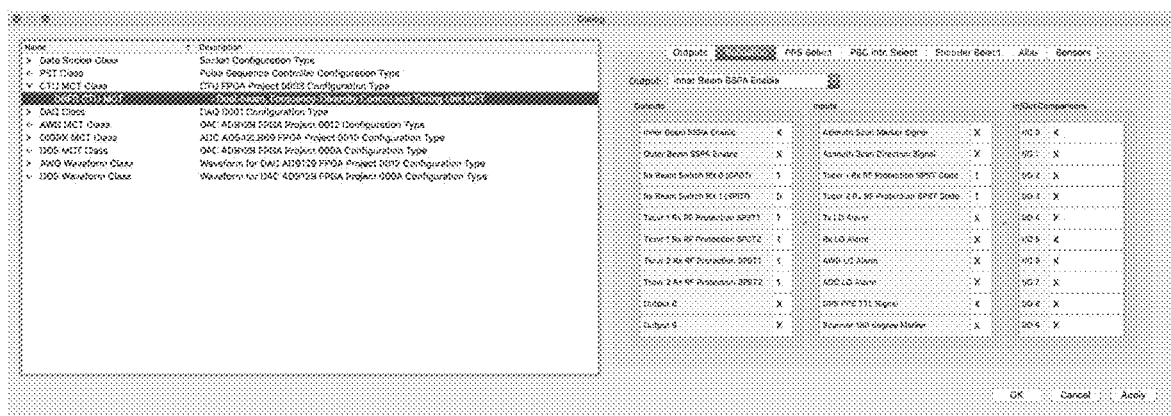
FIG. 22 An object belonging to the CTU MCT Objects class has been selected and its Validation child object attributes are displayed in the right panel.

Validation of any output timing signal may be defined through the Validation child object. Validation is requiring the state of any other output signal(s) to be a specific state, the state of any input signal(s) to be at a specific state and/or its own feedback signal to be at a specific state. FIG. 22 presents an example of the Validation child object's configuration interface for the DBFD CTU MCT configuration object for the output signal, Inner Beam SSPA Enable.

The Output drop-down list box allows any output signal to be selected and its validation criteria defined based on three different validation methods:

Outputs: Lists output signals and their required values. X denotes don't care, 0 denotes the output must be logic 0, and 1 denotes the value must be logic 1.

Inputs: Lists Input signals and their required values. X denotes don't care, 0 denotes the output must be logic 0, and 1 denotes the value must be logic 1.

In/Out Comparison: Compares the same input and output (i.e. input 1 and output 1) if set to "C".

Double (left) clicking on any cell in these columns changes the values of the field. The value toggles through "X", "0" and "1". Validation can be required for any output field (its logic high value). Validation is Mode ID independent. In the example given, the Inner Beam SSPA Enable output signal may be logic high only if the output signals: Inner Beam Switch Bit 0 is set to 1, Inner Beam Switch Bit 1 is set to 0, Txcvr 1 Rx RF Protection SPST1 is set to 1, Txcvr 1 Rx RF Protection SPST1 is set to 1, Txcvr 1 Rx RF Protection SPST2 is set to 1, Txcvr 2 Rx RF Protection SPST1 is set to 1, Txcvr 2 Rx RF Protection SPST2 is set to 1; and input signals Txcvr 1 Rx RF Protection SPST State is 1 and Txcvr 2 Rx RF Protection SPST State is 1.

Pulse Per Second (PPS) Select

Figure 23:
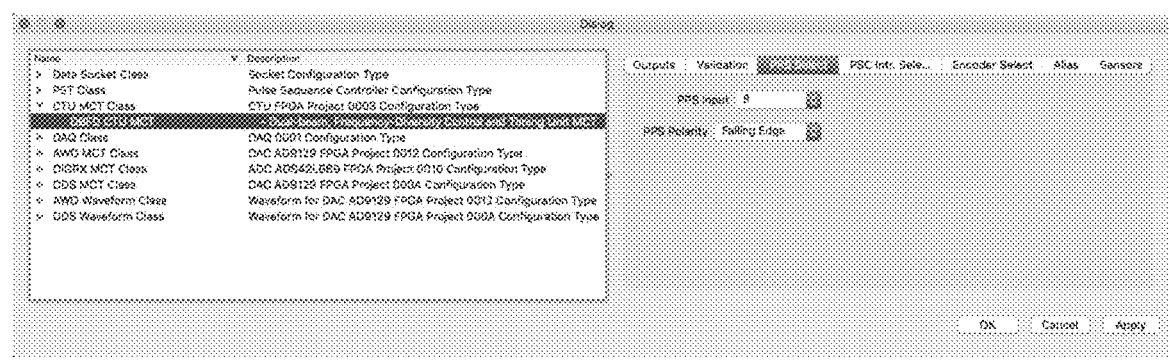
FIG. 23 The DBFD CTU MCT configuration object belonging to the CTU MCT class has been selected and its PPS Select attributes are displayed in the right panel.

The PPS Select attributes of the selected CTU MCT configuration can be defined and viewed by clicking on the PPS Select tab. FIG. 23 shows the PPS Select attributes for the CTU MCT configuration object, DBFD CTU MCT.

The right panel provides two fields:

PPS Input: Specifies through drop-down list box which input (by number currently) is the PPS signal. Example shows the PPS Input as Input Signal number 8.

PPS Polarity: Specifies through a drop-down list box the polarity of the PPS signal as either "Rising Edge" or "Falling Edge".

PSC Interrupt Select

Figure 24:
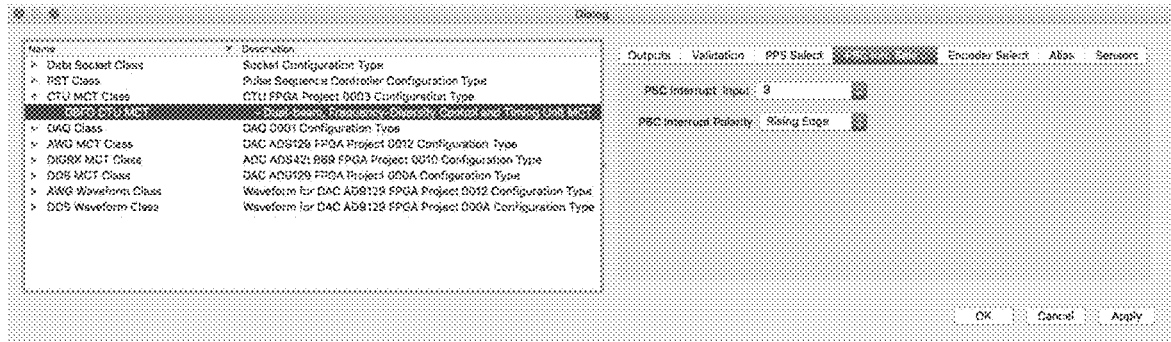
FIG. 24: The DBFD CTU MCT configuration object belonging to the CTU MCT class has been selected and its PSC Interrupt Select attributes are displayed in the right panel.

The PSC Interrupt Select attributes of the selected CTU MCT configuration can be defined and viewed by clicking on the PSC Interrupt Select tab. FIG. 24 shows the PSC Interrupt Select attributes of the selected configuration object, DBFD CTU MCT.

The right panel provides two fields:

PSC Interrupt Input: Specifies through a drop-down list box which input (by number currently) is the PSC Interrupt signal. Example shows the PSC Interrupt Input as Input Signal number 5.

PPS Polarity: Specifies through a drop-down list box the polarity of the PSC Interrupt signal as either "Rising Edge" or "Falling Edge".

Encoder Select

Figure 25:
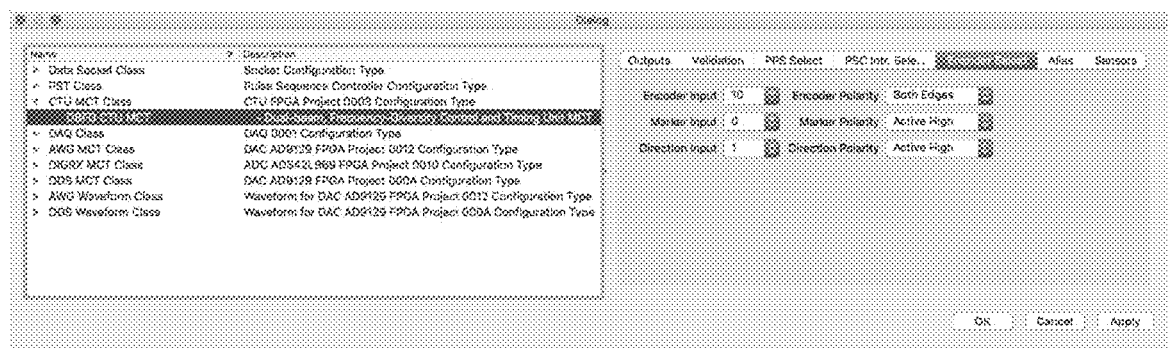
FIG. 25: The DBFD CTU MCT configuration object belonging to the CTU MCT class has been selected and its Encoder Select attributes are displayed in the right panel.

The Encoder Select attributes of the selected CTU MCT configuration can be defined and viewed by clicking on the Encoder Select tab. FIG. 25 shows the Encoder Select attributes of the selected configuration object, DBFD CTU MCT. It will allow the Encoder Input (incremental encoder), Marker Input and Direction Input to be assigned to the CTU's single ended or differential input signals and their polarity defined.

The right panel provides six fields:

Encoder Input: Specifies through a drop-down list box which input (by number currently) is the incremental encoder signal.

Encoder Polarity: Specifies the Encoder Input polarity through a drop-down list box: Falling Edge, Rising Edge or Both Edges.

Marker Input: Specifies through a drop-down list box which input (by number currently) is the positioner marker signal that denotes a specific location. Encoder counter value will reset with this signal.

Marker Polarity: Specifies the Marker Input polarity through a drop-down list box: Active High (rising edge) or Active Low (falling edge).

Direction Input: Specifies through a drop-down list box which input (by number currently) is the positioner direction signal that denotes CW rotation. Encoder counter value will increase with CW rotation and decrease with CCW rotation.

Direction Polarity: Specifies the Direction Input polarity through a drop-down list box: Active High or Active Low.

Sensors

Figure 26:
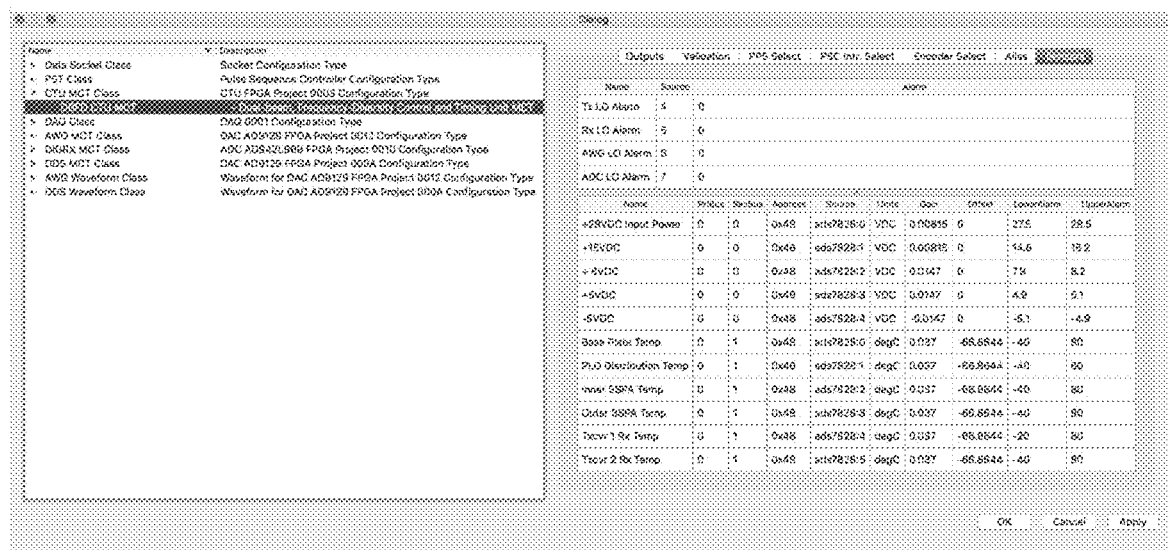
FIG. 26: The DBFD CTU MCT configuration object belonging to the CTU MCT Objects class has been selected and its Sensors attributes are displayed in the right panel.

The Sensors attributes of the selected CTU MCT configuration can be defined and viewed by clicking on the Sensors Select tab FIG. 26 shows the Sensors attributes tab of the selected object, DBFD CTU MCT. It allows the user to assign TTL (single ended or differential) inputs as alarms and to define the signals that are attached to the I2C sensor ADC boards (in this case the ARENA I2C AD7828 sensor boards).

The right panel provides two tables. The upper table is for defining alarms and the lower table the sensor signals.

Alarm Configuration Table

An alarm can be added or deleted by right clicking. Each alarm has three attributes:

Name: The name of the alarm may be defined by left click under the Name field and entering a name.

Source: The source for the alarm must be entered. It is the CTU TTL (single or differential) input number.

Alarm: The TTL logic level associated with the alarm. Left click and a drop-down list box with values 0, 1 and X is presented. "0" is logic 0, "1" is logic 1 and "X" is don't care. "X" can be used to denote an alarm but not react.

I²C Sensor Configuration Table

I²C sensors can be added by right clicking. Each I²C sensor has 9 attributes:

Name: The name of the alarm may be defined by left click under the Name field and entering in the name.

PriBus: The primary I²C bus that the sensor is connected to is defined. When the unit is mounted vertically the primary bus represents the row (0 thru 3). Left click and select the up or down arrow to change the value.

SecBus: The secondary I²C bus that the sensor is connected to is defined. When the unit is mounted vertically the secondary bus represents the column (0 thru 3). Left click and select the up or down arrow to change the value.

Address: The address field should be set to 0x48. To change the value left click.

Source: The source should be entered as follows: ads7828:<ch> where <ch> is a number from 0 to 7 which represents the ADC channel input that the sensor is connected to. Field can be edited by left clicking. Assumes the I2C ADS7828 sensor board is being used.

Units: The units of the sensor measurement may be entered by left clicking.

Gain: The gain for the sensor measurement may be entered by left clicking. The gain can be used to convert the ADC reported count value (0 to 4095) to the actual physical value (i.e. degC, voltage, etc). If a value of 1 is entered, the value reported will be between 0 and 4095 pulse the offset value.

Offset: The offset for the sensor measurement may be entered by left clicking. The offset will be added to the value reported by the ADC after it is multiplied by the Gain value.

Lower Alarm: The lower limit value that should trigger an alarm for the defined sensor.

Upper Alarm: The upper limit value that should trigger an alarm for the defined sensor.

Data Acquisition (DAQ) Class

A configuration object belonging to the DAQ Class defines recorder(s) and its (their) attributes. The responsibility of a recorder is to write data from its data source to its storage media. The filename structure used by each recorder is:

<Global Path>/<Time Tag>_<Global Filename>_ <FileName>-<File Counter>.dat where: <Global Path>, <Global Filename> and <Filename> are defined attributes of the object and <Time Tag> and <File Counter> are defined below:

<Time Tag>: Is an eight-digit date followed by a six-digital time (yyyymmdd_hhmmss). yyyy is four-digit year, mm is the two-digit month, dd is two-digit day, hh is two-digit hour, mm is two-digit minute and ss is two-digit second. The time tag is created by the arenaGUI when the recorder(s) go to ARM state. See Section 4 for more information about the different run-time states.

<File Counter>: Is a four-digit number starting at 0000 and incrementing by 1 with each new file created during the current run-time.

Figure 27:
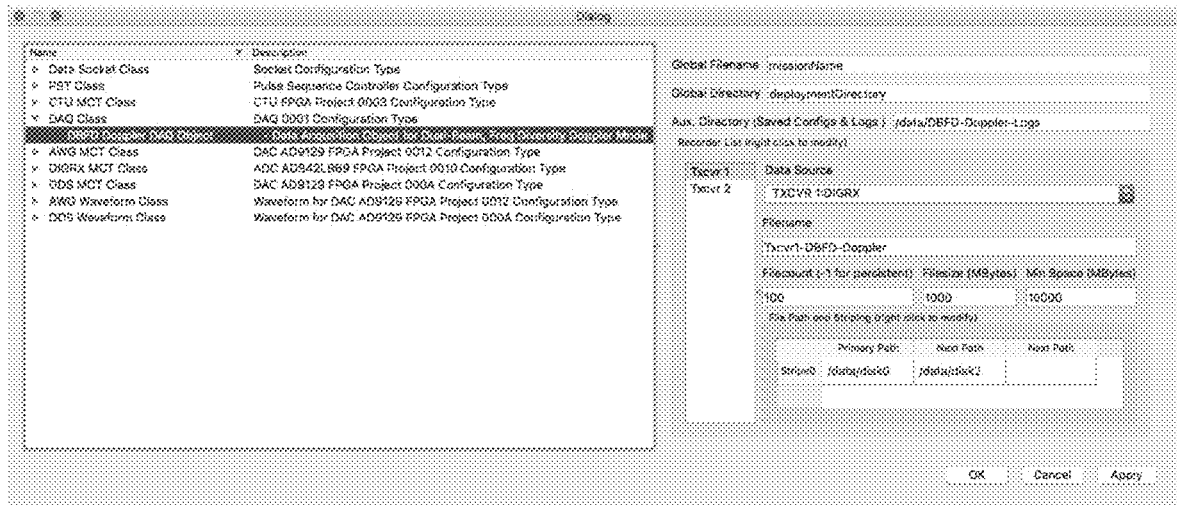
FIG. 27 The DBFD Doppler DAQ configuration object belonging to the DAQ Class has been selected. Its attributes are shown in the right panel.

FIG. 27 shows the configuration object, DBFD Doppler DAQ Object, which belongs to the DAQ Class. Each object belonging to the DAQ Class contains one or more recorder child objects. A recorder is created by right clicking in the Recorder list field in the left side of the right panel. Recorders named Txcvr 1 and Txcvr 2 have been created in the example shown. Txcvr 1 is selected and its attributes shown.

The DAQ Config Objects class configuration object has two global attributes. These attributes are assigned all recorder child objects. The global attributes are:

Global Filename: Prefix file name that is used in all recorder file names. In the example given, "missionName" would be part of the filenames of all recorders as defined by the filename structure detailed above.

Global Directory: The path defined in this field will be appended to the path defined in each recorder. If no value is specified, "./" will be used. In the example given, "deploymentDirectory/" would be appended to the specified paths.

For example, for the Txcvr 1 recorder, its filepaths would be: /data/disk0/deloymentDirectory and /data/disk1/deloymentDirectory.

The individual recorder child object's attributes are:

Data Source: Selectable drop-down list box that presents the available data sources that may be recorded. These are defined by the digital receiver configuration objects.

Filename: Filename to be used by the recorded for the selected data source.

Filecount: The maximum number of files to be recorded. If "−1" is specified, the recorder will continue to create files until it is taken out of run mode.

Filesize: The maximum file size of each file written to. It is specified in megabytes (MB).

Min. Space: If available space is left on the storage media and is equal to or less than this value, the recorder stops recording to the current path. If additional paths are specified, the recorder moves on to the next path specified in the list.

File Striping: A table that describes file recording path(s) for each recorder. Each row lists paths to be used in order. The first path listed is the first used. When the Min. Space is reached, the next path defined in the row is used. File striping (writing across multiple disks) can also be implemented for the selected recorder by adding multiple rows. When using file striping, the recorder writes the first packet to the path defined in the first row, the second packet to the file path defined by the second row, . . . and the Nth packet to the path defined by the Nth row. After reaching the Nth row, the N+1 packet is written to the path in the first row and the cycle begins again. If the Min. Space is reached by all paths in any one row, the recorder stops. A row is added to the table by right clicking on the table.

Figure 28:
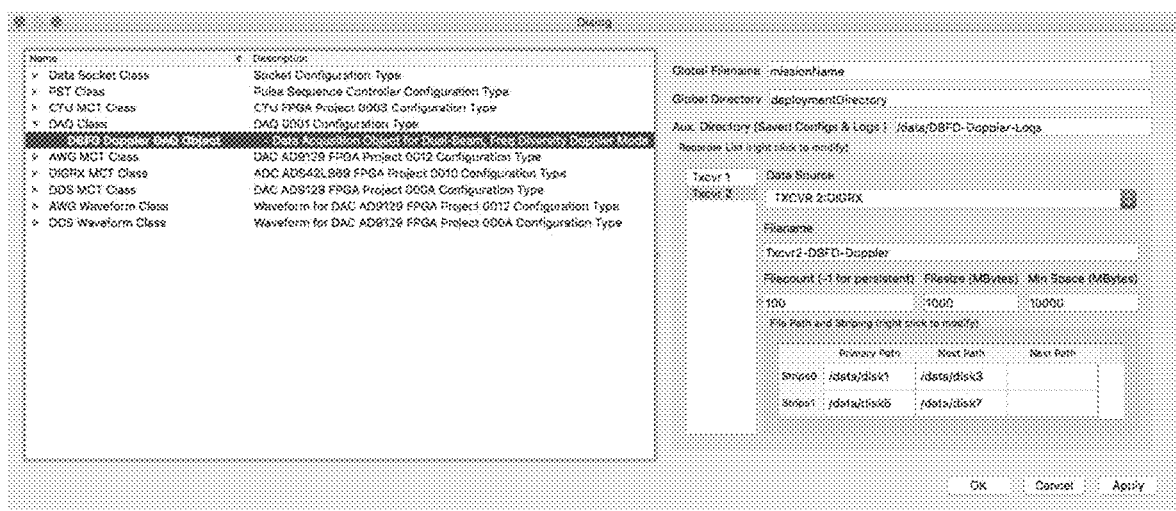
FIG. 28: The DBFD Doppler DAQ configuration object belonging to the DAQ Class has been selected. Its attributes are shown in the right panel. Example shown illustrates file stripping across two file paths as defined by Stripe0 and Stripe1 in the File Path and Stripping table.

An example of a recorder configuration child object (Txcvr 2) with file stripping is given in FIG. 28. In this example, two rows (Stripe0 and Stripe1) are defined in the file path table. First packet will be written to file path defined by Stripe 0 and the second packet to the file path defined by Stripe 1. This will repeat until the file recording process is stopped.

Waveform Generator MCT Class and Objects

In the example deployment, the same DAC mezzanine card is used in TXCVR1 and TXCVR2 but different firmware object is loaded into each: an arbitrary waveform generator firmware object is loaded into TXCVR1 DAC mezzanine card, and a direct digital synthesizer is loaded into TXCVR2 DAC mezzanine card. Both are described below.

AWG MCT Class and Objects

A configuration object belonging to the Arbitrary Waveform Generator (AWG) Mode Configuration Table class contains an AWG Mode Configuration Table (MCT). An AWG MCT instructs an ARENA AWG module as to which waveform object(s) to use based on the Mode ID as well as the timing of the waveform object relative to the Sync pulse. Section 0 will present waveform objects for this class (i.e. mezzanine card and firmware object).

An AWG MCT nominally has 256 (8-bit Mode ID word) rows but can be expanded to 65536 (16-bit Mode ID word) rows. It has six columns. Each entry (row) has the following attributes (columns):

Mode: The Mode attribute is the Mode ID provided by the PSC in the Sync packet. It serves as the index to determine which row to use. The MCT is prefilled with Mode ID numbers. Future release will allow an Add/Copy/Delete feature rather than presenting full table with unfilled rows.

Enable: The Enable attribute can be set True or False (pull down menu). If set to True, upon receiving the corresponding Mode ID in the PSC sync packet, the ARENA AWG module will create a waveform. If set False, the ARENA AWG module will do nothing until the next Sync Packet (i.e. Mode ID) is received.

Delay: The Delay attribute specifies the time delay in microseconds from the Sync pulse to the execution of the specified waveform (last column) for the given Mode ID. Its resolution is 0.1 µsec.

VDelay Ena: VDelay Ena attribute enables the variable delay by setting to it True. When enabled, it allows for finer control of the delay on a pulse-to-pulse basis. Resolution depends on the DAC clock period and divider. In the case presented, the DAC is clocked (updated) at 2.4 GHz and has a 8:1 divider resulting in a variable delay resolution of 3.33 nsec. The variable delay can be updated via network communications or from the CTU directly.

Fine Delay: Fine Delay attribute allows further refinement of the waveform delay. VDelay Ena must be set to False for this feature to be used. The Fine Delay is specified in nanoseconds (nsecs). Its resolution depends on the DAC clock period and divider. In this case it has a resolution of 3.33 nsec (i.e. 8 times the DAC clock period 0.416 nsec).

AWG Waveform Object: The AWG Waveform Object attribute (i.e. column entitled: dac-ad9129_0012_ waveform) specifies which AWG Waveform object to use for the Mode ID of that row. A drop-down list box is presented showing the waveform objects that have been instantiated (defined). Only those waveform objects defined for the deployed AWG mezzanine card will be shown.

Figure 29:
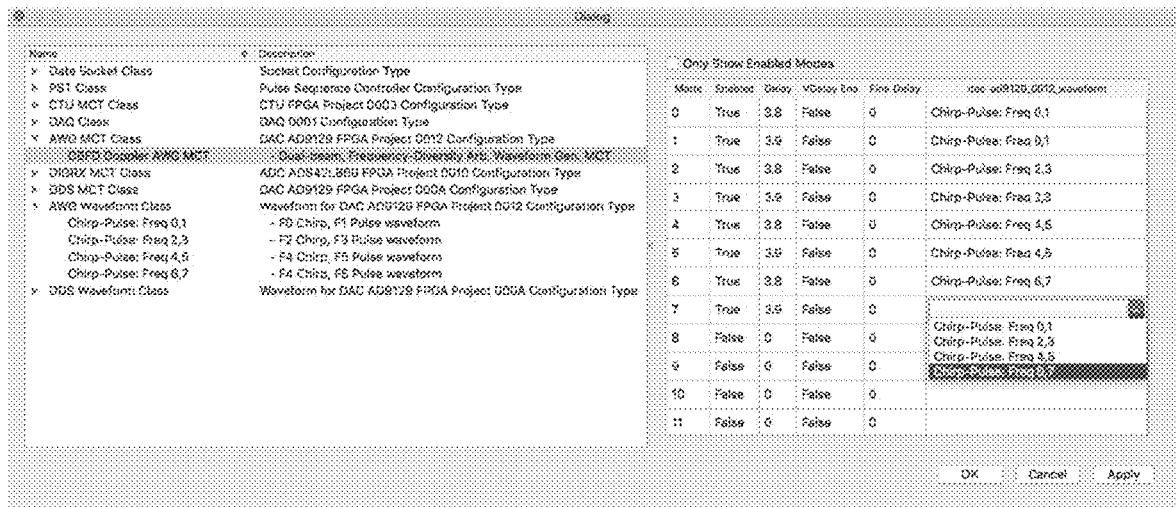
FIG. 29: An object belonging to the AWG MCT Class has been selected. Its attributes are shown in the right panel. Waveform object for Mode ID 7 is being selected.

FIG. 29 shows the configuration object named, DBFD Doppler AWG MCT, belonging to the AWG MCT Class. AWG Waveform configuration object is being assigned to Mode ID 7 in this example. A drop-down list box presents to the user AWG Waveform objects that have been defined (instantiated) under the AWG Waveform Class. Note that the user can type in the name of an AWG Waveform configuration object that has not yet been created but will need to create this object before running the system.

Figure 30:
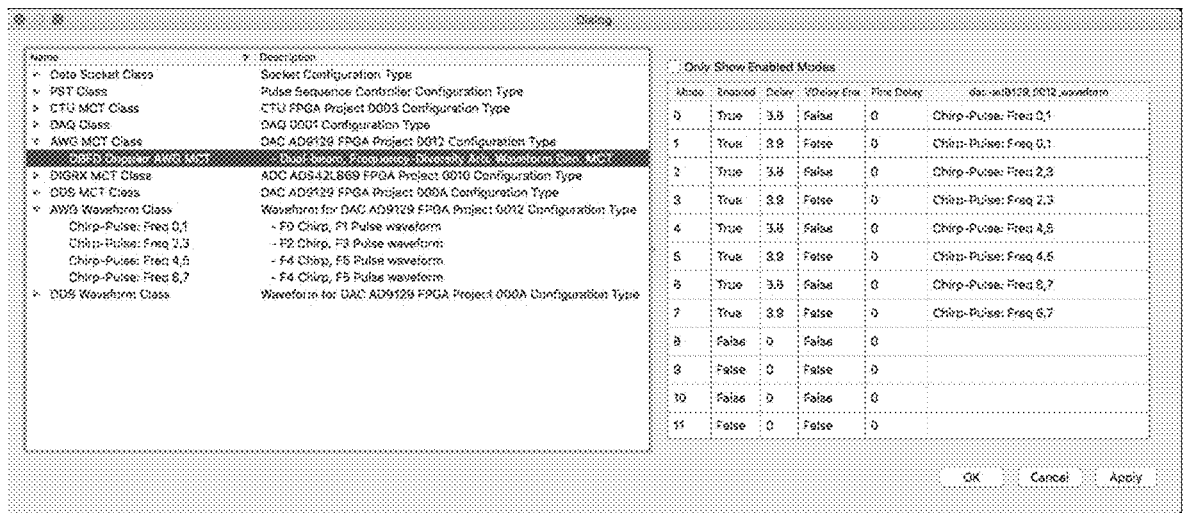
FIG. 30: The DBFD Doppler AWG MCT configuration object belonging to the AWG MCT Class is shown. Its attributes (AWG MCT) is shown in the right frame.

FIG. 30 shows the AWG MCT configuration object, DBFD Doppler AWG MCT, completed. This AWG MCT supports dual beam frequency diversity Doppler operation with AWG Waveform objects defined and modes enabled for Mode IDs 0 through 7. Modes 8 through 11 are not enabled since in the PST these modes are "noise-only" modes (i.e. no transmit waveform). When modes 8, 9, 10 or 11 are issued, the ARENA AWG module will ignore these modes. The inner and outer beams use the same AWG Waveform object but have slightly different delays in this case. This AWG MCT configuration object supports both PST objects that where shown earlier (interrupt driven noise measurements and periodic noise measurements), so only one configuration object is needed.

DDS MCT Class and Objects

A configuration object belonging to the Direct Digital Synthesizer (DDS) MCT class contains an DDS MCT. A DDS MCT instructs an ARENA DDS module as to which waveform object(s) to use based on the Mode ID as well as the timing of the waveform object relative to the Sync pulse. Section 3 will presents waveform objects for this class (i.e. mezzanine card and firmware object).

A DDS MCT nominally has 256 (8-bit Mode ID word) rows but can be expanded to 65536 (16-bit Mode ID word) rows. It has four columns. Each entry (row) has the following attributes (columns):

Mode: The Mode attribute is the Mode ID provided by the PSC in the Sync packet. It serves as the index to determine which row to use. The MCT is prefilled with Mode ID numbers. Future release will allow an Add/Copy/Delete feature rather than presenting full table with unfilled rows.

Enable: The Enable attribute can be set True or False (pull down menu). If set to True, upon receiving the corresponding Mode ID in the PSC sync packet, the ARENA AWG module will create a waveform. If set False, the ARENA AWG module will do nothing until the next Sync Packet (i.e. Mode ID) is received.

Delay: The Delay attribute specifies the time delay in microseconds from the Sync pulse to the execution of the specified waveform (last column) for the given Mode ID. Its resolution is 0.1 μsec.

DDS Waveform Object: The DDS Waveform Object attribute (i.e. column entitled: dac-ad9129_000A_ waveform) specifies which DDS Waveform object to use for the Mode ID of that row. A drop-down list box is presented showing the waveform objects that have been instantiated (defined). Only those waveform objects defined for the deployed DDS mezzanine card will be shown. See Section 3 for details.

Figure 31:
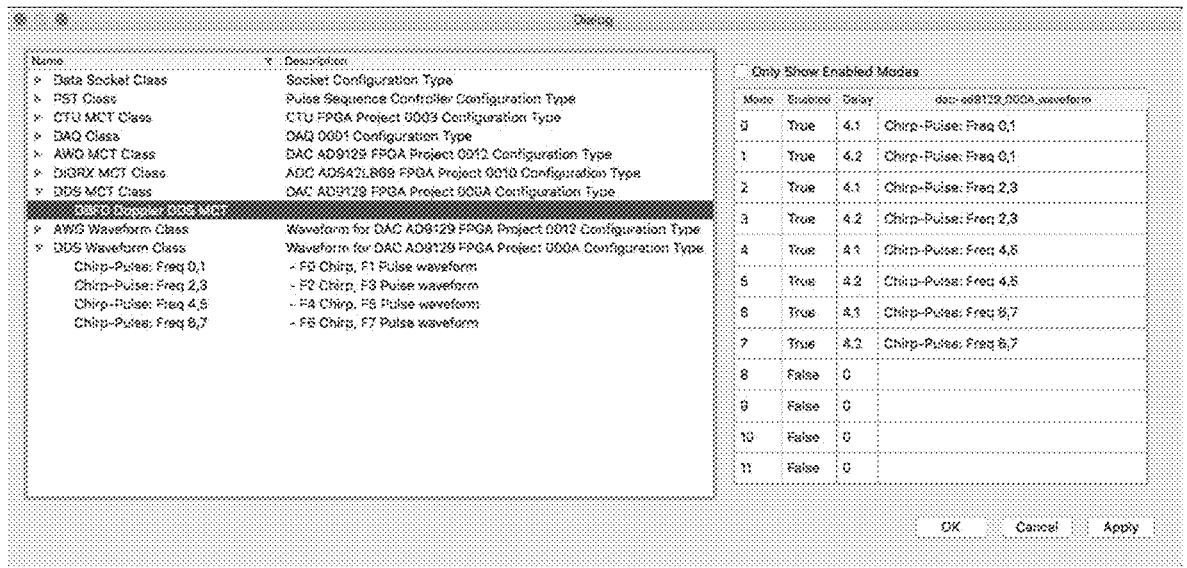
FIG. 31: The DBFD Doppler DDS MCT configuration object belonging to the DDS MCT Class is shown. Its attributes (DDS MCT) is shown in the FIG. 32: The DBFD Doppler DIGRX MCT configuration object belonging to the DIGRX MCT Class is shown. Its child object, ADC, is selected and its attributes are shown in the right frame.

FIG. 31 shows the DDS MCT configuration object, DBFD Doppler DDS MCT, completed. This DDS MCT supports dual beam frequency diversity Doppler operation with DDS Waveform objects defined and modes enabled for Mode IDs 0 through 7. Modes 8 through 11 are not enabled since in the PST these modes are "noise-only" modes (i.e. no transmit waveform). When modes 8, 9, 10 or 11 are issued, the ARENA DDS module will ignore these modes. The inner and outer beams use the same DDS Waveform object but have slightly different delays in this case. This DDS MCT configuration object supports both PST objects that where shown earlier (interrupt driven noise measurements and periodic noise measurements), so only one configuration object is needed.

Digital Receiver (DIGRX) MCT Classes and Objects

A configuration object belonging to a DIGRX MCT class contains digital receiver mode configuration tables, their child objects and attributes. A DIGRX MCT configuration object instructs an ARENA DIGRX module how to process its receive signals based on the Mode ID. As with the ARENA waveform generator mezzanine cards, there are several different ARENA digital receiver mezzanine cards. The details of the configuration object for each card are given in their respective manuals. In this document, the standard ARENA DIGRX MCT configuration object for the ARENA 313 is described in this section. This digital receiver supports one to four IF input channels, up to eight simultaneous sub channels, real and complex digital receiver, decimation, video filtering, range weighting, forward FFT, match filtering and profile processing (coherent and pulse pair accumulation). Each sub channel is mode based and independent through the full processing chain. The profile processor is mode and sub channel based, and each of its processors can perform calculations within a sub channel and across sub channels. FIG. 5 presents a system block diagram of this digital receiver, from initial acquisition (i.e. ADC sampling) through profile processing. Its unique architecture allows the profile data to be outputted at each stage of processing, as indicated in the figure, while also continuing the down processing chain as instructed by the selected DIGRX MCT configuration object. Thus this digital receiver can support a very large range of radar systems and applications and provides a very dynamic and adaptive solution.

The standard ARENA DIGRX MCT configuration object is comprised of three child objects that each contain mode configuration tables: Down Conversion (Down Conv.) MCT, Intra-profile Processing MCT and Profile Processing MCT; and additional child objects that are used within the above MCTs and for data routing: ADC, Weights and Reference Function and Output. Each are described below.

ADC Configuration Child Object

The ADC configuration child object contains two attributes:

ADC Mezz. Card 0 Sampling Rate: ADC Mezz. Card 0 Sampling Rate is the sampling rate that the ADCs on the ADC mezzanine cards are being clocked at when only one ADC MC is present. If two are present, it is the sampling rate of the ADC MC in mezzanine slot 0. The sampling rate is defined in MHz and may be entered by left clicking in the field labeled ADC Mezz. Card 0 Sampling Rate.

ADC Mezz. Card 1 Sampling Rate: ADC Mezz. Card 1 Sampling Rate is the sampling rate of the second ADC MC that is in mezzanine slot 1. The sampling rate is defined in MHz and may be entered by left clicking in the field labeled ADC Mezz. Card 0 Sampling Rate. This attribute is not used if only one ADC MC is present. In a future release, this field will be grayed out when only one ADC MC is present.

Figure 32:
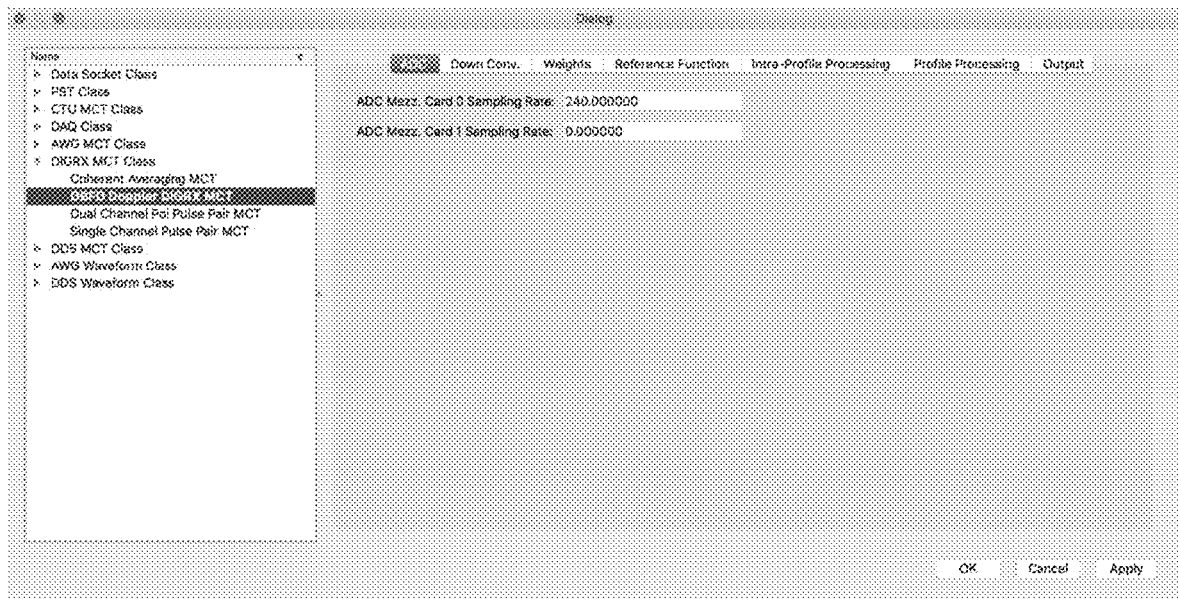

FIG. 32 presents the ADC configuration child object. Its attributes are shown by left clicking on the ADC tab. In this example, only one ADC MC is present. The sampling rate it is being operated at is 240 MHz. This value is shown in ADC Mezz. Card 0 Sampling Rate field. ADC Mezz. Card 1 Sampling Rate is set to zero since there is not another ADC MC present.

Down Conversion (Conv.) Child Object

The Down Conv. child object contains the down conversion MCT for each sub channel. There are eight sub channels: indexed 0 through 7, thus there are eight down conversion MCTs. Each sub channel's down conversion MCT instructs the digital receiver processing (see section label Digital I & Q Demodulation and Filtering in FIG. 5) based on Mode ID by providing:

Type of processing to implement (ADC pass-thru or digital I & Q demodulation and filtering);

ADC channel number to process;

Zero/Pi modulation state (enable or disable);

ADC sampling decimation ratio; and

Parameters governing the complex digital down conversion and video filtering.

For each enable sub channel/Mode ID combination, the digital receiver processing outputs its processed profile to the Profile Buffer that the Intra-Profile Processor will ingest. The down conversion MCT currently has 256 rows (a row for each Mode ID) and eight columns. Mode ID is expandable from 8-bits to 16-bits. Based on the Sync packet Mode ID, the attributes within the row with that Mode ID is used to process the profile data. Each entry (row) has the following attributes (columns):

Mode: The Mode attribute is the Mode ID provided by the PSC in the Sync packet. It serves as the index to determine which row to use. The MCT is prefilled with Mode ID numbers. Future release will allow an Add/Copy/Delete feature rather than presenting full table with unfilled rows.

Route: The Route attribute can be set through a drop-down list box that provides three options: Disabled, ADC or DigRx. This determines how the data will be processed through this stage as follows. If set to:

Disabled: Upon receiving the corresponding Mode ID in the PSC sync packet, the sub channel is disabled until the next Sync Packet (i.e. Mode ID) is received. All other attributes in the row are disabled.

ADC: Process the data through the ADC decimation stage and pass the data at this point to the profile buffer of the Intra-Profile Processing stage (described in Section 3). NCO Freq, NCO Phase and Bandwidth attributes in the row are disabled.

DigRx: Implement the complex digital down conversion, decimation and video filtering and pass processed profile to the profile buffer of the Intra-Profile Processing stage.

ADC Channel: The ADC Channel attribute designates which ADC channel to process. It is a drop-down list box containing the list of available ADC channels (i.e. 0 through 3).

ZeroPi Modulation: The ZeroPi Modulation attribute can be set to either Enabled or Disabled through a drop-down list box. If set to Disabled, the ADC samples are passed unaltered. If Enable, every other ADC sample is multiplied by −1. Note that this multiplication is applied after the ADC Decimation.

ADC Decimation: The ADC Decimation attribute determines how the ADC samples should be decimated. This is prior to complex digital down conversion. A drop-down list box allows the user to select an integer value between 1 and 16.

NCO Freq.: The NCO Freq. attribute sets the frequency of the numerically controlled oscillator (NCO) which is the local oscillator for the in-phase and quadrature mixer. It is specified in MHz.

NCO Phase: The NCO Phase attribute sets the start phase of the NCO. It is specified in degrees.

Bandwidth: The Bandwidth attribute sets the range gate bandwidth. A drop-down list box presents the avail able bandwidths. Available bandwidth are:

$$\frac{ADC\_Sampling\_Rate}{4 \times N},$$

where N is an integer between 1 and 64.

Figure 33:
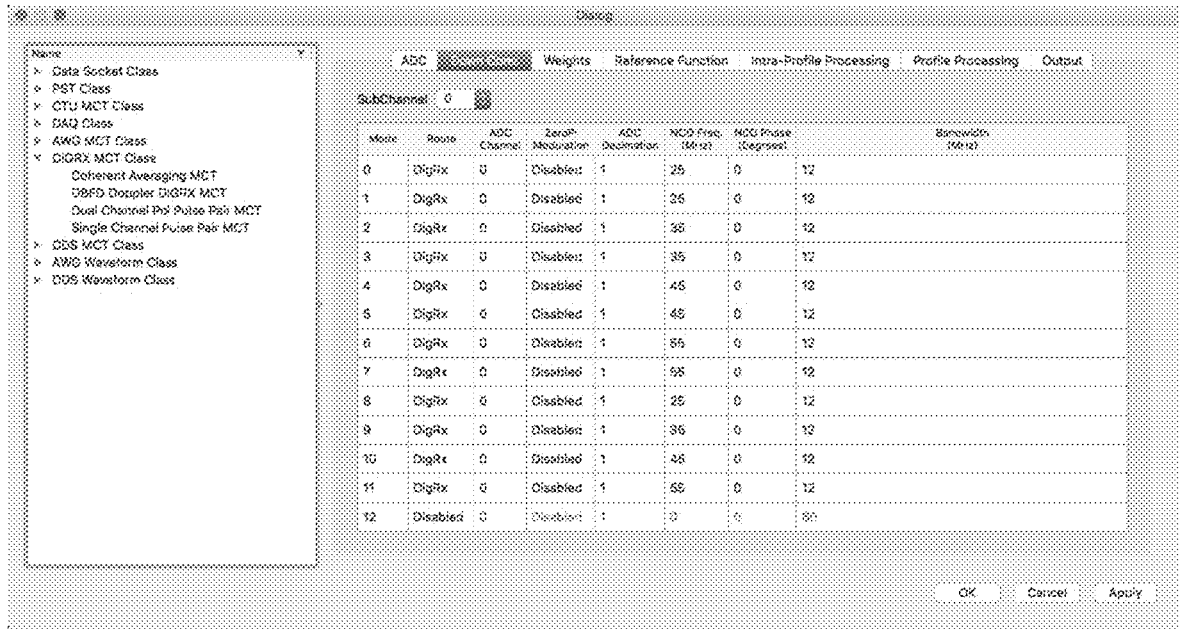
FIG. 33: The DBFD Doppler DIGRX MCT configuration object belonging to the DIGRX MCT Class is shown. Its child object, Down Conv., is selected and its down conversion MCT for sub channel 0 is shown in the right frame.
Figure 34:
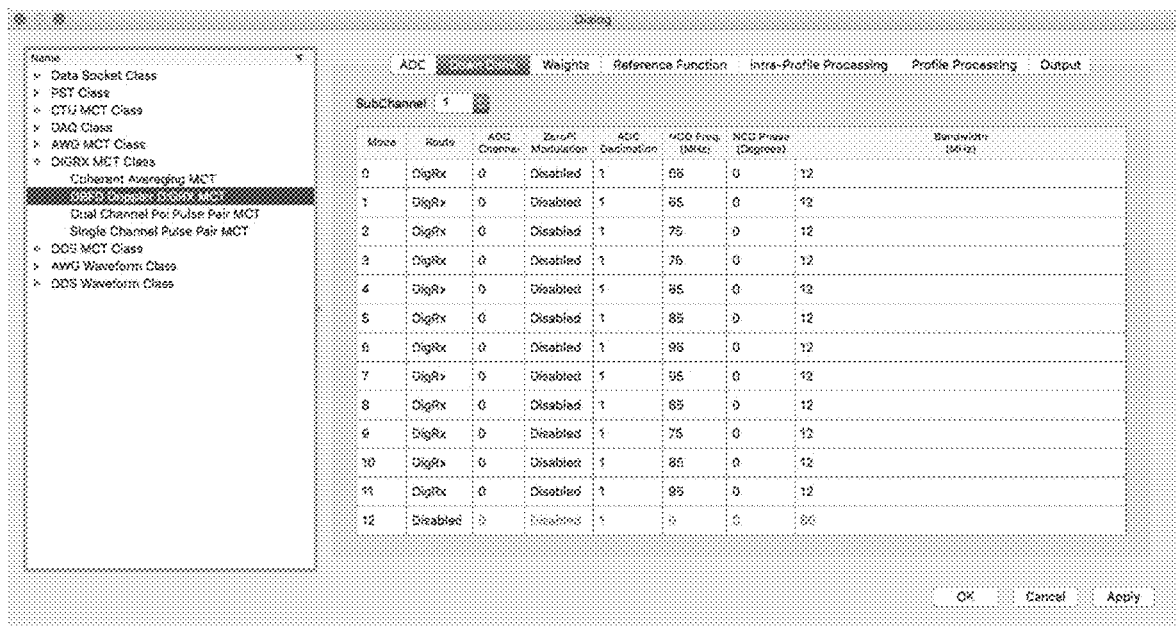
FIG. 34: The DBFD Doppler DIGRX MCT configuration object belonging to the DIGRX MCT Class is shown. Its child object, Down Conv., is selected and its down conversion MCT for sub channel 1 is shown in the right frame.

FIG. 33 presents the Down Conv. configuration child object for the DBDF Doppler DIGRX MCT configuration object. Its attributes are shown by left clicking on the Down Conv. tab. To view the down conversion MCT for a particular channel, the SubChannel drop-down box list is used. In this example, sub channel 0 has been selected. Mode ID's 0 through 11 have been enabled by setting their Route attribute to DigRx. All others disabled (Route is set to Disabled). For each enabled Mode ID, the ADC Channel attribute is set to 0, ZeroPi Modulation attribute is set to Disabled and ADC Decimation attribute is set to 1. In other words, the ADC sample profile from ADC channel 0 for each Mode ID is passed unaltered to the input to the complex digital demodulator processor. The NCO Freq. attribute for Mode ID 0 and 1 is set to 25 MHz. It increases by 10 MHz for each next pair of Mode IDs up through Mode IDs 6 and 7. Note that Mode IDs 0 through 7 represented volume/surface backscatter profiles (i.e. system is transmitting) where the even Mode IDs the system are using the inner beam and odd Mode IDs the system are using the outer beam. Further, these frequencies correspond to the center frequency of the linear frequency modulated (chirp) pulses after they have mixed down by the radar's receiver to their intermediate frequency (IF). The fixed frequency pulses are 40 MHz higher and are processed by Sub Channel 1 (see FIG. 34). In other words, the simultaneous returns from the transmitted chirp and fixed frequency pulses in each transmit waveform are separated (filtered) by the digital receiver process implemented by Sub Channel 0 and 1. Mode IDs 8 through 11 are noise-only profiles, and are processed at each of the NCO frequencies of the volume backscatter channels. Because the system has only a single receiver channel, separate modes for the Inner and Outer beams are not needed to represent the thermal noise power in their volume/surface backscatter profiles.

Weights Child Object

A Weights child object contains a complex weighting and can be selected by the Intra-Profile Processing child object (see Section 3) to apply a complex weighting in the range gate domain following the in-phase and quadrature digital demodulation and filtering stage (see FIG. 5). A Weights child object has the following attributes:

Weight Type: The Weight Type attribute defines type of weighting will be applied. There are currently three weighting types that are presented for selection through a drop-down list box:

Ideal: Applies a standard window defined by the Window attribute.

Constant: Applies a constant complex weighting as specified by the Scales and Phase attributes.

Custom: Applies a Custom weighting that is specified by the Custom File attribute.

Window: Allows a standard window to be selected through a drop-down list box. Current available windows are: Rectangular, Tukey, Hamming, Hanning and Blackman-Harris. Depending on the window type selected, its specifications are defined by the attributes described directly below.

Alpha: Defines the alpha parameter of the Tukey window. If Tukey is not selected, this parameter is ignored.

Start Offset: The start of the window in microseconds relative to the first sample of the profile.

Length: The length of the window (weighting function) in microseconds.

Phase: The phase of the complex scalar. The window weighting is multiplied by the complex scalar. If Constant window type is selected, this is the phase of the complex constant.

Scale: The amplitude of the complex scalar. The window weighting is multiplied by the complex scalar. If Constant window type is selected, this is the amplitude of the complex constant. This value is a normalized scalar (i.e. maximum value is 1.0).

Figure 35:
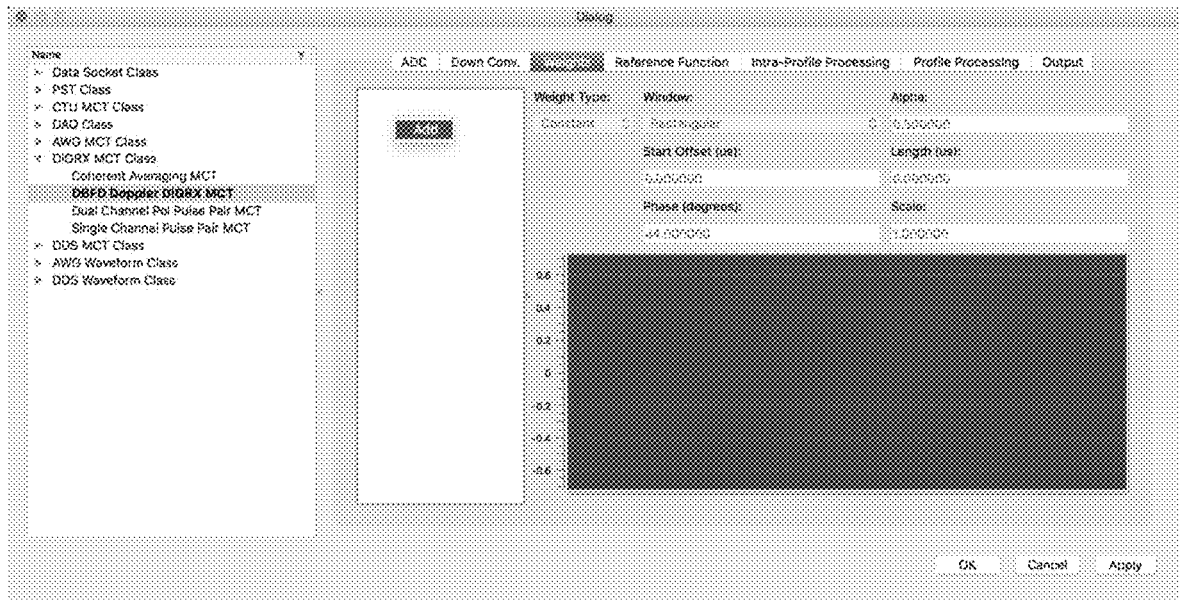
FIG. 35: The DBFD Doppler DIGRX MCT configuration object belonging to the DIGRX MCT Class is shown. The Weights tab has been selected and white region where Weights child objects are listed has been right click on. Add menu has appeared and is selected.

To add, view, modify, copy or delete a Weights child object, the Weights tab must be selected as shown in FIG. 35. In this figure, no Weight child objects have been created. The rectangular white box where the Weight child objects would be listed has been right clicked and a pop menu with the "Add" option selected. This will create (add) a Weights child object. If a Weights child object is right clicked on, the menu has the additional options: Copy and Delete. When first created, the child object will be assigned the name, "New Weighting". Left clicking on the name, it can be renamed.

Figure 36:
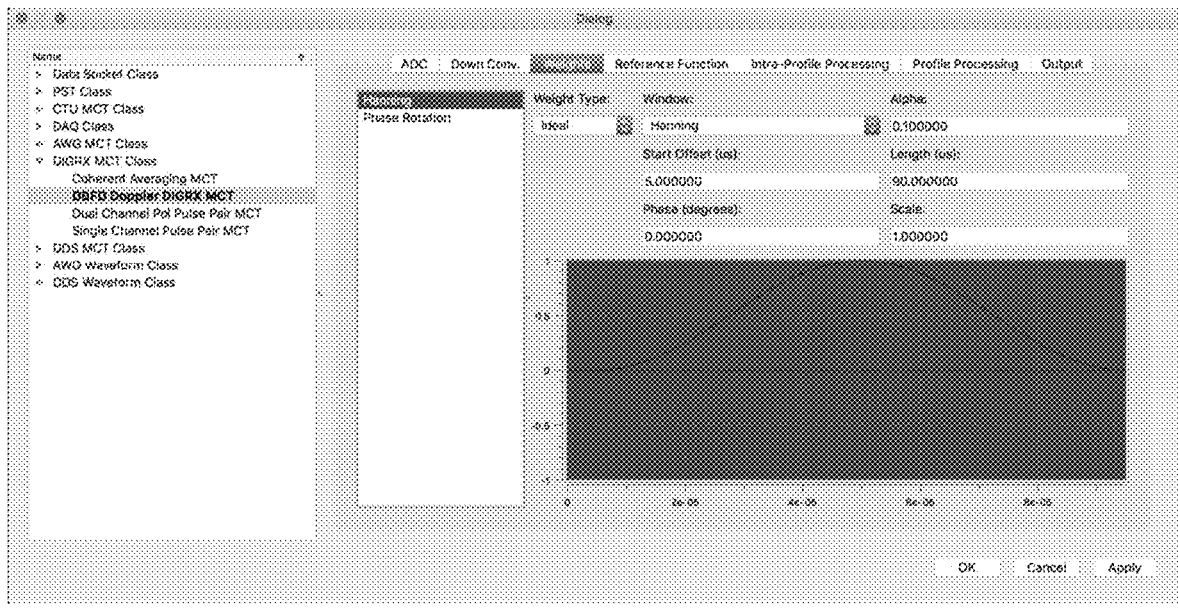
FIG. 36: The DBFD Doppler DIGRX MCT configuration object belonging to the DIGRX MCT Class is shown. The Weights tab has been selected and the child object named "Hanning" selected. Its attributes are shown on the right.

FIG. 36 shows the same window with two Weights child objects created named: Hanning and Phase Rotation, and the Hanning window is selected. In the right frame, the attributes of this child object are shown and can be modified. Note that Alpha attribute does not apply since Window type is Hanning. In a future release, this attribute will be grayed out except when Tukey window type is selected. A plot of the in-phase and quadrature components of this weighting versus time in seconds is shown in the lower right of the right frame. The quadrature component is zero since the Phase attribute is set to 0 degrees. This plot is updated in real-time as the attributes are changed.

Figure 37:
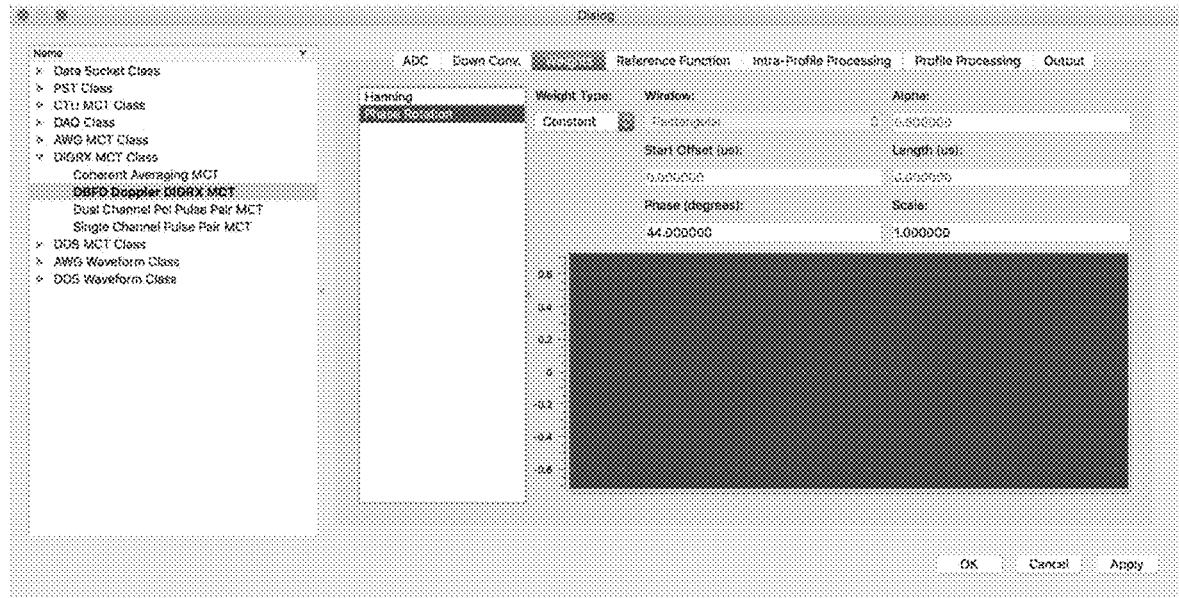
FIG. 37: The DBFD Doppler DIGRX MCT configuration object belonging to the DIGRX MCT Class is shown. The Weights tab has been selected and the child object named "Phase Rotation" selected. Its attributes are shown on the right.

FIG. 37 shows the Weights child object "Phase Rotation" selected. This weight's Weight Type is Constant. As such only the Phase and Scale attributes are editable and the others are grayed out. As defined, this constant will rotate the phase of the receive profile (every range gate) by 44 degrees if applied.

Reference Function Child Object

A Reference Function child object contains a complex reference function that can be selected by the Intra-Profile Processing child object (see Section 3). Reference Functions child objects are used to create the reference function that is convolved with the receive profile. Note that the convolution is performed by multiplying the Fourier transforms of the receive profile and reference function and then taking the inverse Fourier transform (i.e. match filter processing shown in FIG. 5). A Reference Function child object has the following attributes:

Reference Type: The type of reference function to be used for the reference function child object. The available types are presented by a drop-down list box which contains types: Ideal, Impulse or Custom. If Ideal is selected, reference function constructed is based on the Window, Range Sampling, Bandwidth, Pulse Width, Phase and Scale attributes. Linear frequency modulated waveform is assumed with a sweep bandwidth defined by the Bandwidth attribute (see below). If Impulse is selected, an impulse function is constructed (i.e. pass thru) using complex scalar defined by the Phase and Scale attributes. If Custom is selected, the reference is loaded from a file defined by the File attribute. In a future release reference function (as well as the attributes below) will be updatable on a pulse-to-pulse and even inter-pulse time.

Window: Defines the amplitude window that will be applied to the reference function. It is applied only if the Reference Type attribute is Ideal. Drop-down list box presents available window types that can be applied.

Alpha: If the Window attribute is set to Tukey, Alpha attribute defines the alpha parameter for the Tukey window.

Start Offset: Offset in time specified in microseconds to the start of the reference function. This results in zero padding of the reference function from the beginning (i.e. results in a time delay of the output of the match filter). It can be used to align the final output profiles which may have different delays.

Phase: Specifies the start phase of the reference function. If set to non-zero value, this will rotate the phase of the final output profile.

Scale: Normalized amplitude scale factor that the reference function is multiplied by.

Pulsewidth: The pulse width of the reference function specified in microseconds.

Center Freq.: The center frequency of the reference function specified in MHz.

Bandwidth: The total sweep bandwidth of the reference function specified in MHz. Specifying a value of zero assumes no frequency modulation (i.e. fixed frequency pulse reference function).

Filename: Filename containing the complex points for a user-defined reference function. The complex time domain version of the reference function should be provided. This will be applied when Custom is selected for Reference Type.

Figure 38:
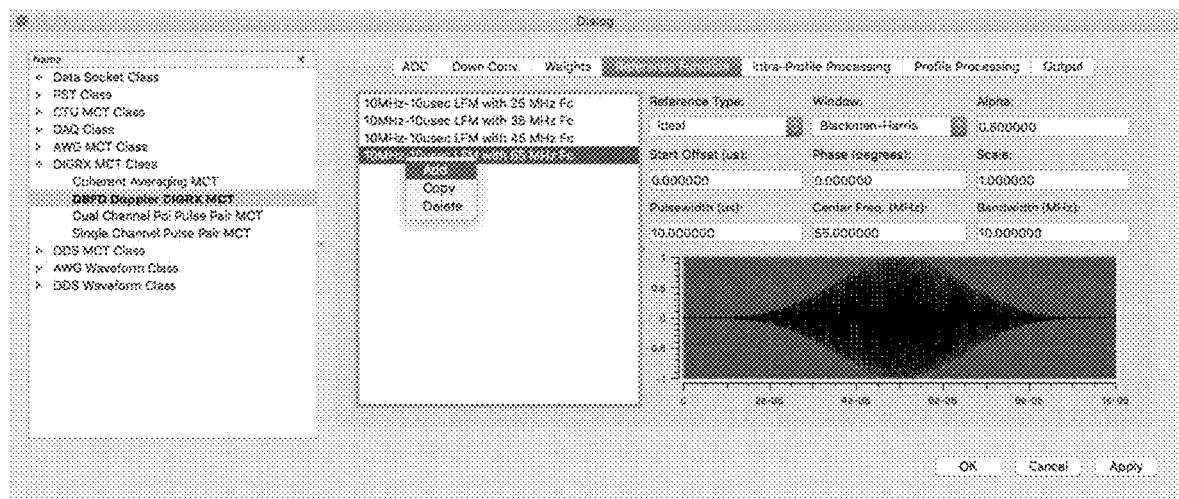
FIG. 38: The DBFD Doppler DIGRX MCT configuration object belonging to the DIGRX MCT Class is shown. The Reference Function tab has been selected and white region where Reference Function child objects are listed has been right clicked on. Add menu has appeared and is selected.

To add, view, modify, copy or delete a Reference Function child object, the Reference Function tab must be selected as shown in FIG. 38. In the right frame, is the Reference Function Object list. Right clicking in this region, a pop-up menu will provide options to add, copy or delete (only Add will appear if click in area where no object is listed) as shown. By selecting Add, a new Reference Function child object will be created with the name, "New ReferFunc." Left clicking on this name, the object can be renamed.

In FIG. 38 there are four Reference Function child objects defined—one for each of the LFM pulse waveforms that were transmitted. Their center frequencies match their center frequencies at the input to the digital receiver (i.e. backscatter down converter signal coming from the radar. The last object in the list, 10 MHz-10 usec LFM with 55 MHz Fc, is selected so its attributes are shown on the right: it is a linear frequency modulated waveform centered at 25 MHz with a 10 μsec pulse length and 10 MHz sweep bandwidth. A Blackman-Harris amplitude window has been applied. The Scale is set to 1 (i.e. full scale) and there is no start or phase offset. A plot of the in-phase and quadrature components of this signal in the time domain is shown. This plot updates if any attribute is changed. Note the Alpha attribute is not applicable in this case. Future release will gray this attribute when Tukey window is not selected.

Intra-Profile Processing Child Object

The Intra-Processing child object contains the Intra-Profile Processing MCT for each sub channel. There are eight sub channels: indexed 0 through 7, thus eight Intra-Profile Processing MCTs. The intra-profile processor stages are governed by the Intra-Profile Processing MCT and shown in FIG. 5. Output profiles from the Digital I & Q Demodulation and Filtering stages are ingested from the Profile Buffer and processed according to the Intra-Profile processor based on sub channel and Mode ID. The outputs of this processor are Profile Data Objects that the Profile Processor ingests. Each Sub Channel Intra-Profile Processing MCT defines for each Mode ID the following:

Profile Data Objects: The data type(s) and range gates that form each Profile Data Object. The data types are:

DigRx: Digital receiver complex profile (output profile of the digital *I & Q demodulation and filtering stage or pass-thru ADC profile).

Fwd FFT: Complex output profile of the forward FFT, and

Rev FFT: Complex output profile of the inverse FFT.

One or multiple Profile Data Objects can be created for a given Mode ID, each being a different type and can consist of different range gates.

Waveform Function Objects: Specifies the attributes to create the complex weighting and reference function objects.

FFT Processors: Configures the forward and reverse FFT processors.

Each sub channel's Intra-Profile Processing MCT currently has 256 rows (a row for each Mode ID) and nine columns. The Mode ID is expandable from 8-bits to 16-bits. Based on the Sync Packet's Mode ID, the row's attributes with that Mode ID are used to process the intra-profile data. Each entry (row) has the following attributes (columns):

Mode: The Mode attribute is the Mode ID provided by the PSC in the Sync packet. It serves as the index to determine which row to use. The MCT is prefilled with Mode ID numbers. Future release will allow an Add/Copy/Move/Delete feature rather than presenting full table with unfilled rows.

DigRx RG: The range gates specified by this attribute form a Profile Data Object of type DigRx. They can be listed individually and/or in groups separated by white space. For instance, 3 5 7 30:99 120:199, would send an I & Q profile with ranges 3, 5, 7, 30 thru 99, and 120 thru 199 (if profile is of ADC type it would send the corresponding ADC samples).

FFT Size: A drop-down list box presents the available FFT sizes. The selected value sets the size of the FFT and inverse FFT (Rev FFT).

Fwd FFT Start Gate: The Fwd FFT Start Gate specifies the first range gate (sample) in the output digital receiver profile to pass to the FFT processor.

Fwd FFT Min. Gates: If the profile length being sent through the FFT processor is less than the FFT Size or if only a subset of the range gates should be processed, the Fwd FFT Min. Gates attribute can be set to reflect the number of gates, starting from the Fwd FFT Start Gate that should be processed. If the total number of range gates is less than the FFT Size, the remaining will be zero padded in the FFT processor. Since the zero padding is done at the processor clock speed, this can speed up the processing time.

Weighting: A drop-down list box presents Weights child objects that have been assigned. If one is selected, the weighting within that object will be applied to the selected portion of the profile that is being passed into the FFT processor.

Fwd FFT RG: The range gates (i.e. FFT bins) specified by this attribute form a Profile Data Object of type Fwd FFT. That is, this attribute specifies which output bins of the FFT processor form its Profile Data Object. They can be listed individually and/or in groups separated by white space. For instance, 0:29 50 90:1023 would send the complex profile produced by the FFT processor containing complex samples 0 thru 29, 50 and 90 thru 1023.

Ref Func: A drop-down list box presents a list of the Reference Function child objects. The selected Reference Function object will be used by the match filter processor.

Rev FFT RG: The range gates (i.e. IFFT bins) specified by this attribute form a Profile Data Object of type Rev FFT. That is, this attribute specifies which output bins of the IFFT processor form its Profile Data Object. They can be listed individually and/or in groups separated by white space. For instance, 0:29 50 90:1023 would send the complex profile produced by the FFT processor containing complex samples 0 thru 29, 50 and 90 thru 1023.

Note that the DigRx RG, Fwd FFT RG and Rev FFT RG attributes are used to form the Profile Data objects but do not affect which range gates are passed through the weighting, FFT, complex multiply and IFFT processors.

With the ability to create Profile Data objects along the processing path without affecting what data is processed in the Intra-Profile processor stages, this processor can support many different types of radar systems and applications. For instance, a linear frequency modulated (LFM) pulse radar's primary output profile would be the output of the match filter processing (i.e. Data Profile Object specified by Rev FFT RG attribute), but range gates prior to the match filter can simultaneously be extracted by forming a DigRx Profile Data object to provide range gates that only have thermal noise (noise gates) prior to convolving these "noise gates" with the reference function. The convolution process would contaminate them through range sidelobes from adjacent gates that contain volume/surface backscatter. Range gates of an internal calibration loop may also be extracted in the same manner prior to the match filter so that they can be used to form the reference function. A FMCW radar with a de-ramp local oscillator only requires a range-amplitude weighting and a forward FFT, thus in this case only the range gates of the forward FFT (Profile Data Object specified by Fwd FFT RG attribute) may be specified. For some radar systems and applications, the direct ADC sampled profile is required. By specifying ADC type in the Down Conv. Child Object MCT, the desired ADC samples can be routed to the Profile Processor using DigRX RG attribute.

Figure 39:
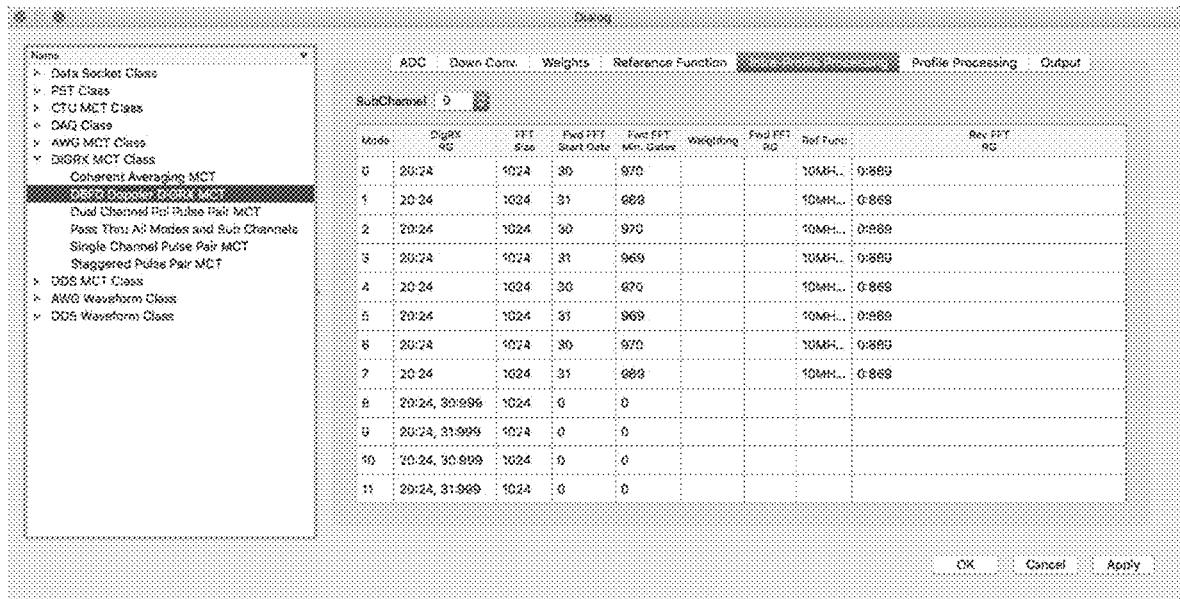
FIG. 39: The DBFD Doppler DIGRX MCT configuration object belonging to the DIGRX MCT Class is shown. Its child object, Processing, is selected and it Intra-Profile Processing MCT for sub channel 0 is shown in the right frame.

FIG. 39 presents the Intra-Processing configuration child object for the DBDF Doppler DIGRX MCT configuration object. The SubChannel drop-down list box (upper left of right frame) has been set to sub channel 0, and as such the Intra-Profile Processing MCT for sub channel 0 is presented in the right frame. Attributes for Mode IDs 0 through 11 have been defined. For Mode ID 0, the DigRx RG attribute is set to 20:24. This will create a Profile Data Object consisting of range gates 20 thru 24 of the digital demodulated and filtered I & Q profile, and send this Profile Data Object to the Profile Processor. These gates represent "thermal noise" gates. With the ability to copy these range gates and send them to the Profile Processor via a Profile Data Object, direct thermal noise measurements (receiver thermal noise power) may be made prior to pulse compression that would introduce return signal contamination through the convolution process from adjacent gates that have volume/surface return within them. The next attribute is the FFT size which sets the forward and inverse FFT sizes to 1024. The next two attributes, Fwd FFT Start Gate and Fwd FFT Min Gates, specify that ranges gates 30 through 999 should be passed through the match filter processing (i.e. forward FFT, complex reference multiply and inverse FFT). Note that the full profile (range gates 0 thru 999) could have been passed if desired. Attributes Weighting and Fwd FFT RG are not set since range-weighting is not being applied and range-spectral response is not needed. The Reference Function object named "10 MHz-10 usec LFM with 25 MHz Fc" has been assigned to Ref Func attribute (second to last column) and range gates 0 thru 869 of the complex profile coming out of the match filter (inverse FFT output) have been assigned to the Rev FFT RG attribute. These gates will form the Profile Data Object that represents the pulsed compressed complex received profile.

For Mode IDs 1 thru 7, the settings are almost the same except that the Fwd FFT Start Gate differs for the Outer Beam modes (odd Mode ID numbers) and the Reference Function Object is matched to the transmitted waveform (i.e. center frequency changes). For Mode IDs 8 through 11, match filter processing is not applied since these modes are noise only (no transmitted pulse).

Figure 40:
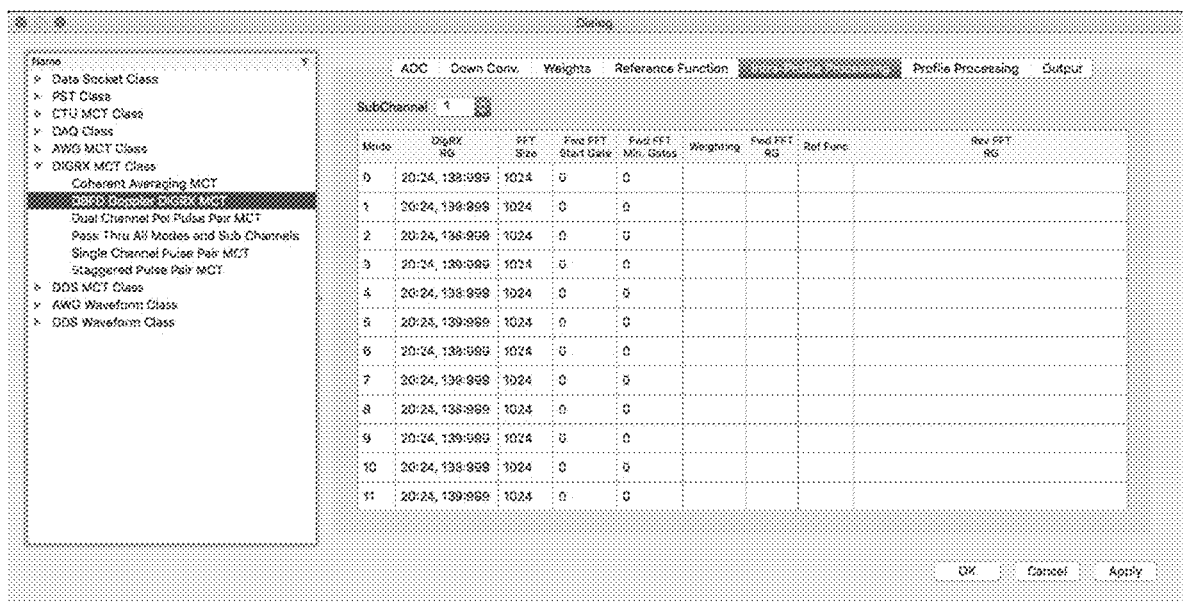
FIG. 40: The DBFD Doppler DIGRX MCT configuration object belonging to the DIGRX MCT Class is shown. Its child object, Processing, is selected and it Intra-Profile Processing MCT for sub channel 1 is shown in the right frame.

FIG. 40 presents the Intra-Profile Processing MCT for sub channel 1. Since the transmitted waveform is a fixed frequency pulse modulated signal, the attributes associated with match filter processing are not assigned. The DigRx RG gates select the same noise gates, but also select range gates associated with the volume/surface backscatter return signals. They start at 138 and 139 for the Inner and Outer beam rather than gates 30 and 31 since the fixed frequency transmit pulse comes after the LFM pulse. Thus, the Profile Data Objects created will have complex receive profiles where the first 5 range gates are the noise gates and the remainder represent the complex received backscatter profile.

Profile Processing Child Object

The Profile Processing child object contains the Profile Processor Input configuration object table (up to 64 Profile Processor Input configuration objects) and the Profile Processor configuration object table (up to 64 Profile Processor configuration objects). Each Profile Processor configuration object instructs its profile processor:

which Profile Processor Input configuration object(s) to use;

what operation to perform; and how to perform the operation.

There are three different operations it can perform:

Pass-thru: Pass its defined input(s) thru unmodified.

Coherent Summation: Coherently sum its defined input(s) over a specified number of successive profiles.

Pulse-Pair: Calculate the autocovariance of its input or covariance of its inputs at a specified lag (separation in number of successive profiles) and accumulate the summation over the specified number of successive pulses.

The output of each profile processor (i.e. Processed Profile Data Object) is directed to the Processed Profile Data Router where its profile header and meta data are added and then sent for data distribution. The meta data includes the number of accumulations executed to form the Processed Profile Data Object. See Section 3 for details on the Processed Profile Data Router.

A Profile Processor Input configuration object table consists of up to 64 rows—each row is a Profile Processor Input configuration object and the object's attributes are defined by the columns. A Processor Input Configuration object is used by the profile processor to select which Profile Data objects to process. The attributes of the Profile Processor Input configuration object are:

Processor Input (name): Defines the name of the object. This name is used by the profile processor configuration object as a pointer to specify it as an input.

Profile Data Type: Defines the profile data type. Three options are presented through a drop-down list box: DigRx, FwdFFT and RevFFT. These correspond to the Profile Data Object types defined by the Intra-Profile Processor MCT attributes: DigRx RG, Fwd FFT RG and Rev FFT RG, respectively (see Section 3).

Profile Mode: Defines which mode or modes (i.e. Mode ID or Mode IDs) belong to the Profile Processing Input configuration object. A single Mode ID is defined by assigning its number to the Profile Mode attribute. Multiple Mode IDs are defined by assigning a Mode ID binary bit mask. For instance, to specify modes 4 and 5, the 8-bit mode binary bit mask would be: 0000010X. Bit 1 and bits 3 thru 7 have to be zero; bit 2 has to be 1 and bit 0 is don't care (i.e. 0 or 1). Bit representation is from most significant to least significant.

Profile Sub Channel: Defines which sub channel or sub channels belong to the Profile Processing Input configuration object. A single sub channel is defined by assigning its number to the Profile Sub Channel attribute. Multiple sub channels are defined by assigning a bit 3-sub channel binary bit mask. For instance, to specify sub channels 4 and 5, the sub channel binary bit mask would be: 10×. This specifies that bit 3 has to be zero; bit 2 has to be 1 and bit 0 is don't care (i.e. 0 or 1). Bit representation is from most significant to least significant.

A Profile Processor configuration object table consists of up to 64 rows—each row is a Profile Processor configuration object; and the tables columns represent the object's attributes. A Profile Processing configuration object has nine attributes:

Processor/Accumulator (Name): Defines the name of the profile processor. This name provides a user-friendly label for downstream processing, display and documentation.

Reset Mode: If a Mode ID is specified, the profile processor will send its accumulated profile (i.e. its Processed Profile Data Object) to the Output Buffer and Data Router processor and reset the accumulator profile values to zero. Any processed data within the current PRI is sent to the accumulator process.

Profile Input 1: Assigns which Processor Profile Input configuration object to use to define the Profile Input 1 to the profile processor. Profile Input 1 represents the current profile. A drop-down list box containing a list of the defined Profile Processor Input configuration objects presents a list of the objects that can be chosen.

Process Type: Specifies the type of processing that will be executed by the profile processor. Drop-down list box provides the following options:

Integer Pass-thru: Converts the Profile Input 1 to 2's complement integer format (32-bit integer for I & Q profile data and 16-bit integer for ADC profile data) and pass this data object to the Output Buffer and Data Router processor. Should only be selected for profiles of type DigRx (see Section 3).

Coherent Accum.: Accumulates the Pulse Pair Input 1 coherently N times where N is defined by the Number of Accum. attribute. Accumulation is performed in floating point. After N accumulations, the Processed Data object is passed to the Output Buffer and Data Router processor. By specifying a value 0 for this attribute, the floating point format of the Profile Input 1 is passed unprocessed (i.e. floating-point pass-thru).

Pulse Pair: Calculates the pulse pair product between Profile Input 1 and Profile Input 2 (defined below) with a lag defined by Profile Input 2 Lag. Accumulates results N times where N is defined by the Number of Accum. attribute. Calculations and accumulations are performed in floating point. The result, its Processed Profile Data Object, is passed to the Output Buffer and Data Router processor Profile Input 2: Assigns which Processor Profile Input configuration object to be used to define the Profile Input 2 to the profile processor. A drop-down list box containing a list of the defined Profile Processor Input configuration objects presents a list of the objects that can be chosen.

Profile Input 2 Lag: Specifies the number of successive profiles (lag) from Pulse Pair Input 1. If the number of successive profiles between Profile Input 1 and Profile Input 2 equals the Profile Input 2 Lag, the profile processor performs its calculations.

Start: Range gate number of the input profiles (Profile Input 1 and Profile Input 2) to feed as the first range gate of the profiles sent into the profile processor.

Length: Specifies the number of range gates of Profile Input 1 and Profile Input 2 from the range gate defined by the Start attribute that should be passed through the processor.

Accumulations: Specifies the number of accumulations to perform. A value of 0 represents a pass thru where the input profiles are passed through without accumulation.

Figure 41:
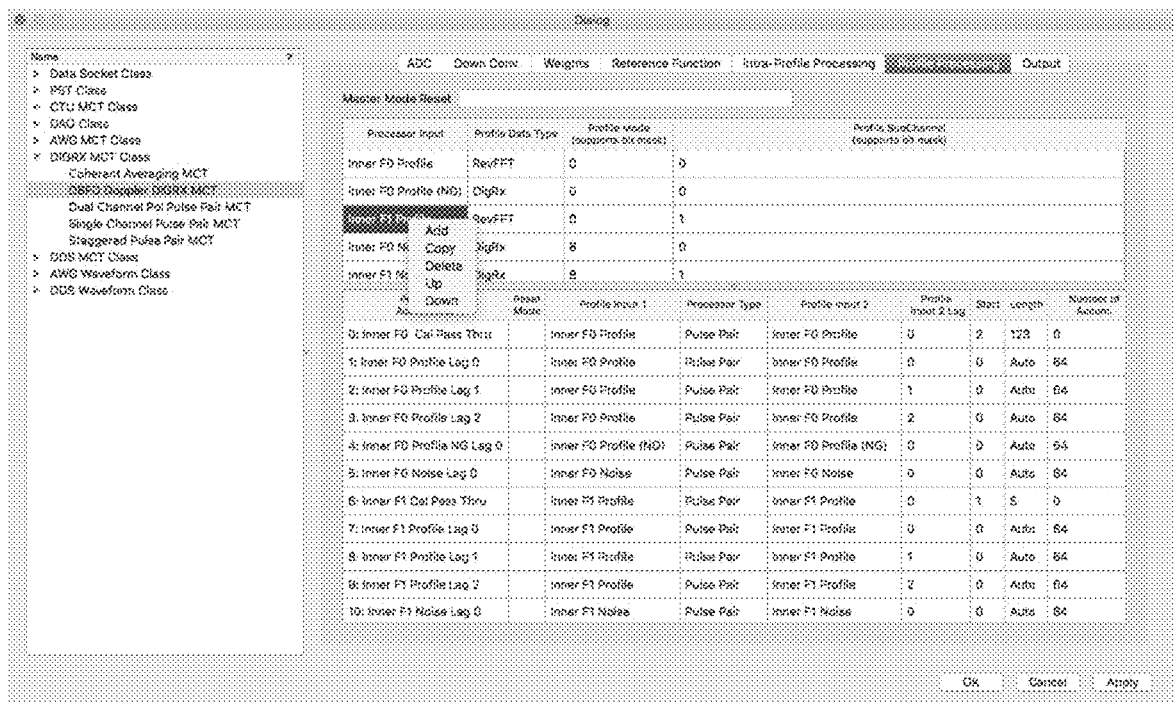
FIG. 41: The DBFD Doppler DIGRX MCT configuration object belonging to the DIGRX MCT Class is shown. Its child object, Profile Processing, is selected (Profile Processing Tab) and its attributes and objects shown in the right frame. Its Profile Processing Input object "Inner F1 Profile" has been right clicked causing a popup menu to appear.

FIG. 41 shows a Profile Processing child object for the DBFD Doppler MCT configuration object. The Profile Processing child object's Master Reset Mode attribute, Profile Processor Input configuration objects table (just below Master Mode Reset) and Profile Processing configuration objects table (beneath the Profile Processor Input objects table) are presented. The table containing the Profile Processor Input configuration objects has been right clicked and a popup menu with the options: Add, Copy, Delete, Up and Down, is shown. This popup menu allows a Profile Processing Input configuration object to be added, copied, deleted or moved within the table (up or down). Likewise, right clicking on the Profile Processing configuration objects table would produce the same popup menu that allows a Profile Processing configuration object to be added, copied, deleted or moved.

Left clicking in any field, the attribute value can be entered or selected from a drop-down list box as discussed above. Below several examples of different Profile Processor child objects are presented to illustrate different processor types and some of the features. As with the earlier sections, the DBDF Doppler Radar configuration example is presented at the end of this section.

Pass-Thru Examples

A profile processor can be instructed by its Profile Processor configuration object to pass through (i.e. no additional processing applied) Profile Data objects to the Processed Profile Data Router processor. Its Profile Input 1 attribute is assigned a Profile Processing Input configuration object. This object instructs the profile processor which Profile Data objects to pass through based on their Data Type, Mode ID and Sub Channel attributes. As mentioned above, through the use of mode bit-mask and sub channel bit mask, Profile Data objects with different Mode ID attributes and/or different Sub Channel attributes can be processed by a single profile processor. To illustrate, two examples are presented below: 1) Profile Data objects with a SubChannel attribute value 0 and any Mode ID attribute are passed through, and 2) Profile Data objects with any SubChannel and ModeID attributes are passed through.

Pass-through Example 1: All Mode IDs, Sub Channel 0 Only.

Figure 42:
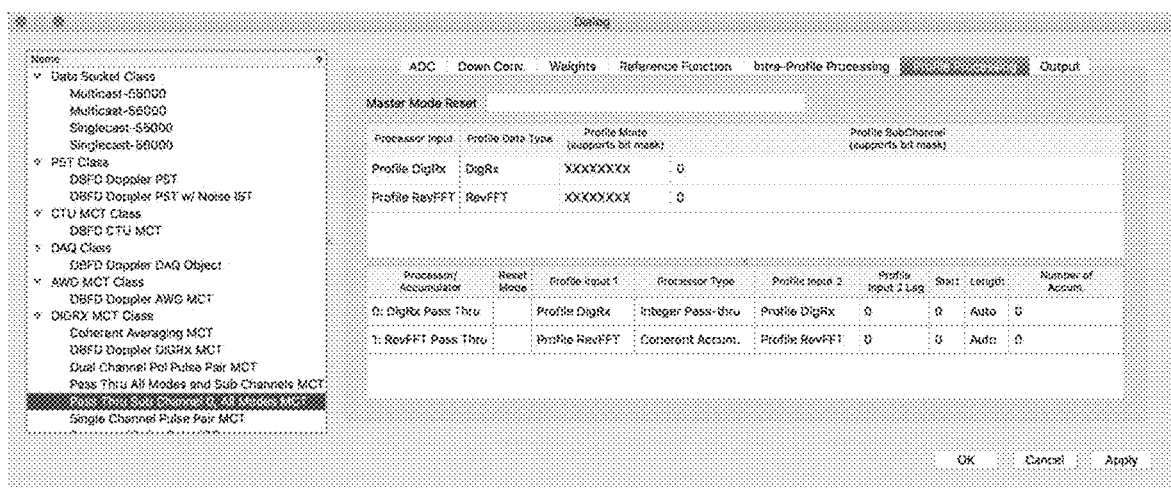
FIG. 42: The "All Modes, Sub Channel 0 Pass Thru MCT" object belonging to the DIGRX MCT Class is shown. Its Profile Processing child objects attributes and objects are shown in the right frame. This Profile Processing child object will create two profile processors that will pass thru all profiles of types DigRx and RevFFT with SubChannel attribute of 0.

FIG. 42 presents the Profile Processing child object of the DigRX MCT configuration object named, "PassThru Sub Channel 0, All Modes MCT" has been created to pass through Profile Data objects with Data Type attribute of DigRx or RevFFT, with Sub Channel attribute of 0 and with any Mode ID attribute. To create this pass through, the first step is to create two Profile Processing Input configuration objects: one specifying to use Profile Data objects of type DigRx and the other specifying to use Profile Data objects of type RevFFT. The second step is to create the corresponding Profile Processing Configuration objects that will instruct their profile processors to pass through the Profile Data objects meeting the Profile Processing Input configuration objects' criteria.

Profile Processing Input Configuration Objects: The Profile Processor Input configuration objects table contains two Profile Processing Input objects. Their names (Processor Input attribute) are "Profile DigRx" and "Profile RevFFT". The Profile Type attribute for Profile DigRx and Profile RevFFT are set to DigRx and RevFFT, respectively. To pass Profile Data objects with any Mode ID attribute, the Profile Mode attribute for both of these configuration objects is set using the Mode ID binary bit mask: XXXXXXXX (i.e. 8-bit makes specifying all modes using don't care). To process only Profile Data objects with a SubChannel attribute of 0, their Profile SubChannel attribute is set to 0.

Profile Processor Configuration Objects: The Profile Processor configuration object table contains two Profile Processor configuration objects. Their names (Processor/Accumulator Name attribute) are "DigRx Pass Thru" and "RevFFT Pass Thru", respectively. The "0:" and "1:" prefixes have been automatically attached to represent their Processor Number attribute. Future release will independently present the Processor Number attribute in the left most column. Note that the order of profile processors in some cases can provide further optimization. If an object is moved within the table (i.e. up/down), its Processing Number attribute is updated according its new position in the table.

The DigRx Pass Thru Profile Processor configuration object will instruct its profile processor to perform Integer Pass-thru processing on Profile Data objects with the attributes specified by the Profile Processing Input configuration object named "Profile DigRx". This is accomplished by setting its Profile Input 1 attribute to "Profile DigRx" and Processor Type attribute to Integer Pass-thru. To pass through the full profile of each selected Profile Data object, the Start attribute is set to 0 and the Length attribute is set to Auto. The Number of Accum. attribute is set to 0. This is required for pass through processing. Attributes Profile Input 2 and Profile Input 2 Lag have been assigned Profile Dig Rx and 0, respectively, but are not used by the profile processor when Processor Type is set to Integer Pass-thru. In a future release, the Profile Input 2, Profile Input 2 Lag and Number of Accum. attribute fields will be grayed out when Processor Type is set to Integer Pass-thru.

The RevFFT Pass Thru Profile Processor configuration object will instruct its profile processor to perform pass-thru processing on Profile Data objects with the attributes specified by the Profile Processing Input configuration object named "Profile RevFFT". This is accomplished by setting its Profile Input 1 attribute to "Profile RevFFT" and Processor Type attribute to Coherent Accum. To implement pass-thru processing and not coherent accumulation, its Number of Accum. attribute is set to 0. To pass through the full profile of each selected Profile Data object, the Start attribute is set to 0 and the Length attribute is set to Auto. Attributes Profile Input 2 and Profile Input 2 Lag have been assigned Profile RevFFT and 0, respectively, but are not used by the profile processor when Processor Type is set to Coherent Accum. In a future release, the Profile Input 2, Profile Input 2 Lag and Number of Accum. attribute fields will be grayed out when Processor Type is set to Coherent Accum.

Pass-Through Example 2: All Mode IDs, All Sub Channels

Figure 43:
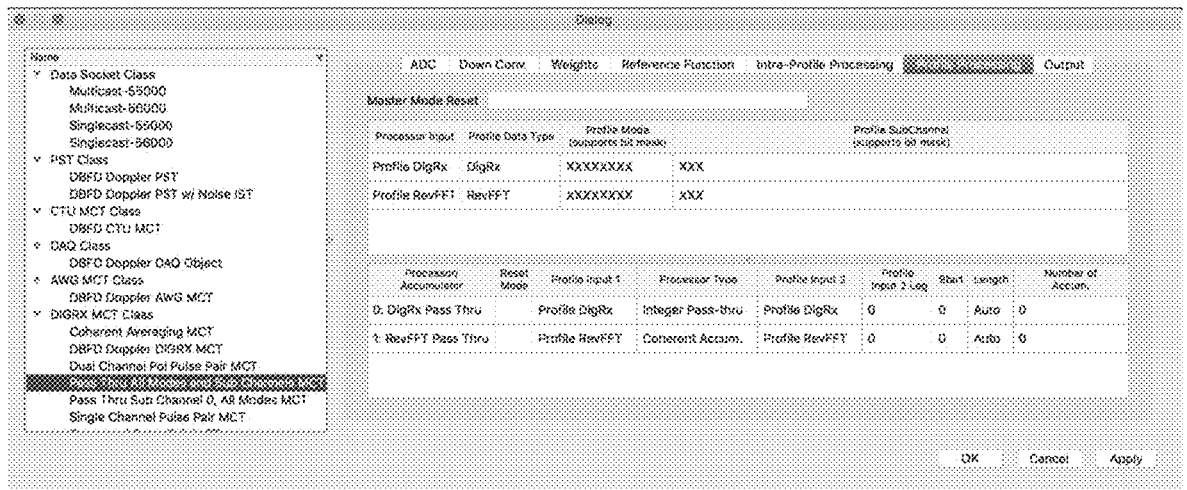
FIG. 43: The "Pass Thru All Modes and Sub Channels MCT" object belonging to the DIGRX MCT Class is shown. Its Profile Processing child objects attributes and objects are presented in the right frame. This Profile Processing child object will create two profile processors that will pass thru all profiles of types DigRx and RevFFT.

FIG. 43 presents the Profile Processing child object of the DigRX MCT configuration object named, "PassThru All Modes and Sub Channels MCT" that has been created to pass through Profile Data objects with Data Type attribute of DigRx or RevFFT, any Mode ID attribute and any SubChannel attribute. This example is the same as Pass-Through Example 1 with the exception that the Profile SubChannel attribute for the Profile DigRx and Profile RevFFT Process Input configuration objects has been assigned a sub channel binary bit mask of XXX instead of a value of 0. With this sub channel binary bit mask, Profile Data objects with SubChannel attribute between 0 and 7 inclusive, and Profile Data Type of DigRx or RevFFT will be passed through the profile processor to the Processed Profile Data Router processor unmodified.

Coherent Accumulation Example

Figure 44:
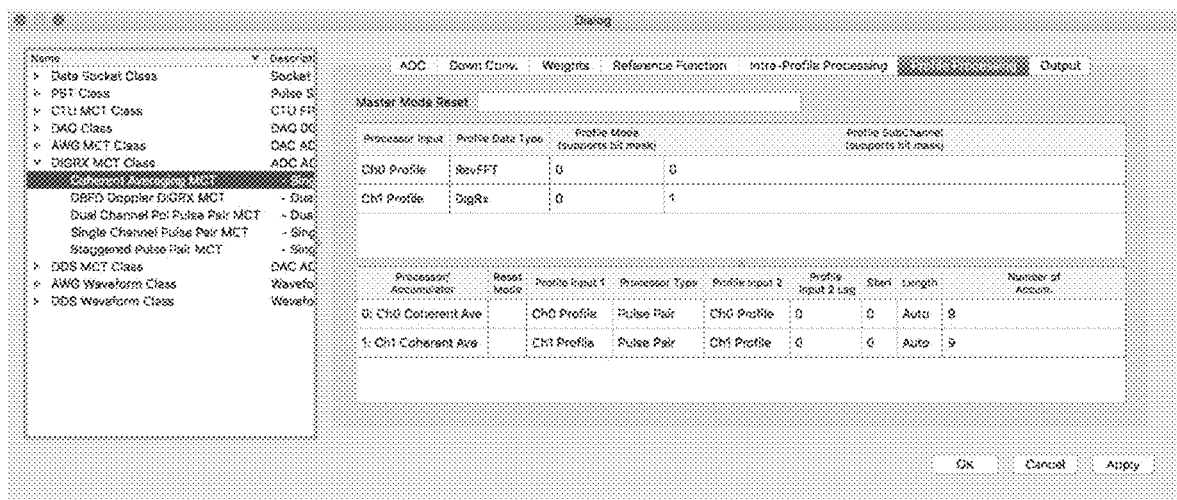
FIG. 44: The "Coherent Averaging MCT" object belonging to the DIGRX MCT Class is shown. Its Profile Processing child objects attributes and objects are presented in the right frame. This Profile Processing child object will create two profile processors that will coherently accumulate Profile Data objects. The first profile processor coherently accumulates Profile Data objects with attributes: Data Type RevFFT, Mode ID 0 and SubChannel 0. The second profile processor coherently accumulates Profile Data objects with attributes: Data Type DigRx, Mode ID 0 and SubChannel 1.

A profile processor can be instructed by its Profile Processor configuration object to coherently accumulate Profile Data objects and pass the accumulated profile(s) to the Processed Profile Data Router processor. In FIG. 44, the Profile Processing child object, belonging to the "Coherent Averaging MCT" configuration object, configures two profile processors. Its first profile processor configuration object named "Ch0 Coherent Ave" instructs its profile processor to coherently accumulate every 9 consecutive Profile Data objects with attributes: Data Type RevFFT, Mode ID 0 and SubChannel 0. The second profile processor configuration object named "Ch1 Coherent Ave" instructs its profile processor to coherently accumulates every 9 consecutive Profile Data objects with attributes: Data Type DigRx, Mode ID 0 and SubChannel 1.

Pulse-Pair Processing Examples

A profile processor can be instructed by its Profile Processor configuration object to implement pulse-pair processing. Three different cases are presented below that represent typical implementations. These are only meant as examples as the ARENA object-based network architecture offers immense flexibility. The three examples presented below are:

Single Channel Pulse Pair: Single channel system where pulse-pair products with lags 0, 1 and 2 are generated and accumulated.

Dual Channel Polarimetric Pulse Pair: Dual channel receiver system where co-polarized (Co-Pol) and cross-polarized (X-Pol) pulse-pair products with lags 0 and 1 are generated and accumulated.

Staggered Pulse Pair with Interrupt Mode: A single channel system operating with a staggered pulse repetition frequency (PRF) where pulse-pair products with lags 0, 1 and 2 are generated and accumulated. Additionally, this system has a calibration interrupt mode in which a separate pulse-pair product with a lag 0 is generated and accumulated.

Single Channel Pulse Pair Example

Figure 45:
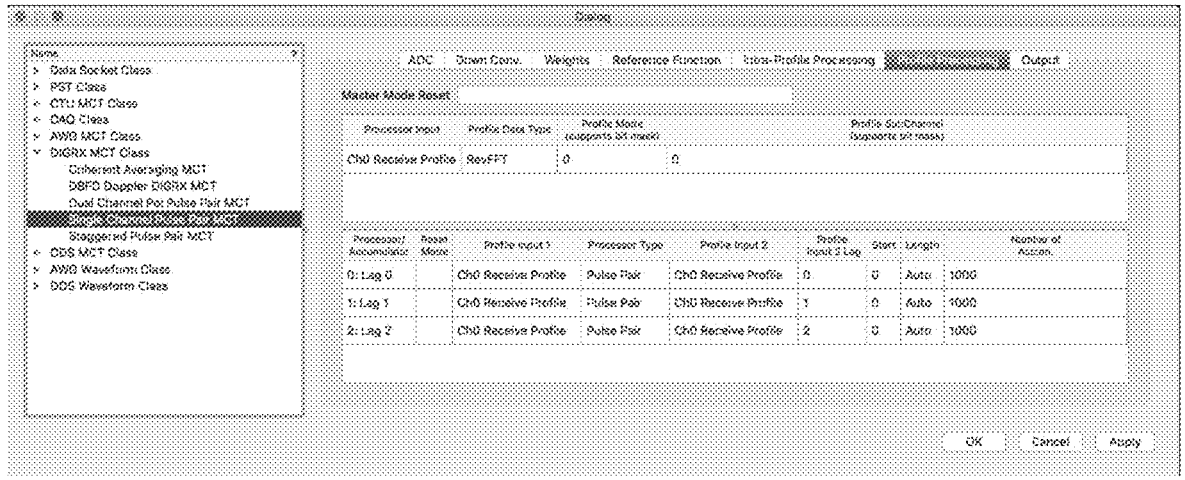
FIG. 45: The "Single Channel Pulse Pair MCT" object belonging to the DIGRX MCT Class is shown. Its Profile Processing child objects attributes and objects are presented in the right frame. This Profile Processing child object creates three profile processors that calculate and accumulate the lag 0, 1 and 2 pulse-pair products of the Profile Data objects with attributes: Data Type RevFFT, Mode ID 0 and SubChannel 0. Accumulated pulse-pair products are sent out every 1000 profiles.

FIG. 45 presents the Profile Processor child object belonging to the "Single Channel Pulse Pair MCT" configuration object. It configures three profile processors: Lag 0, Lag 1 and Lag 2 (i.e. their Processor/Accumulator Name attribute). Each Profile Processor configuration object's Processor Type attribute is defined as "Pulse Pair". This instructs each profile processor to calculate the covariance of its inputs that defined by attributes: Profile Input 1 and Profile Input 2, at the lag specified by attribute: Profile Input 2 Lag. Since Profile Input 1 and Profile Input 2 attributes are assigned the same Profile Processor Input configuration object (i.e. "Ch0 Receive Profile"), the calculation is the autocovariance at the specified lag. Note that the Profile Processor Input configuration object "Ch0 Receive Profile" specifies that Profile Data objects to process must have attributes: Data Type equal to RevFFT, Mode ID equal to 0 and SubChannel equal to 0. The Lag 0, Lag 1 and Lag 2 Profile Processor configuration objects have been assigned a Profile Input 2 Lag attribute of 0, 1 and 2, respectively. This means that the "Lag 0" profile processor will calculate the lag 0 autocovariance of its inputs, the "Lag 1" profile processor will calculate the lag 1 autocovariance of its inputs and the "Lag 2" profile processor will calculate the lag 2 autocovariance of its inputs. The Profile Configuration objects instruct their profile processors to accumulate their products over 1000 consecutive profiles (i.e. Number of Accum. attribute is set to 1000). For the first set of accumulations, the profile processor Lag 0 will accumulate 1000 profiles, Lag 1 999 profiles and Lag 2 998 profiles since after the first 1000 profiles, there would have only been 999 lag 1 profiles and 998 lag 2 profiles. After the first 1000 profiles, the Profile Data buffer will retain Profile Data objects from the 999th and 1000th transmit-receive periods, thus each profile processor will accumulate 1000 profiles going forward. The actual number of profiles accumulated is passed as meta data in the profile header within each Processed Profile Data object.

Dual Channel Polarimetric (Pol) Pulse Pair Example

Figure 46:
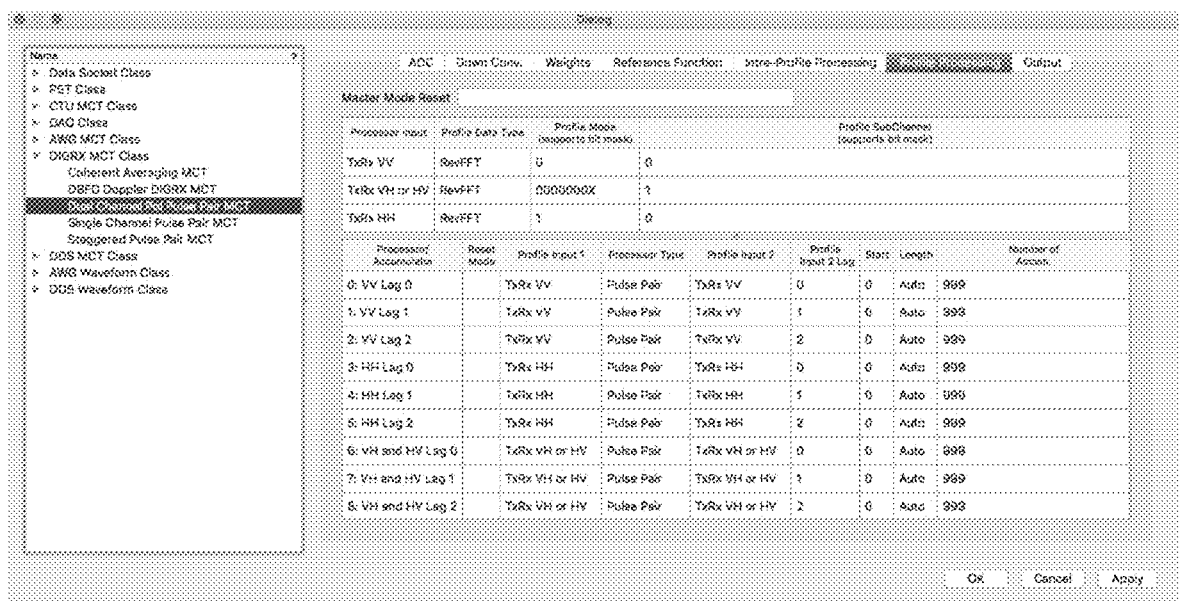
FIG. 46: The "Dual Channel Pol Pulse Pair MCT" object belonging to the DIGRX MCT Class is shown. Its Profile Processing child objects attributes and objects are presented in the right frame. This Profile Processing child object, through nine profile processors, calculates and accumulates lag 0, 1 and 2 pulse-pair products for a dual polarized radar.

FIG. 46 presents the Profile Processing child object for the "Dual Channel Pol Pulse Pair MCT" configuration object. It configures nine profile processors to calculate and accumulate the lag 0, 1 and 2 pulse-pair products for Co-Pol and X-Pol profiles as follows:

Profile processors 0, 1 and 2 calculate and accumulate pulse-pair products for lags 0, 1 and 2 for Co-pol vertically polarized (VV) profiles.

Profile processors 3, 4 and 5 calculate and accumulate pulse-pair products for lags 0, 1 and 2 for Co-pol horizontally polarized (HH) profiles.

Profile processors 6, 7 and 8 calculate and accumulate pulse-pair products for lags 0, 1 and 2 for X-pol (VH or HV) profiles.

Note that since VH and HV backscattering is the same, the pulse pair products for these profiles can be accumulated together and thus use the same profile processor.

In addition to illustrating how to configure the Profile Processor to generate these pulse-pair products, this example shows how sub channel assignment can be used to improve efficiency. The dual-channel receiver has its V-Pol receive channel connected to ADC Channel 0 and H-Pol received channel connected to ADC Channel 1. The radar transmits vertical polarization for three consecutive transmit-receiver periods (Mode ID 0), then horizontal polarization for three consecutive transmit-receiver periods (Mode ID 1). It continues this sequence over and over. The Down Conv. child object's down conversion MCT for sub channel 0 assigns ADC Channel attribute to 0 for Mode ID 0 and 1 for Mode ID 1. That is, sub channel 0 always processes the Co-Pol receive signal. Likewise, the down conversion MCT for sub channel 1 assigns ADC Channel attribute to 1 for Mode ID 0 and 0 for Mode ID 1. That is, sub channel 1 always processes the X-Pol signal.

The above ADC Channel and sub channel configuration allows the sub channel number to identify whether a Profile Data object is a co-pol measurement or a cross-pol measurement, and the Mode ID establishes whether the transmit signal was vertical or horizontal. Thus, the Profile Processor Input configuration object's Profile Mode and Profile Sub-Channel attributes are assigned 0 and 0, respectively, for VV case and 1 and 0, respectively, for HH case. For VH or HV case set, the Profile Processor Input configuration object Profile Mode attribute is set to 0000000X and Profile SubChannel attribute to 1. In this manner, the same profile processors can be used for VH and HV, thus eliminated the total number of processors by 3, which reduces the power consumption and data rates.

Staggered PRF with Calibration Interrupt Example

Figure 47:
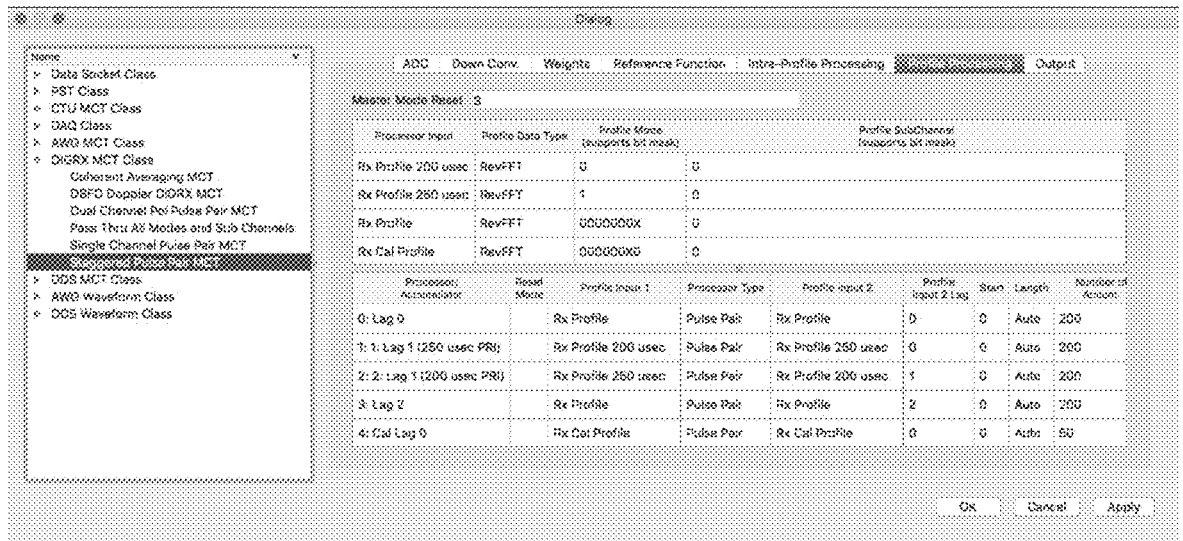
FIG. 47: The "Staggered Pulse Pair MCT" object belonging to the DIGRX MCT Class is shown. Its Profile Processing child objects attributes and objects are presented in the right frame. This Profile Processing child object, through four profile processors, calculates and accumulates lag 0, 1 and 2 pulse-pair products for a staggered PRF radar and one additional profile processor calculates and accumulates the lag 0 pulse-pair product for a calibration interrupt mode (Mode ID 3).

FIG. 47 presents the Profile Processing child object for the "Staggered Pulse Pair MCT" configuration object. In this example, the radar alternates between two pulse repetition frequencies: 4 KHz and 5 KHz, to effectively achieve a higher unambiguous Doppler range. This has no effect on lag 0 pulse-pair calculations since these calculations are magnitude only, and the lag 2 pulse-pair calculations are not affected since the time between profiles separated by even number is the same. However, for lag 1 pulse-pair calculations, the time between profiles will alternate between 200 μsec and 250 μsec. Thus, separate pulse-pair processors must be configured to calculate and accumulate the lag 1 pulse-pair calculations.

This is achieved by creating three Profile Processor Input configuration objects:

Rx Profile 200 μsec: Profile Mode attribute is assigned Mode ID 0 which is the 200 μsec transmit-receive mode.

Rx Profile 250 μsec: Profile Mode attribute is assigned Mode ID 1 which is the 250 μsec transmit-receive mode.

Rx Profile: Profile Mode attribute is assigned a Mode ID binary bit mask of 0000000X (i.e. represents both Mode ID 0 and Mode ID 1).

The Profile Input 1 and Profile Input 2 attributes for the Profile Processing configuration objects for the lag 0 and lag 2 pulse-pair calculations and accumulations are set to "Rx Profile". The Profile Processing configuration object for the profile processor calculating and accumulating the lag 1 pulse-pair product over the 250 µsec pulse repetition period is assigned Profile Processing Input configuration objects: "Rx Profile 200 µsec" and "Rx Profile 250 µsec" for its Profile Input 1 and Profile Input 2 attributes; and the Profile Processing configuration object for the profile processor calculating and accumulating the lag 1 pulse-pair product over the 200 µsec pulse repetition period is assigned Profile Processing Input configuration objects: "Rx Profile 250 µsec" and "Rx Profile 200 µsec" for its Profile Input 1 and Profile Input 2 attributes.

This radar system also enters a magnitude calibration measurement phase when it receives an interrupt signal. This signal is asynchronous. In order not to corrupt the above pulse-pair calculations and accumulations, when this interrupt is received, the profile processors need to send out their accumulated products and reset their accumulators. This is achieved using the Master Mode Reset attribute of the Profile Processing configuration object. Upon receiving an interrupt signal, the PSC Interrupt Sequence Table executes Mode ID 3. Then it repeats with Mode ID 2 another 49 times. The configurations for Mode ID 2 and 3 are the same, the only difference is Mode ID marks the beginning of the interrupt sequence. To implement lag 0 pulse-pair processing for this interrupt sequence an additional Profile Processor Input configuration object is defined named "Rx Cal Profile", and a fifth Profile Processor configuration object is defined with Profile Input 1 and Profile Input 2 attributes assigned to "Rx Cal Profile", its Profile Input 2 Lag attribute set to 0 and Number of Accum. attribute set to 50. When Mode Id 3 occurs, the accumulated products in the first four profile processors is sent to the Processed Profile Data Router and their accumulators reset. The fifth Profile Processor (Cal Lag 0) begins calculating and accumulating its lag 0 pulse-pair product.

DBFD Doppler DIGRX MCT Example

Figure 48:
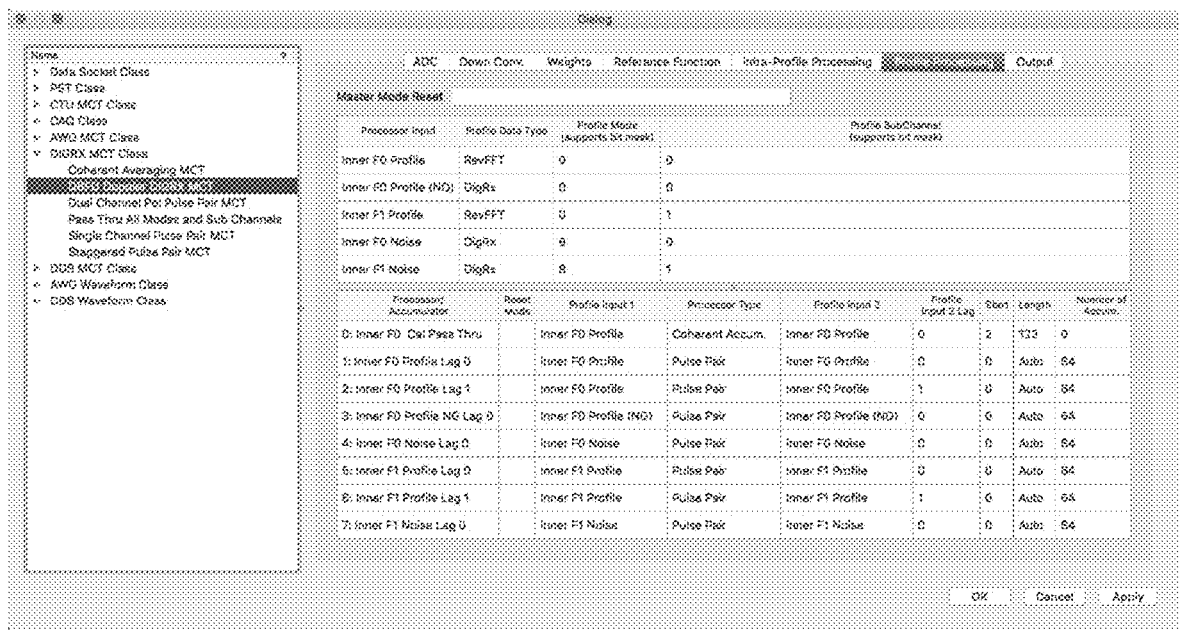
FIG. 48: The "DBFD Doppler DIGRX MCT" object belonging to the DIGRX MCT Class is shown. Its Profile Processing child objects attributes and objects are presented in the right frame. This Profile Processing child object, calculates and accumulates lag 0 and 1 pulse-pair products for its receive profiles from its chirp and fixed frequency pulses, implements pass-thru of its internal calibration signals, and calculates and accumulates lag 0 of its thermal noise profiles. It has a total of 40 Profile Processing Input configuration objects and 64 Profile Processor configuration objects.

FIG. 48 presents the Profile Processing child object for the "DBFD Doppler DIGRX MCT" configuration object. There are a total of 64 Profile Processor configuration objects that use a total of 40 Profile Processing Input configuration objects. For simplicity, only those associated with the Inner beam profiles at frequencies F0 and F1 are shown. Profile Mode and Profile SubChannel attributes are used to distinguish which Profile Data objects are from the Inner beam and at frequencies F0 and F1, and which are noise only measurements and which are backscatter receive signals. The Profile Data Type attribute is used to separate those Profile Data objects that are "noise gates" (have not passed through the match filter processing). With these Profile Processing Input configuration objects eight Profile Processor configuration objects are created that perform the following:

Inner F0 Cal Pass Thru: Instructs profile processor 0 to pass through the internal calibration gates of the pulse compressed signal from the Inner beam. This provides direct measurement of the range sidelobe suppression and complex transceiver transfer function.

Inner F0 Profile Lag 0: Instructs profile processor 1 to calculate and accumulate lag 0 pulse-pair product (64 accumulations) for the pulse compressed return profile at frequency F0.

Inner F0 Profile Lag 1: Instructs profile processor 2 to calculate and accumulate lag 1 pulse-pair product (64 accumulations) for the pulse compressed return profile at frequency F0.

Inner F0 Profile NG Lag 0: Instructs profile processor 3 to calculate and accumulate lag 0 pulse-pair product (64 accumulations) of the noise gates acquired at frequency F0.

Inner F0 Noise Lag 0: Instructs profile processor 4 to calculate and accumulate lag 0 pulse-pair product (64 accumulations) of the noise only profiles acquired at frequency F0.

Inner F1 Profile Lag 0: Instructs profile processor 5 to calculate and accumulate lag 0 pulse-pair product (64 accumulations) for the return profile at frequency F1.

Inner F1 Profile Lag 1: Instructs profile processor 6 to calculate and accumulate lag 1 pulse-pair product (64 accumulations) for the return profile at frequency F1.

Inner F1 Noise Lag 0: Instructs profile processor 7 to calculate and accumulate lag 0 pulse-pair product (64 accumulations) of the noise only profiles acquired at frequency F1.

AWG Waveform Class

A configuration object belonging to the AWG Waveform class defines a waveform that can be selected as a AWG Waveform Object attribute in the AWG MCT (see Section 3). It has the following attributes:

Sampling Freq.: DAC clock frequency in MHz.

Pulse List: List of the pulses in their order that comprise the waveform. It is located just below the Sampling Freq. input field. Right clicking the white space a pop-up menu with the option "Add" will appear. Selecting Add will create a new pulse called Pulse in the list. Double left clicking on its name, its name can be changed. Right clicking on a pulse name in the list, a pop-up menu with the options: Add, Copy, Delete, Up and Down, will appear. This allows a pulse to be added, copied, deleted or moved. The Up and/or Down options may not appear depending on where the pulse name is in the list. Left clicking on a pulse in the list, its attributes will appear in the right portion of the frame.

Center Freq.: Center frequency in MHz of the selected pulse.

Bandwidth: Sweep bandwidth of the selected pulse. If set to zero, the bandwidth is defined by the pulse width attribute. If non-zero and positive, the pulse will be a LFM with a positive slope. A negative value will produce a LFM with a negative slope.

Initial Phase: Initial phase of the pulse specified in degrees.

After Pulse Delay: Delay after the pulse before the next pulse in the waveform can be generated. The minimum value is 0.1 µsec currently. A value should always be specified even if there are no pulses following the selected pulse in the list.

Pulse Width (time): Pulse width of the selected pulse defined in µsec. If entered the Pulse Width in samples will be updated.

Pulse Width(samples): Pulse width in samples (# of cycles of sampling frequency). If entered, the Pulse Width in µsec will be updated.

"Taper List": Drop-down list box of available amplitude tapers that can be applied to the selected pulse. The selected taper is displayed in the plot window located at the bottom right of the right panel.

Alpha: Alpha value when Tukey Taper is selected.

Scale: Voltage scale factor applied to the pulse. A value of 1 is full scale.

Waveform File: Custom waveform file to load. Waveform file should represent the double precision value of the waveform sampled at the Sampling Freq.

FIG. 49 presents the AWG waveform configuration object named, "Chirp-Pulse: Freq 0,1" and belonging to the AWG Waveform class. This AWG Waveform configuration object creates waveform with two pulses separated by 100 nsec. The first pulse is a LFM pulse of 10 μsec length, 10 MHz sweep bandwidth and a center frequency of 775 MHz. The second pulse is a fixed frequency pulse centered at 815 MHz with a 100 nsec pulse width. A Tukey taper with an alpha value of 0.1 is applied to both pulses.

DAC Waveform Objects Class

A configuration object belonging to the DAC Waveform class defines a waveform that can be selected as a DDS Waveform Object attribute in the DDS MCT. It has the following attributes:

Sampling Freq.: DAC clock frequency in MHz.

Pulse List: List of the pulses in their order that comprise the waveform. It is located just below the Sampling Freq. input field. Right clicking the white space a pop-up menu with the option "Add" will appear. Selecting Add will create a new pulse called Pulse in the list. Double left clicking on its name, its name can be changed. Right clicking on a pulse name in the list, a pop-up menu with the options: Add, Copy, Delete, Up and Down, will appear. This allows a pulse to be added, copied, deleted or moved. The Up and/or Down options may not appear depending on where the pulse name is in the list. Left clicking on a pulse in the list, its attributes will appear in the right portion of the frame.

Center Freq.: Center frequency in MHz of the selected pulse.

Bandwidth: Sweep bandwidth of the selected pulse. If set to zero, the bandwidth is defined by the pulse width attribute. If non-zero and positive, the pulse will be a LFM with a positive slope. A negative value will produce a LFM with a negative slope.

Initial Phase: Initial phase of the pulse specified in degrees.

After Pulse Delay: Delay after the pulse before the next pulse in the waveform can be generated. The minimum value is 0.1 μsec currently. A value should always be specified even if there are no pulses following the selected pulse in the list.

Pulse Width (time): Pulse width of the selected pulse defined in μsec. If entered the Pulse Width in samples will be updated.

Pulse Width(samples): Pulse width in samples (# of cycles of sampling frequency). If entered, the Pulse Width in μsec will be updated.

"Taper List": Drop-down list box of available amplitude tapers that can be applied to the selected pulse. The selected taper is displayed in the plot window located at the bottom right of the right panel. Note this feature is not currently enabled but will be in a future release.

Alpha: Alpha value when Tukey Taper is selected.

Scale: Voltage scale factor applied to the pulse. A value of 1 is full scale.

Waveform File: Custom waveform file to load. Waveform file should represent the double precision value of the waveform sampled at the Sampling Freq.

FIG. 50 presents the DDS waveform configuration object named, "Chirp-Pulse: Freq 0,1" and belonging to the DDS Waveform class. This DDS Waveform configuration object creates waveform with two pulses separated by 100 nsec. The first pulse is a LFM pulse of 10 μsec length, 10 MHz sweep bandwidth and a center frequency of 775 MHz. The second pulse is a fixed frequency pulse centered at 815 MHz with a 100 nsec pulse width.

Processed Profile Data Router

The Processed Profile Data Router contains the Processed Profile Data Object buffer and the Data Router processor. As Processed Profile Data objects are generated by the Profile Processor, they are sent to this processor which writes the profile header and meta data to the header attribute of the Processed Profile Data Object and then writes the object to its Processed Profile Data Object buffer. The structure of this buffer is currently determined by the Output child object of the configuration object belonging to the DIGRX MCT class. The width of this buffer currently sets the packet payload size when the Processed Profile Data object is directed to a socket or socket(s). The width is optimized for network communications and is not related to the Processed Profile Data Object size. A single row in this buffer may contain several data objects or several rows will be required to hold a single data object. In a future release a separate class will be formed for the Process Profile Data Router that will contain output buffer and destination objects for routing the data.

4. ARENA GUI: Run-time Configuration and Operation

The main arenaGUI window provides the ARENA run-time configuration interface and operational controls. Below, run-time configuration object assignment and viewing and status data are discussed while later sections describe an overview of ARENA operation. See Section 3 for instructions on how to launch the arenaGUI application.

ARENA Run-Time Configuration

Figure 51:
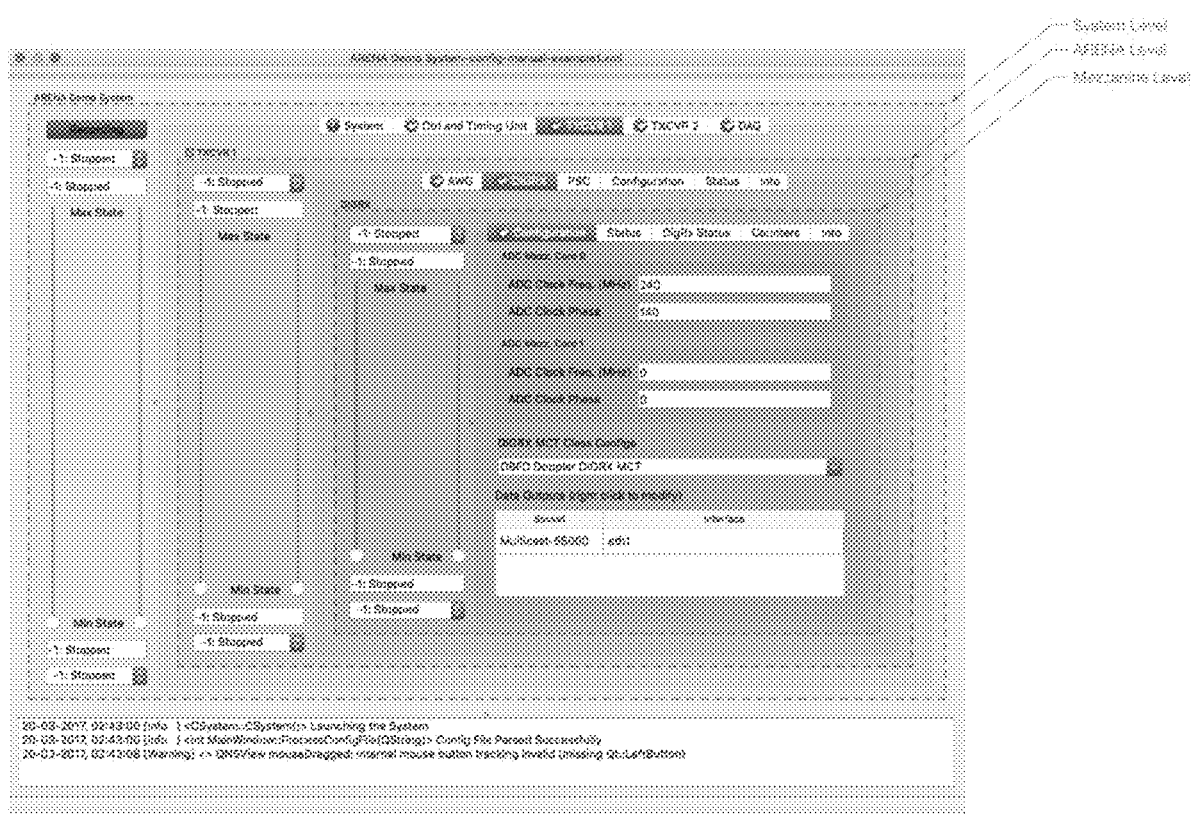
FIG. 51: Layout of the arenaGUI application's main window with respect to run-time (RT) configuration and status. MC stands for mezzanine card.

The ARENA run-time (RT) configurations are assigned through the arenaGUI main window. The RT configurations are comprised of configuration objects that were created by the Config Editor (see Section 3) and are selected through this interface as well as other attributes that are either specific to an ARENA module or mezzanine card. FIG. 51 presents a screen grab of the arenaGUI's main window. It is comprised of three levels: <System Level>, <ARENA Level> and <Mezzanine Level>.

System Level: The System Level outer frame presents a tab for the system level configuration (ARENA Demo System) and each ARENA module as defined by the system.xml file. These tabs are selectable (TXCVR1 is shown selected). The selected ARENA module appears in the ARENA Level frame. System Level Frame also contains run-time controls.

ARENA Level: The ARENA Level frame resides within the System Level and presents selectable tabs for the mezzanine card (if present), PSC (Primary Sequence Controller), Configuration, Status and Info. The latter four are associated with the ARENA modules themselves, whereas the mezzanine tabs are associated with the mezzanine cards that is plugged into the ARENA module. In the case presented in FIG. 51, the mezzanine card, DIGRX, has been selected at the ARENA Level and is displayed in the Mezzanine Level. The Configuration Tab presents the ARENA Level configuration attributes and configuration objects associated with that ARENA module. The Status and Info tabs are related to run-time operations and are discussed below. Run-time controls for the ARENA module are also part of this frame. The PSC tab allows the configuration object for the PSC to be selected if the selected ARENA is set as a master controller in the system.xml file.

Mezzanine Level: The Mezzanine Level frame resides within the ARENA Level frame and is selected by the ARENA Level mezzanine tab. The Mezzanine Level has Configuration, Status, Mezzanine firmware object status (i.e. DigRx Status), Counters and Info tabs. The Configuration tab presents the attributes and configuration objects associated with the mezzanine card, in this case the DIGRX. The Status, Counters and Info tabs are associated with run-time operations. Run-time controls for the mezzanine card are contained within this frame.

The attributes entered and configuration objects selected at the ARENA and Mezzanine Levels become the run-time configuration for those ARENA modules. In the example given in FIG. 51, the Mezzanine Level Configuration tab under the ARENA Level DIGRX tab (under the System Level TXCVR1 tab that is selected). Herein, the nomenclature that represents this selection will be TXCVR1:DIGRX: Configuration.

Figure 52:
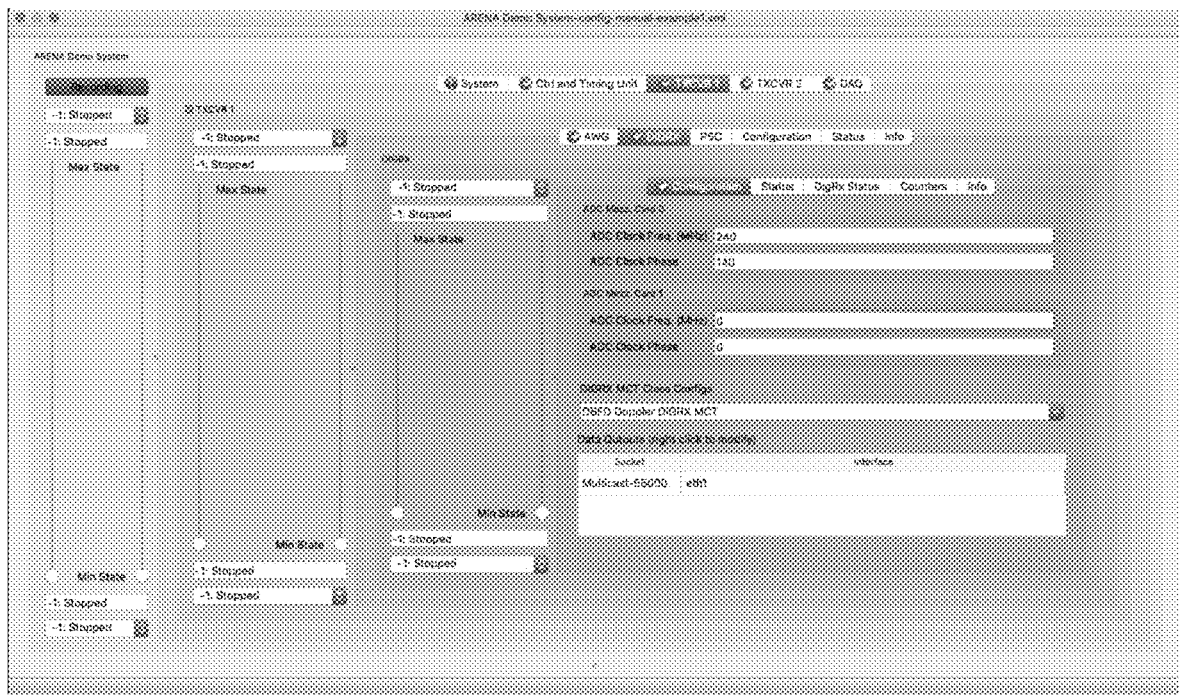
FIG. 52: Main arenaGUI window is shown for the case where a configuration error resides within the DIGRX mezzanine configuration. A red system alert is shown at this level and its upper levels to alert the user there is a problem with the configuration.

In the event that there are missing configuration data or an error in the configuration, the green symbols (green circle with a white check mark) change to red symbols (red circle with a white exclamation point). In FIG. 52 there the configuration object for the DIGRX MCT class has not been assigned. Red symbol propagates from the DIGRX McT Class Configs drop-down list box up through Configuration tab, then the DIGRX tab to the TXCVR1 tab. If TXCR1 tab was not selected, the user would be informed that there was an error within this ARENA's configuration or an alarm was occurring. In this example, the System tab also has a red symbol. This is an alert that the arenaGUI application is not currently connected to the systems azimuth table controller. Note that the upper levels are always marked to ensure the user is notified for cases where the lower levels may not be selected for display. The red symbols will propagate through each lower level.

In the sections to follow, the RT configuration object assignment & viewing and status data at the ARENA and Mezzanine levels for each ARENA module within this example are described. These are the System Level tabs: Ctrl and Timing Unit, TXCVR1, TXCVR2 and DAQ. Following these discussions, the System Level tab is discussed. The Ctl and Timing Unit is an ARENA 103 with a single mezzanine bus while the TXCVR1 and TXCVR2 are ARENA 313's with dual mezzanine buses. The latter will have two Mezzanine level RT configuration tabs. Since TXCVR1 and TXCVR2 are essentially the same only TXCVR1 will be presented as an example for the ARENA 313.

Ctrl and Timing Unit Tab

To view and/or assign the RT configuration objects and attributes and to view that RT status data for the ARENA 103 module with a Control and Timing Unit mezzanine card module at the ARENA Level, the System Level Ctrl and Timing Unit tab must be depressed. Once selected, the following ARENA Level tabs will be presented: CTU, PSC, Configuration, Status and Info. Each is described below.

Ctrl-and-Timing-Unit:CTU Tab

To access the ARENA Ctrl and Timing Unit CTU mezzanine RT configuration objects, attributes and status data, the ARENA level Ctrl and Timing Unit:CTU tab must be depressed. At the Mezzanine Level, Ctrl and Timing Unit will present the following tabs: Configuration, Counters, Encoder, Digital Sensors, I2C Sensors, Status, Output Test and Info. Each is described below.

Ctrl-and-Timing-Unit:CTU:Configuration Tab

Figure 53:
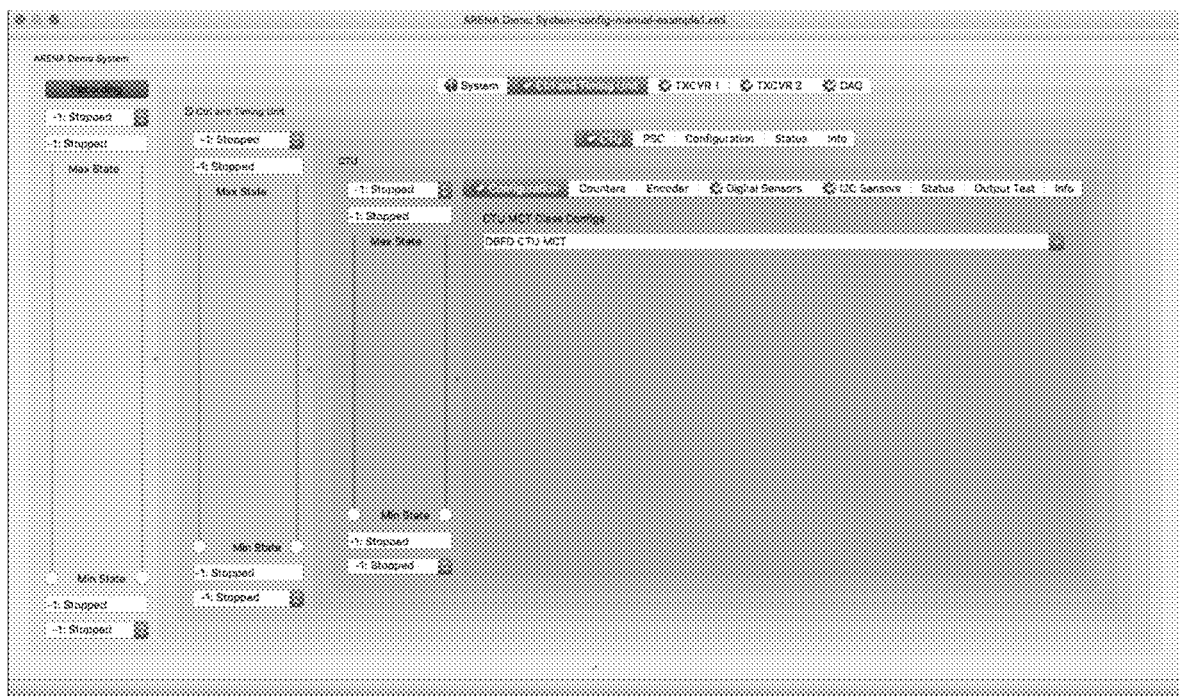
FIG. 53: ARENA Ctrl and Timing Unit Mezzanine Level run-time configuration example. DBFD CTU MCT configuration object belonging to the CTU MCT Class has been selected.

The CTU mezzanine card configuration objects are viewed and selected by left clicking the Mezzanine Level Ctrl-and-Timing-Unit:CTU:Configuration tab. FIG. 53 presents this interface. The RT configuration object belonging to the CTU MCT Class can be assigned:

CTU MCT Objects Configs: Drop-down list of configuration objects belonging to the CTU MCT Objects class (Section 0). In the example shown the configuration object, Standard CTU Mode Table, has been selected.

Ctrl-and-Timing-Unit:CTU:Counters Tab

To view the RT ARENA CTU counter values, left click the Ctrl-and-Timing-Unit:CTU:Counters tab. When selected, the relative time counter, profile counter, PPS fractional counter and PPS counter values are displayed. These values are only updated in Run state.

Ctrl-and-Timing-Unit:CTU:Encoder Tab

To view the encoder initialization values (up and down) and the current encoder value, left click the Ctrl-and-Timing-Unit:CTU:Encoder tab. The encoder up and down initialization values and the current encoder counter value are updated only during Run state.

Ctrl-and-Timing-Unit:CTU:Digital Sensors Tab

To view the digital sensor data, left click the Ctrl-and-Timing-Unit:CTU:Digital Sensor tab. A table will present each defined digital sensor in its own row. Within each row, the digital sensor's name, current value (0/1) and alarm value are presented. If a digital sensor's current value equals its defined alarm value, the text in that row will turn red and the symbol in the parent tabs (Mezzanine, ARENA and System levels) will change from a green circle with a white check to a yellow circle with a white exclamation point. The table is only updated in Run state.

Ctrl-and-Timing-Unit:CTU:I2C Sensors Tab

To view the I2C sensor data, left click the Ctrl-and-Timing-Unit:CTU: I2C Sensors tab. A table will present each defined I2C sensor in its own row. Within each row, the I2C sensor's name, current value, lower alarm value and upper alarm value are presented. If the current value is below the lower limit or above the upper limit, the text in that row will turn red and the symbol in each parent tab will change from a green circle with a white check to a yellow circle with a white exclamation point. The table is only updated during Run state.

Ctrl-and-Timing-Unit:CTU:Status Tab

To view the CTU TTL (single ended and differential) input values, depress the Ctrl-and-Timing-Unit:CTU:Status tab. All inputs will be listed with their alias value if defined. If any input is high, the box to the left of the input signal name is checked. This feature is mainly for debug/verification purposes. Note that if the signal toggles between logic 0 and 1 at a faster rate than it is being sampled by this display, the value presented will not have much meaning. These values are only updated in Run state.

Ctrl-and-Timing-Unit:CTU:Output Test Tab

To override any of the CTU output TTL (single ended or differential) signals left click the Ctrl-and-Timing-Unit: CTU:Output Test Tab. Each output signal is listed. The user can select to override any output signal and define whether the override value should be logic low (0) or high (1). Leaving the box in column 2 of the table unchecked produces a low value and checking it produces a logic high value. Output Test feature is only available in Alarm and Run states. In Alarm State all values will be logic low except for those checked to be overwritten with a logic high value. In Run State all output signals will follow the defined timing except for those being overridden. Care should be used as this allows dependencies to be overridden. To enable this feature the user must enter the override key value: 0xA596F0C3.

Ctrl-and-Timing-Unit:CTU:Info Tab

To view the information about the mezzanine card, left click the Ctrl-and-Timing-Unit:CTU:Info tab. The Project ID, Version and build TimeStamp for the firmware deployed for the CTU mezzanine card will be displayed.

Ctrl-and-Timing-Unit:PSC Tab

Figure 54:
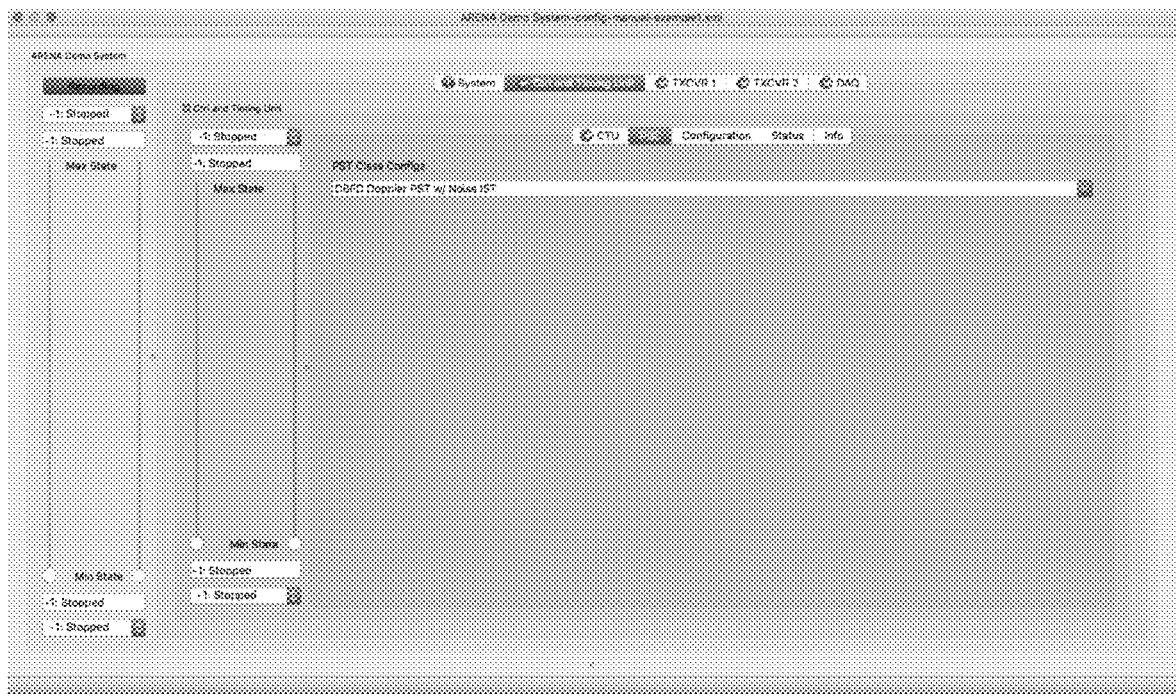
FIG. 54: ARENA Ctrl and Timing Unit PSC run-time configuration example. The DBFD Doppler PST w/Noise IST configuration object belonging to the PST Class has been selected.

FIG. 54 shows the selected PSC configuration object for the ARENA Ctrl and Timing Unit module. This ARENA has been designated as the master (MasterEnable attribute set in system.xml file), and as such, is the source for the Sync bus. The Ctrl-and-Timing-Unit:PSC tab has been depressed. Drop-down list box presents the available PST configuration objects. DBFD Doppler PST w/Noise IST is selected.

Ctrl-and-Timing-Unit:Configuration Tab

Figure 55:
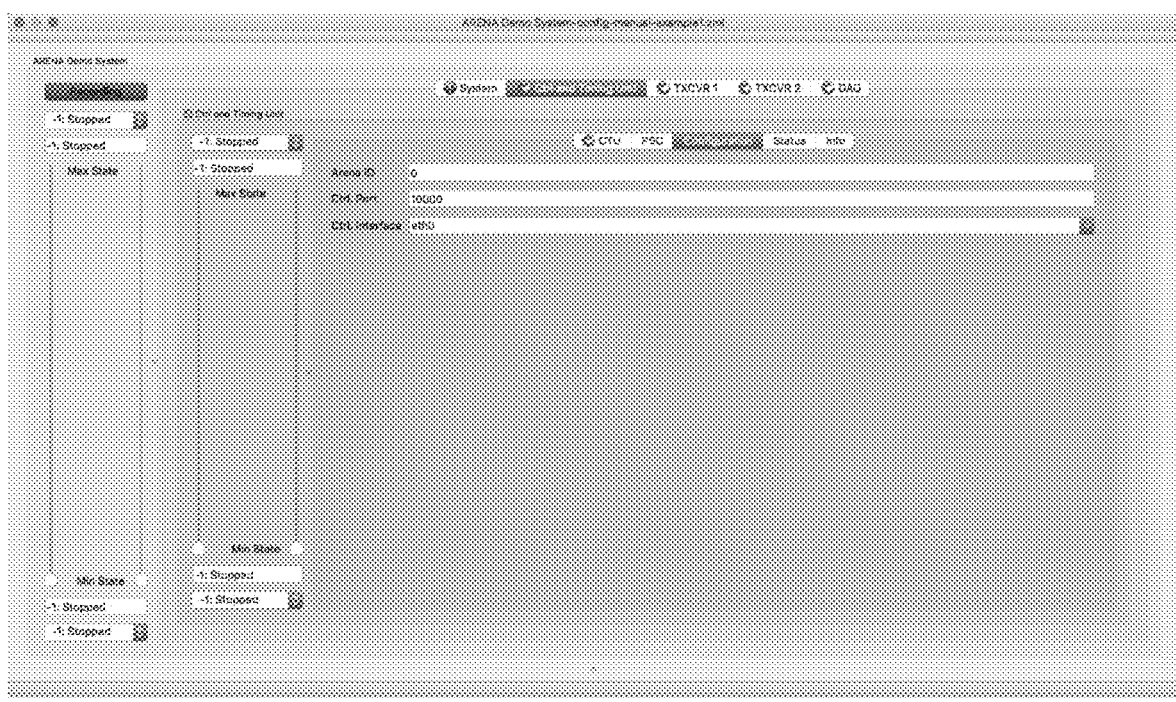
FIG. 55: ARENA Ctrl and Timing Unit ARENA Level Configuration run-time configuration example.

FIG. 55 shows the configuration interface for the ARENA Ctrl and Timing Unit module. There are three attributes listed. The first two, Arena ID and Ctrl. Port are defined in the system.xml file and are not editable. The third is the Ctrl. Interface and has a drop-down list from which the control interface can be selected. For the ARENA 103 modules, they typically have only one network interface (USB to GigE adaptor can provide a second interface). An interface must be selected. This interface and the Ctrl. Port define the ARENA module control server application's socket.

Ctrl-and-Timing-Unit:Status Tab

Figure 56:
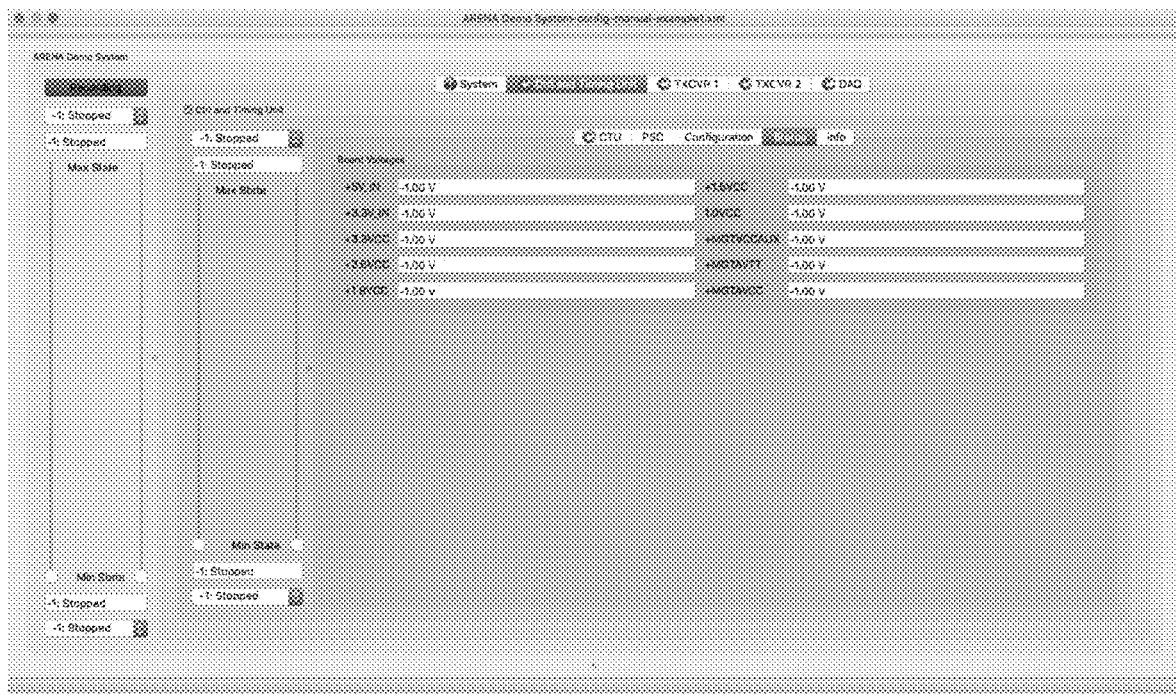
FIG. 56: ARENA Ctrl and Timing Unit ARENA Level Status tab example. Unit is currently not powered so all voltages are −1.00V.

FIG. 56 presents the ARENA Ctrl and Timing Unit ARENA level Status tab. It reports the ARENA board level supply rails. All values are −1.00V in figure since the unit is not powered.

CTU:Info Tab

The ARENA Ctrl and Timing Unit module's Ctrl-and-Timing-Unit:Info tab reports the Model, Version, Serial and Software Version numbers. The ARENA Ctrl and Timing Unit must be in Open state or higher to acquire this information.

TXCVR 1 Tab

The TXCVR 1 is an ARENA 313 module with an AWG mezzanine card and DIGRX mezzanine card deployed. To view and/or assign the TXCVR 1 RT configuration objects and attributes left click on the TXCVR1 tab (system level). Once selected the following ARENA Level tabs will be presented: AWG, DIGRX, PSC, Configuration, Status and Info. Each is described below.

TXCVR1:AWG Tab

Left click the ARENA level AWG tab to view and/or assign the Mezzanine Level AWG RT configuration objects, attributes and status of the ARENA TXCVR 1 AWG mezzanine card. Once selected, the following Mezzanine Level tabs are presented: Configuration, Status, Counters and Info.

TXCVR1:AWG:Configuration Tab

Figure 57:
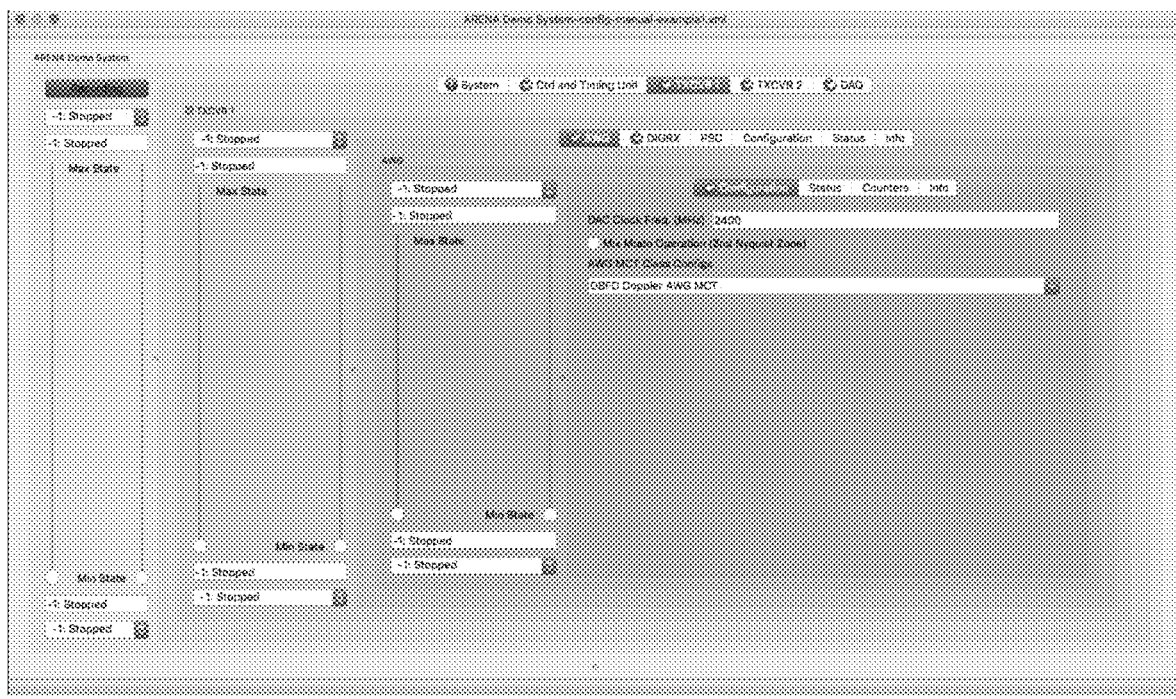
FIG. 57: ARENA TXCVR 1 AWG Mezzanine Level run-time configuration example.

The AWG mezzanine card RT configuration objects and attributes are viewed and selected by left clicking the Mezzanine Level TXCVR1:AWG:Configuration tab. FIG. 57 presents this interface. The AWG mezzanine card RT configuration has two attribute fields and one configuration object:

DAC Clock Freq. (MHz): The DAC clock frequency must be specified in MHz in this field. The maximum DAC clock frequency is 2400 MHz.

Mix Mode Operation: Radio box enables mix-mode operation. When enabled the AWG will produce signals in its second Nyquist zone.

AWG MCT Objects Configs: Drop-down list of configuration objects belonging to the AWG MCT class (Section 3). In the example shown the configuration object, DBFD Doppler AWG MCT, has been selected.

TXCVR1:AWG:Status Tab

To view the AWG mezzanine card status, left click the TXCVR1:AWG:Status tab. The values of the divide counter position and alignment (minimum, average and maximum) are presented. The values are only updated in Align and Run states. The alignment phase can be incremented or decremented by clicking the "Inc Sync Phase" or the "Dec Sync Phase" buttons. The radio button, Align Enabled, will instruct engage the auto alignment method if checked. The temperatures of the processor core and mezzanine boards are reported.

TXCVR1:AWG:Counters Tab

To view the RT ARENA TXCVR 1 AWG counter values, left click the TXCVR1:AWG: Counters tab. The relative time counter, profile counter, PPS fractional counter and PPS counter values are displayed. These values are only updated in Run state.

TXCVR1:AWG:Info Tab

To view information about the AWG mezzanine card and firmware, left click the TXCVR1:AWG:Info tab. The Project ID, Version and build TimeStamp for the firmware deployed are displayed. These values are presented in Open and higher states.

TXCVR1:DIGRX Tab

Left click the ARENA Level TXCVR1:DIGRX tab to view and/or assign the Mezzanine Level DIGRX RT configuration objects, attributes and status of the TXCVR 1 DIGRX mezzanine card. Once selected, the following Mezzanine Level tabs are presented: Configuration, Status, DigRx Status, Counters and Info.

TXCVR1:DIGRX:Configuration Tab

Figure 58:
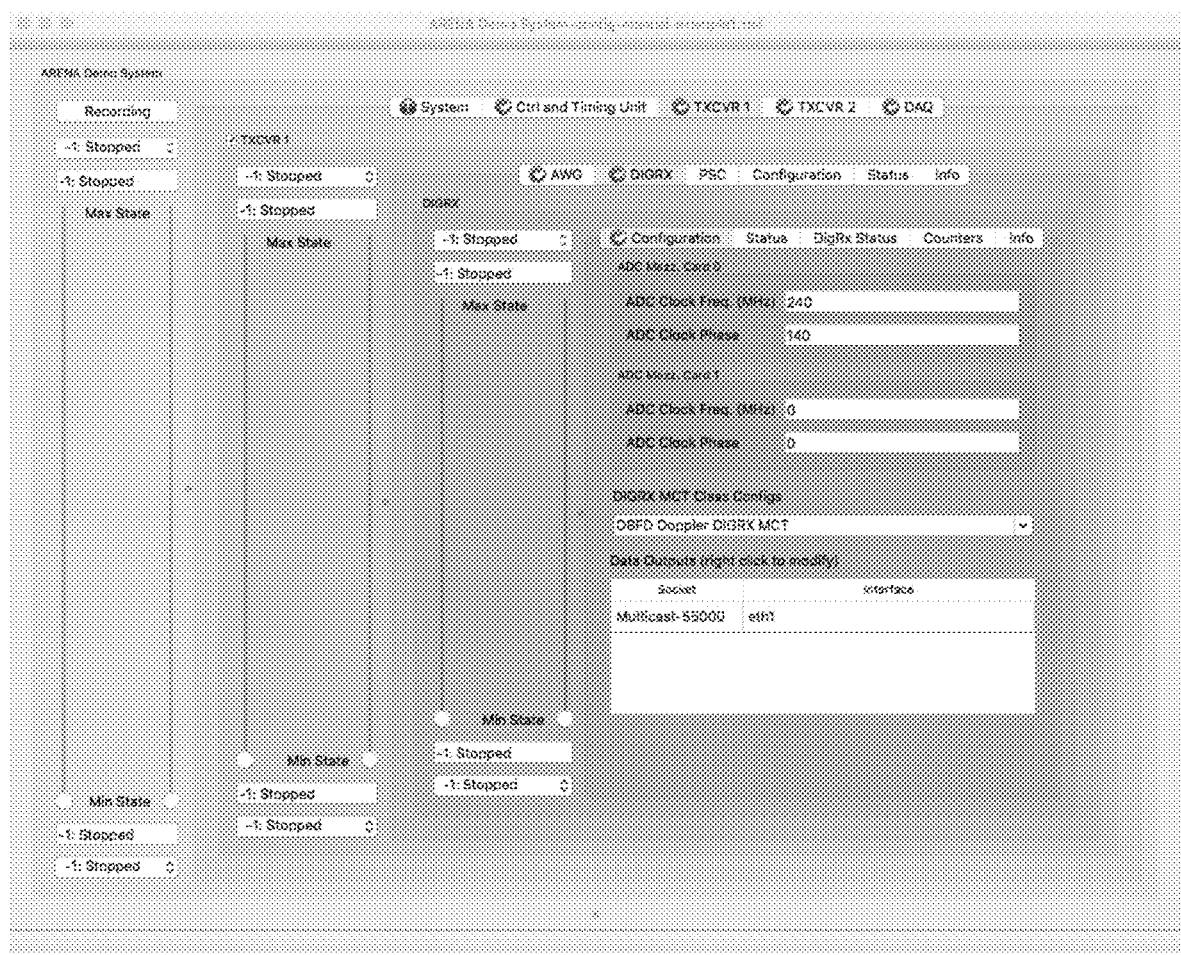
FIG. 58: TXCVR 1 Mezzanine Level DIGRX run-time configuration example.

The DIGRX mezzanine card RT configuration objects and attributes can be assigned and/or viewed by depressing the Mezzanine Level TXCVR1:DIGRX:Configuration tab. FIG. 58 presents this interface. There are four attributes, a DIGRX MCT configuration object and a data output table:

ADC Mezz Card 0 (attributes): If there is only one DIGRX (i.e. ADC) mezzanine card, regardless of which mezzanine bus it is plugged into, its attributes fall under ADC Mezz Card 0. If there are two DIGRX mezzanine cards, the mezzanine card closest to the ARENA SFP interfaces will be ADC Mezz Card 0. This card has two attributes that need to be assigned:

ADC Clock Freq. (MHz): The ADC clock frequency must be specified in MHz in this field.

ADC Clock Phase: This value is the delay line setting that aligns the ADC clock phase with the 10 MHz input (over the Sync Interface or SMC interface).

ADC Mezz Card 1 (attributes): If there are two DIGRX mezzanine cards plugged in, the one closest to the eth0 port is card 1. This card has two attributes that need to be assigned when the card is present. In a future release these fields will be grayed out if the card is not present.

ADC Clock Freq. (MHz): The ADC clock frequency must be specified in MHz in this field.

ADC Clock Phase: This value is the delay line setting that aligns the ADC clock phase with the 10 MHz input (over the Sync Interface or SMC interface).

DIGRX MCT Objects Configs: Drop-down list of configuration objects belonging to the DIGRX MCT class (see Section 3). In the example shown the configuration object, DBFD Doppler DIGRX, has been selected.

Data Outputs: This table defines the socket and interface for sending the digital receiver profile data packets. This instructs the Processed Profile Data Router how to handle the Process Profile Data objects. Right clicking on the table will allows a new row to be added and right clicking on an existing row will provide an option to delete that entry. The Socket entry is a drop-down list box of configuration objects belonging to the Data Socket Objects class (Section 3) and the interface is a drop-down list box of available network interfaces for the ARENA DIGRX module. This table provides the capability to sequentially send data packets over multiple sockets and interfaces. This feature is designed for ARENA modules with multiple network interfaces in order to achieve greater data rates than a single interface can support. Future release will add the ability to send data in parallel to local storage and to create quick look data objects as well.

TXCVR1:DIGRX:Status Tab

To view the TXCVR 1 DIGRX mezzanine card status, left click the TXCVR1:DIGRX:Status tab. This interface reports the divide counter positions for the DIGRX mezzanine cards that are present, the processor core temperature and the mezzanine card temperatures. These values are updated in Align and Run state.

TXCVR1:DIGRX:DigRx Status Tab

Not implemented in this version.

TXCVR1:DIGRX:Counters Tab

To view the RT TXCVR1 DIGRX counter values, left click the TXCVR1:DIGRX:Counters tab. The relative time counter, profile counter, PPS fractional counter, PPS counter, Encoder and Antenna Counter values are displayed. These values are only updated in Run state.

TXCVR1:DIGRX:Info Tab

To view information about the DIGRX mezzanine card, left click the TXCVR1:DIGRX:Info tab. The Project ID, Version and build TimeStamp for the firmware deployed are displayed. Aux Data is also shown. These values are presented in Open and higher states.

TXCVR1:PSC Tab

TXCVR1 is not enabled as the Master of the Sync bus. Thus, the PSC Configuration object field is grayed out.

TXCVR1:Configuration Tab

Figure 59:
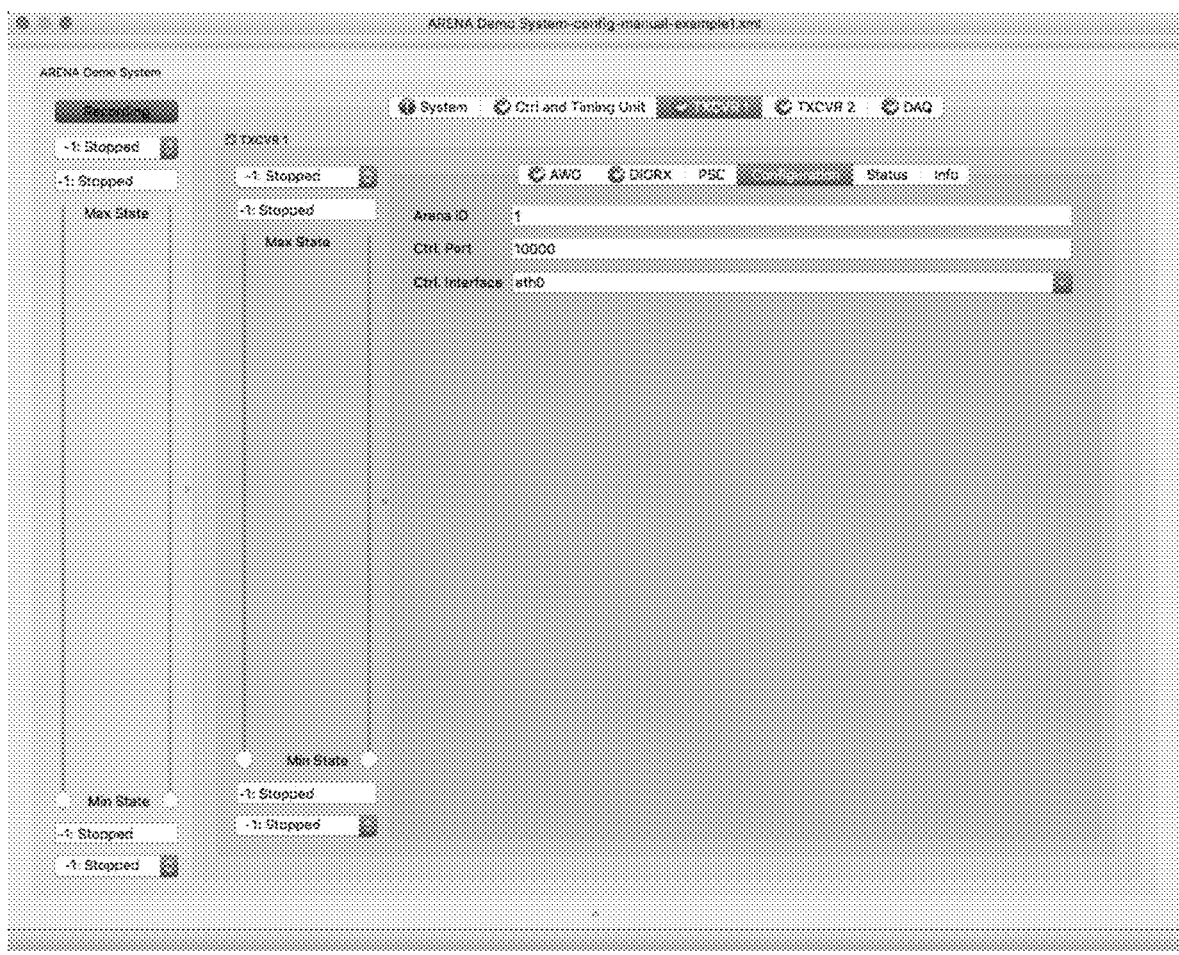
FIG. 59: ARENA AWG ARENA Level run-time configuration example.

To view and/or assign the ARENA Level attributes for the TXCVR1, left click the TXCVR1: Configuration tab. As shown by FIG. 59, three attributes are presented. The first two, Arena ID and Ctrl. Port are defined in the system.xml file and are not editable. The third is the Ctrl. Interface that has a drop-down list box from which the control interface can be selected. The ARENA 313 module has three network interfaces (eth0, eth1 and eth2). Typically eth0 is used, while eth1 and eth2 are used for data networks. This interface and the Ctrl. Port define the ARENA module control server application's socket.

TXCVR1:Status:Tab

To view the TXCVR 1 status, left click the TXCVR1: Status tab. The board voltages and temperatures will continuous update when TXCVR 1 is in Open state or higher.

TXCVR:Info Tab

To view the information about the TXCVR 1 module, left click the TXCVR:Info tab. The ARENA module model number, hardware version, serial number and software version are reported. The TXCVR 1 must be in Open state or higher to acquire this information.

DAQ Tab

To view and/or assign the DAQ RT configuration objects and attributes, left click the System Level DAQ tab. Once selected the following ARENA Level tabs will be presented: Configuration, Status and Info. Each is described below.

DAQ:Configuration Tab

Figure 60:
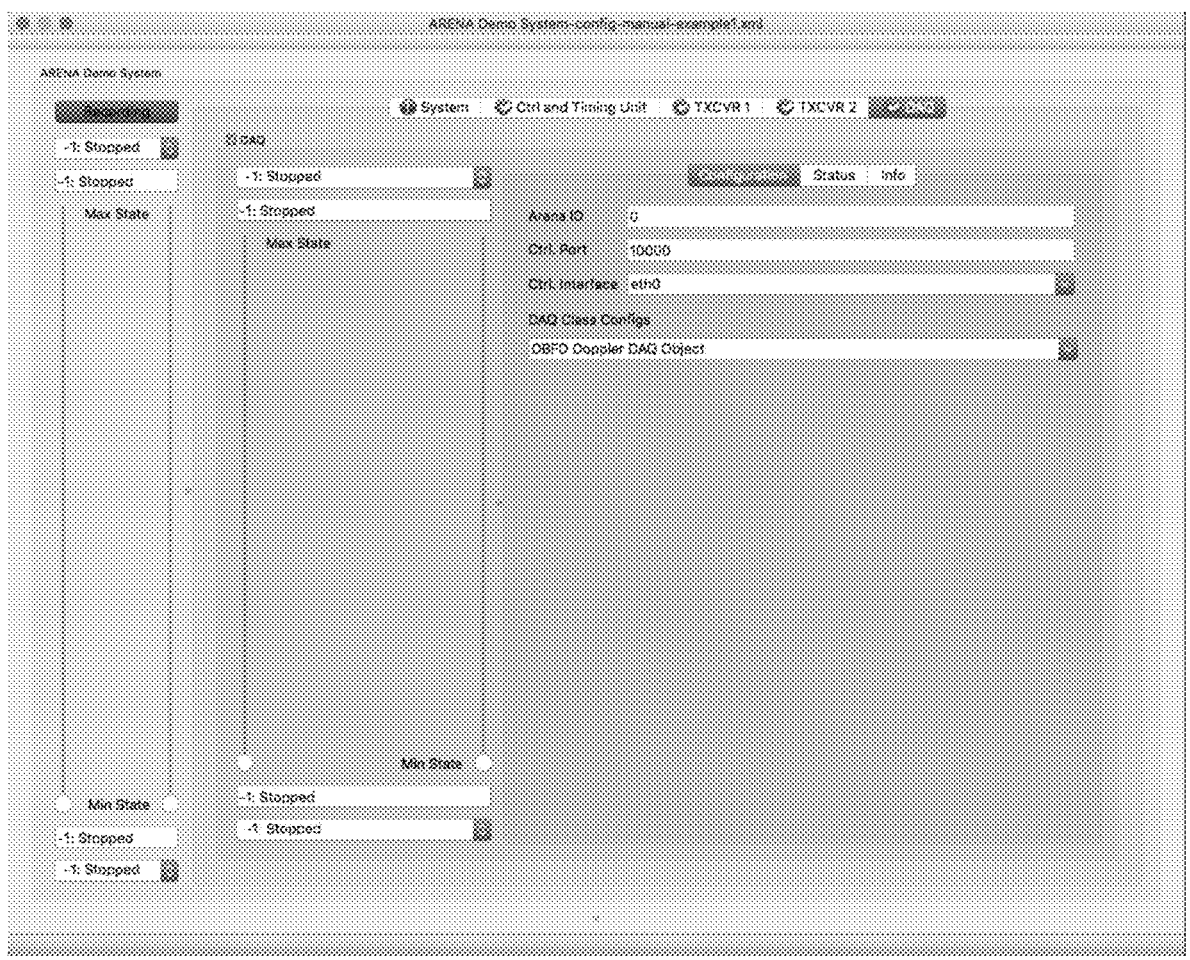
FIG. 60: ARENA DAQ ARENA Level run-time configuration example.

To view and/or assign the ARENA Level attributes for the ARENA DAQ, left click the DAQ:Configuration tab. As shown by FIG. 60, three attributes and one RT configuration object are presented. The first two attributes, Arena ID and Ctrl. Port, are defined in the system.xml file and are not editable. The third attribute is the Ctrl. Interface that has a drop-down list box listing the network interfaces for the DAQ from which the control interface can be selected. This must be selected. This interface and the Ctrl. Port define the arenaDAQ application's control socket. The final entry is a drop-down list of configuration objects belonging to the Data Acquisition configuration class (Section 3).

DAQ0:Status:Tab

During Run state, the current sequence number, number of drop packets and buffer overflow condition reported by the corresponding arenaDAQ application are reported continuously. Number of drop packets should remain at zero and there should not be any buffer overflow conditions. If either occurs, the green symbol on the DAQ tab will change to the red symbol to alert the user. If attribute, Delayed Auto Clear Status, is checked, alarm status will auto clear. During this process, the red symbol will turn yellow once error has been checked. After a time period the error will be cleared and the symbol will revert to the green symbol.

DAQ0:Info Tab

Not applicable.

System

Figure 61:
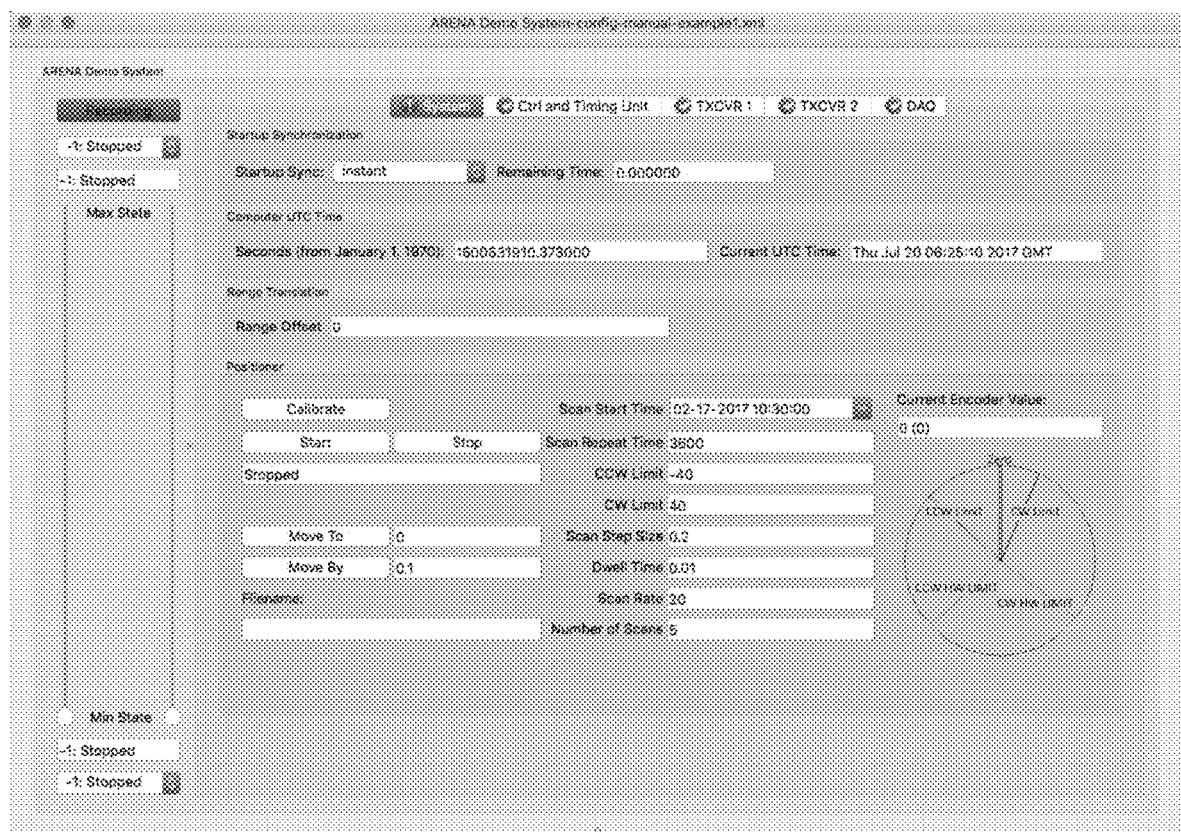
FIG. 61: System Level Tab Interface

FIG. 61 presents a screen shot of the System Tab. System tab can be defined to be project specific and allow for external systems to be integrated into the central control. It may also be used to drive attributes and create lower level configuration objects based on deployment parameters. For instance, for aircraft system altitude may be displayed on the system tab and used to auto calculate the length of range profiles. In the example provided, there are four panels: Startup Synchronization, Computer UTC Time, Range Translation and Positioner. Each is described below.

Startup Synchronization

The Startup Synchronization presents a drop-down list box that allows the user to select the Startup Sync method. There are three options:

GPS Time: If selected, all ARENA real-time clocks will represent GPS time in UTC seconds from Jan. 1, 1970 when the system enters Run state. Requires a PPS signal and GPS NEMA data stream. If selected and the GPS NEMA data stream is not present or the PPS is not present, the system will stay in a wait state.

Computer Time: If selected, all ARENA real-time clocks will synchronize together using the computer time of the server that the arenaGUI application is running on. The time will be in UTC seconds from Jan. 1, 1970 once the system enters Run state.

Instant Time: If selected, all ARENA real-time clocks will be loaded with the current time of the server that the arenaGUI application is running on but will not be synchronized to each other. The time will be in UTC seconds from Jan. 1, 1970.

The "Remaining Time" field displays the count down time to time synchronization when GPS Time or Computer Time method is selected.

Computer UTC Time

Continuously displays the computer time in seconds from Jan. 1, 1970 and a UTC date-time stamp.

Range Translation

Range offset attribute is displayed in a field and is editable. This attribute is used by display applications that plot the data in true range. The value is entered in meters.

Positioner

Provides several fields to control the azimuth scan of a positioner and provide current azimuth pointing angle of the positioner.

Calibrate button: If depressed the azimuth positioner will be commanded to auto calibrate is true pointing angle.

Start/Stop Buttons: Commands the azimuth positioner to start its scan or stop its scan. Scan is defined by the attributes in the right side of the frame.

Scan Start Time: Start time to begin periodic scans. Can be in the past or future.

Scan Repeat Time: Scan will be performed every N times this time from the Scan Start Time. Specified in seconds.

CCW Limit: Farthest counter clockwise position of the scan specified in degrees.

CW Limit: Farthest clockwise position of the scan specified in degrees.

Scan Step Size: Step size of the scan. If set to zero, scan will be continuous. Specified in degrees.

Dwell Time: Time to dwell before move to next location (i.e. move step size). Specified in seconds.

Scan Rate: Rate in degrees per second positioner should rotate.

Number of Scans: Number of times to repeat the scan defined above. Once completed, the system will be placed in ARM state (standby) until next scan period.

Current Encoder Value: Display current encoder value. System needs to be in Open state or higher.

Filename: Prefix that is appended to all data files recorded by the DAQ application.

ARENA Operation

The main frame of the arenaGUI provides controls for changing the state at the System, ARENA and Mezzanine Levels. The available states are:

Stopped: Waiting for command to change state. No threads running.

Closed: Waiting for command to change state. Underlying threads are running.

Open: Communicates Info tab information and waits for command to change state.

Align: Executes alignment procedures if applicable and waits for command to change state.

Calibrate: Executes calibration procedures if applicable and waits for command to change state.

Arm: Initializes all counters and waits for command to change state.

Run: Enters Run state executing its configuration with each Sync packet or data packet.

Figure 62:
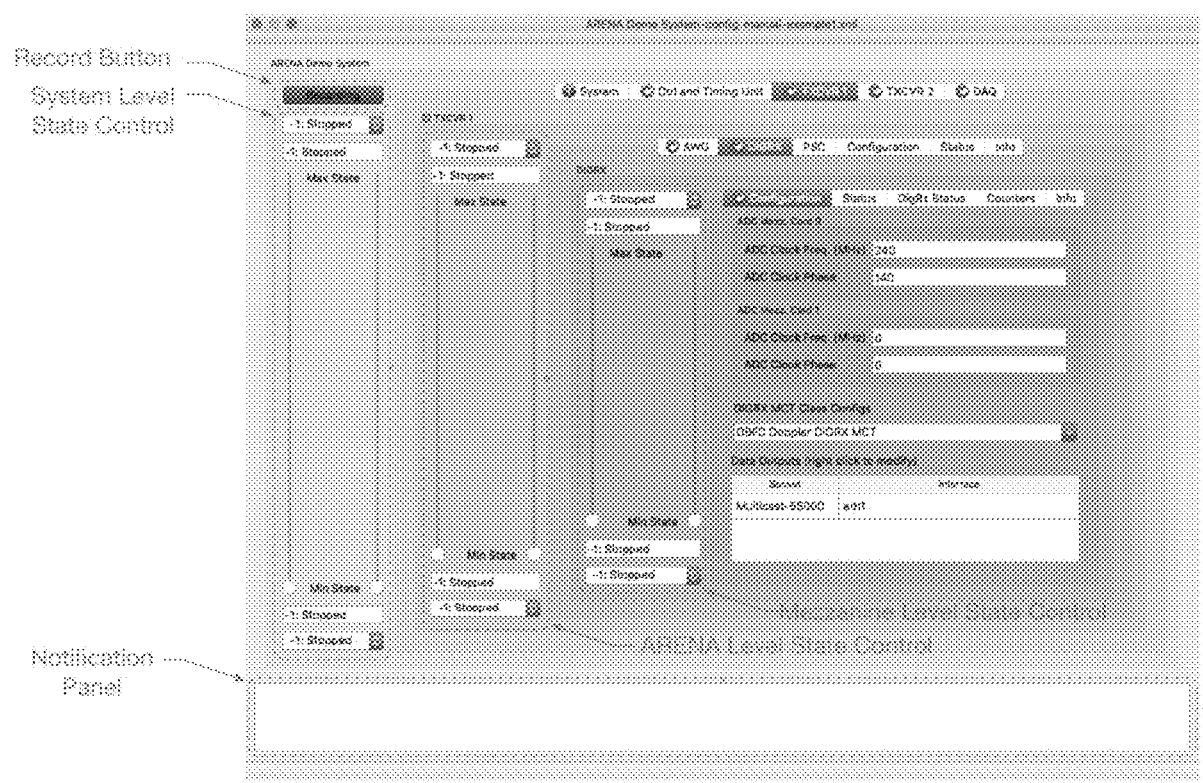
FIG. 62: Screenshot of the arenaGUI application main window showing the various state control levels: System, ARENA and mezzanine. Also noted are the Recording button and Notification Panel.

There are three levels of state control: System, ARENA and Mezzanine levels as depicted in FIG. 62. These are described below.

State Level Controls

Each state level control provides two sliders. The slider on the right specifies the minimum state and the slider on the right specifies the maximum state. Sliding the right slider up or down changes the minimum state to the selected level. In doing so, if the maximum state is lower, the maximum state is set equal to the selected minimum state level. Sliding the left slider up or down changes the maximum state. If the minimum state is higher than the selected maximum state, the minimum state is set equal to the maximum state. The drop-down list boxes are updated by the sliders with the upper drop down box representing the maximum selected state and the lowest representing the minimum selected state. The fields above and below the sliders represent the current minimum and maximum state.

System Level State Controls

To control the state of all ARENA modules, the System level state controls should be used. During normal operation when going to Run state, they should be changed from a minimum state of Stopped or Open to Run. This will ensure that synchronization of all counters will occur. If stepped through the states manually, the counters for each ARENA module may not be synchronized to each other. The ARENA Level and Mezzanine Level state controls follow the System Level State controls unless the ARENA Level enable box for an ARENA module is disabled by unchecking its enable box.

ARENA Level State Controls

To change the state of a specific ARENA module (e.g. Ctrl. and Timing Unit), the ARENA Level state controls can be set by selecting the desired System Level tab of the desired ARENA module and changing its ARENA Level state controls.

Mezzanine Level State Controls

To change the state of a specific ARENA mezzanine card (e.g. DIGRX), the Mezzanine Level state controls can be set by selecting the desired Mezzanine Level tab associated with the mezzanine card and changing its Mezzanine Level state controls.

Recording Button

The Recording Button is depressed by default. When depressed, any data acquisition module (e.g. DAQ) is instructed to record the data it receives when set in Run state. If the Recording Button is not depressed, data packets will not be recorded.

Notification Panel

Notifications processed by the arenaGUI are displayed in the Notification Panel.

It can therefore be seen that the exemplary embodiments provide a unique and novel modular object-oriented digital system architecture which is ideally suited for radar, sonar and other general purpose instrumentation. The ability to self-discover modular system components, self-build internal firmware and software based on the modular components, sequence signal timing across the modules and synchronize signal paths through multiple system modules provides a significant advancement in the art.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A modular operationally reconfigurable digital signal processing system for radar or sonar instrumentation, the modular digital system comprising:
   at least one operational card;
   at least one operational module comprising a processing device, an external communication port, memory, a synchronization interface and a modular expansion bus configured to receive said at least one operational card,
   said processing device including a clock synthesizer providing a clock signal to said at least one operational card; and
   a software application running on said processing device which is operative for
   generating a synchronization signal based on said clock signal, and
   providing said synchronization signal to said at least one operational card to control the timing of operation of said at least one operational card,
   wherein the modular digital system is configured to automatically reconfigure an operational mode of said digital system with each synchronization signal.

2. The modular digital system of claim 1 wherein said at least one operational card is selected from the group consisting of: an arbitrary waveform generator, a digital receiver and signal processor, an N-channel analog to digital converter, an N-channel digital to analog converter, an input/output processor, a power device, a PCIe bus, a local oscillator and a Control and Timing Unit (CTU).

3. The modular digital system of claim 1, wherein the at least one operational card is an arbitrary waveform generator and said software application is further operative for synchronizing a starting phase and time of a generated waveform.

4. The modular digital system of claim 3, further comprising a second operational card comprising a digital receiver and pulse pair processor and said software application is configured to synchronize digitization of a received signal and phase.

5. The modular digital system of claim 1, wherein the at least one operational card is a digital receiver and signal processor and said software application is configured to synchronize digitization of a received signal and phase.

6. The modular digital system of claim 1 wherein said modular digital system is configured to accept plural modules each including a commonly shared object-oriented firmware architecture.

7. The modular digital system of claim 1 further comprising a control interface.

8. The modular digital system of claim 1 further comprising an external clock synthesizer module having a controller, clock signal generator and synchronization interface and being operation for generating a clock signal output;
    said at least one operation module further comprising a clock reference input receiving said clock reference signal from said clock synthesizer module.

9. The modular digital system of claim 1 further comprising:
    a second operational module comprising a further processing device, a further external communication port, a further memory, a further synchronization interface and a further modular expansion bus for receiving said at least one operational card,
    a further software application running on said further processing device which is operative for
    receiving a further synchronization signal based on a further clock signal, and
    providing said further synchronization signal to said at least one operational card to control the timing of operation of said at least one operational card,
    wherein the modular digital system is configured to automatically reconfigure an operational mode of said digital system with each further synchronization signal.

10. The modular digital system of claim 9 wherein each operational module includes a commonly shared object-oriented firmware architecture.

11. The modular digital system of claim 9 wherein said first operational module operates as a primary sequence controller and provides a synchronization signal to said second operational module.

12. A modular operationally reconfigurable digital signal processing system for radar or sonar instrumentation, the modular digital system comprising:
    a first operational module comprising a processing device, an external communication port, memory, a synchronization interface and a modular expansion bus configured to receive at least one first operational card,
    said processing device including a clock synthesizer providing a clock signal to said at least one first operational card; and
    a software application running on said processing device which is configured to generate or receive a synchronization signal based on said clock signal, and
    providing said synchronization signal to said at least one operational card to control the timing of operation of said at least one first operational card,
    a second operational module comprising a further processing device, a further external communication port, a further memory, a further synchronization interface and a further modular expansion bus configured to receive at least one second operational card,
    said further processing device including a clock synthesizer providing a further clock signal to said at least one second operational card; and
    a further software application running on said further processing device which is configured to generate or receive a further synchronization signal based on said further clock signal, and provide said further synchronization signal to said at least one second operational card to control the timing of operation of said at least one second operational card,
    wherein said first operational module comprises a primary sequence controller and provides the first synchronization signal to said second operational module, and
    wherein the modular digital system is configured to automatically reconfigure an operational mode of said digital system with each synchronization signal.

13. The modular digital system of claim 12 wherein said first and second operational cards are selected from the group consisting of: an arbitrary waveform generator, a digital receiver and signal processor, an N-channel analog to digital converter, an N-channel digital to analog converter, an input/output processor, a power device, a PCIe bus, a local oscillator and a Control and Timing Unit (CTU).

14. The modular digital system of claim 13, wherein said first operational module includes a Control and Timing Unit (CTU) operation card and said second operational module includes two operational cards selected from the group consisting of: an arbitrary waveform generator, a digital receiver and signal processor, an N-channel analog to digital converter, an N-channel digital to analog converter, an input/output processor, a power device, a PCIe bus, a local oscillator.

* * * * *